United States Patent
Guernsey et al.

(10) Patent No.: US 10,246,263 B2
(45) Date of Patent: Apr. 2, 2019

(54) CLEANABLE CONVEYOR FRAME ASSEMBLY

(71) Applicant: Laitram, L.L.C., Harahan, LA (US)

(72) Inventors: Kevin W. Guernsey, Destin, FL (US); John F. Landrum, New Orleans, LA (US); Mark T. Drapanas, Charlottesville, VA (US); Manoj Thomas, Ouderkerk aan de Amstel (NL)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/676,007

(22) Filed: Aug. 14, 2017

(65) Prior Publication Data

US 2018/0016101 A1    Jan. 18, 2018

Related U.S. Application Data

(63) Continuation of application No. 15/344,744, filed on Nov. 7, 2016, now Pat. No. 9,764,902, which is a (Continued)

(51) Int. Cl.
*B65G 21/06* (2006.01)
*B65G 21/02* (2006.01)
*B65G 15/60* (2006.01)

(52) U.S. Cl.
CPC ............. *B65G 21/06* (2013.01); *B65G 15/60* (2013.01); *B65G 21/02* (2013.01); *B65G 2207/26* (2013.01); *B65G 2207/30* (2013.01)

(58) Field of Classification Search
CPC .................................. B65G 21/02; B65G 21/06
See application file for complete search history.

(56) References Cited

U.S. PATENT DOCUMENTS

| 1,850,891 A | 3/1932 | Nyborg |
| 1,945,300 A * | 1/1934 | West ...................... B65G 15/08 |
| | | 198/500 |

(Continued)

FOREIGN PATENT DOCUMENTS

| EP | 1260462 A1 | 11/2002 |
| JP | 54006783 U | 1/1979 |

(Continued)

OTHER PUBLICATIONS

Gough Engineering Solutions, New Gough "Easy Clean" Conveyor; www.goughengineering.com., accessed Dec. 20, 2012.

(Continued)

*Primary Examiner* — Thomas Randazzo
(74) *Attorney, Agent, or Firm* — Catherine M. Bishop

(57) ABSTRACT

A cleanable belt conveyor and a method for making a cleanable belt conveyor having a simplified frame design. One version of such a conveyor comprises a frame and an insertable conveyor belt support. Another version comprises a modular frame formed by a plurality of shafts connected using connectors. Another version comprises a unitary frame and carryway structure, whereby the carryway for supporting a conveyor belt constitutes support structure for the frame. Another version comprises a carryway support rail including an integral curved reversing element. Another version comprises components connected through curvaceous connecting members.

14 Claims, 52 Drawing Sheets

Related U.S. Application Data continuation of application No. 14/408,008, filed as application No. PCT/US13/46686 on Jun. 20, 130, now Pat. No. 9,511,942.

(60) Provisional application No. 61/662,165, filed on Jun. 20, 2012, provisional application No. 61/753,520, filed on Jan. 17, 2013.

(56) References Cited

U.S. PATENT DOCUMENTS

| | | | | |
|---|---|---|---|---|
| 3,993,185 | A * | 11/1976 | Fleckenstein | B65G 21/06 198/813 |
| 5,119,926 | A * | 6/1992 | Draebel | B65G 17/086 198/836.3 |
| 5,205,400 | A * | 4/1993 | Breuss | B65G 15/00 198/812 |
| 5,692,597 | A * | 12/1997 | Ferguson | B65G 15/00 198/841 |
| 5,775,480 | A * | 7/1998 | Lapeyre | B65G 17/086 198/831 |
| 6,105,757 | A * | 8/2000 | Ledingham | B65G 21/2072 198/721 |
| 6,227,355 | B1 * | 5/2001 | White | B65G 15/62 198/841 |
| 6,269,939 | B1 * | 8/2001 | Lapeyre | B65G 21/00 198/615 |
| 6,371,283 | B1 * | 4/2002 | Manchester | B65G 23/44 198/813 |
| 6,591,979 | B1 * | 7/2003 | Karpy | B65G 21/06 198/860.1 |
| 7,114,615 | B1 * | 10/2006 | Karpy | B65G 21/20 198/860.1 |
| 7,178,665 | B2 * | 2/2007 | Ryan | B65G 15/00 198/836.1 |
| 7,267,223 | B2 * | 9/2007 | Spoors | B65G 21/02 198/816 |
| 7,549,531 | B2 * | 6/2009 | Hosch | B65G 21/105 198/493 |
| 7,753,194 | B1 * | 7/2010 | Jager | B65G 15/62 198/841 |
| 7,997,405 | B2 * | 8/2011 | Karpy | B65G 15/62 198/860.1 |
| 8,844,315 | B2 * | 9/2014 | Bilger | F25D 3/11 62/374 |
| 9,511,942 | B2 * | 12/2016 | Guernsey | B65G 21/02 |
| 9,764,902 | B2 * | 9/2017 | Guernsey | B65G 21/02 |
| 2005/0121294 | A1 | 6/2005 | Finger et al. | |
| 2006/0254887 | A1 * | 11/2006 | Aubry | B65G 15/62 198/860.3 |
| 2011/0017573 | A1 | 1/2011 | Karpy | |

FOREIGN PATENT DOCUMENTS

| | | |
|---|---|---|
| JP | 159617 U | 10/1984 |
| JP | S6268907 U | 4/1987 |
| JP | 2009505018 | 2/2009 |
| JP | 2009113888 | 5/2009 |
| NL | 1027905 C2 | 6/2006 |
| WO | 2007021197 A2 | 2/2007 |
| WO | 2008002758 A1 | 1/2008 |

OTHER PUBLICATIONS http://www.walkercustomsheetmetal.com/wowconveyor.html, accessed Jan. 17, 2013.

International Search Report and Written Opinion of the International Searching Authority, PCT/US2013/046686, dated Sep. 3, 2013, Korean Intellectual Property Office.

Extended European Search Report, Application No. 13807781.3-1707, dated Mar. 29, 2016, European Patent Office, Munich, Germany.

Office Communication, Application No. 13807781.3, dated Feb. 21, 2017, European Patent Office, NL.

Office Communication, Japanese Application No. 2015-518567, dated Apr. 18, 2017, Japan Patent Office.

Office Communication, European Patent Application No. 13807781.3-1731, dated Oct. 6, 2017, European Patent Office, NL.

* cited by examiner

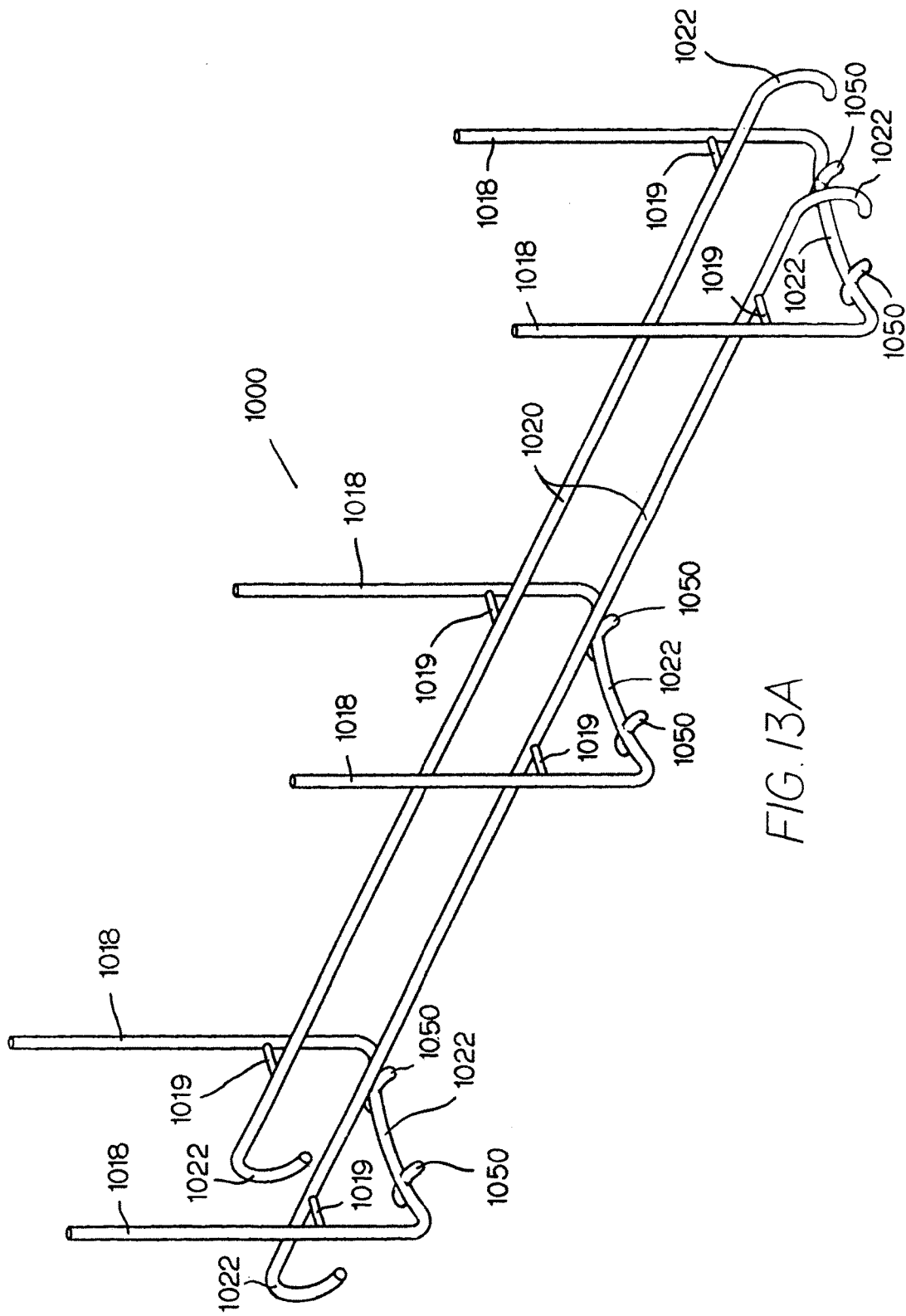

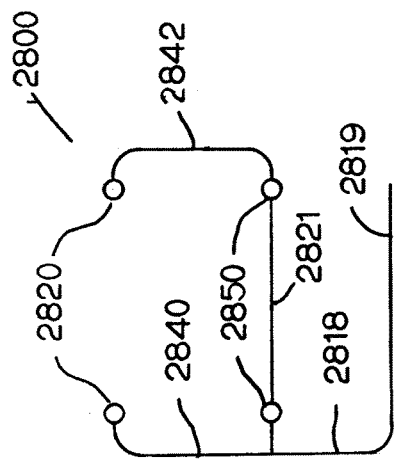
FIG.33
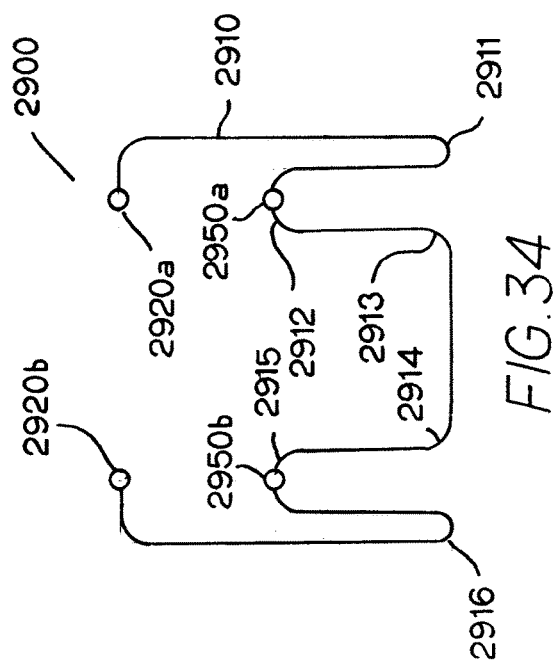
FIG.35
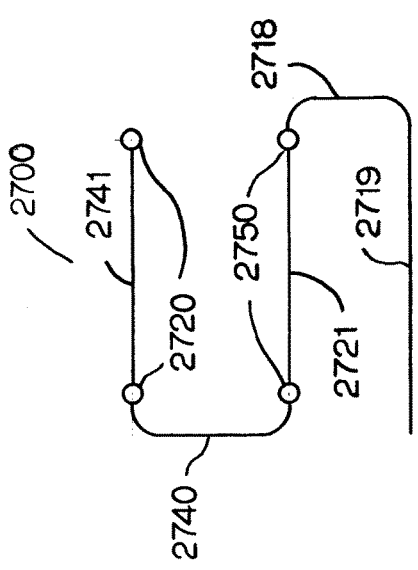
FIG.32
FIG.34

CLEANABLE CONVEYOR FRAME ASSEMBLY

RELATED APPLICATIONS

This application is a continuation of U.S. patent application Ser. No. 15/344,744 entitled "Cleanable Conveyor Frame Assembly, filed Nov. 7, 2016, which is itself a continuation of U.S. patent application Ser. No. 14/408,008 entitled "Cleanable Conveyor Frame Assembly", which is a National Phase Application of PCT Application Number PCT/US13/46686 filed Jun. 20, 2013, which in turn claims priority to U.S. Provisional Patent Application No. 61/662,165, filed Jun. 20, 2012 and U.S. Provisional Patent Application No. 61/753,520, filed Jan. 17, 2013. The contents of these applications are herein incorporated by references.

BACKGROUND

The invention relates generally to frames for power-driven conveyors and more particularly to belt conveyor frames that are easy to clean.

In the meat, poultry, fruit, and vegetable industries, conveyor belts are used to transport food products. Most conveyor belts are supported along carryways supported by a frame assembly. To meet USDA sanitation requirements, conveyor belt systems must be cleanable. The conveyor carryway and frame are particularly susceptible to the accumulation of fats, dirt, and debris. Complex connections between different components, a large number of components in the frame and carryway, difficult-to-clean crevices and other issues make cleaning conveyor belt systems problematic at times.

Thus, there is a need for an easy-to-clean conveyor belt system.

SUMMARY

This need and other needs are addressed by a conveyor system embodying features of the invention. One version of such a conveyor system comprises a frame and an insertable conveyor belt support. Another version comprises a modular frame formed by a plurality of shafts connected using connectors. Another version comprises a unitary frame and carryway structure, whereby the carryway for supporting a conveyor belt also constitutes support structure for the frame. One version of such a conveyor system comprises a unitary frame structure, whereby the carryway for supporting a conveyor belt also constitutes support structure for the frame. Components of the frame may be connected through curvaceous connecting members to facilitate cleanliness.

According to one aspect of the invention, a conveyor frame comprises a plurality of modular frame components assembled to form a plurality of legs and a plurality of longitudinally-extending rails connecting the legs and defining a carryway. The plurality of modular frame components comprises a first longitudinal rail, a first t-shaped connector having a first end connected to a first end of the first longitudinal rail, a first vertical rail forming a first leg connected to a second, downward-extending end of the t-shaped connector, a second longitudinal rail connected to a third end of the t-shaped connector opposite the first end, a third longitudinal rail, a second t-shaped connector having a first end connected to a first end of the third longitudinal rail, a second vertical rail forming a second leg connected to a second, downward-extending end of the second t-shaped connector, a fourth longitudinal rail connected to a third end of the second t-shaped connector opposite the first end, and a lateral rail extending between the first leg and second leg below the longitudinal rails and t-shaped connectors, the lateral rail including a returnway support.

According to another aspect, a conveyor frame comprises a plurality of modular frame components assembled to form a plurality of legs and a plurality of longitudinally-extending rails connecting the legs to define a carryway. The plurality of modular frame components comprises a first longitudinal rail having a curved end and a non-curved end, a first t-shaped connector having a first end connected to the non-curved end of the first longitudinal rail, a first vertical rail forming a first leg connected to a second, downward extending end of the first t-shaped connector, a second longitudinal rail connected to a third end of the first t-shaped connector and a third longitudinal rail with a curved end opposite the curved end of the first longitudinal rail and a non-curved end, a second t-shaped connector having a first end connected to an end of the third longitudinal rail opposite the curved end, a second vertical rail forming a second leg connected to a second, downward-extending end of the second t-shaped connector and a fourth longitudinal rail connected to a third end of the second t-shaped connector.

BRIEF DESCRIPTION OF THE DRAWINGS

These aspects and features of the invention are described in more detail in the following description, appended claims, and accompanying drawings, in which:

FIG. 13A is another embodiment of a suspended conveyor frame;

FIG. 32 is a front view of a cleanable conveyor frame design with minimal connections between components according to another embodiment of the invention;

FIG. 33 is a front view of a cleanable conveyor frame design with minimal connections between components according to another embodiment of the invention;

FIG. 34 is a front view of a cleanable conveyor frame design with minimal connections between components according to another embodiment of the invention;

FIG. 35 is a front view of a cleanable conveyor frame design with minimal connections between components according to another embodiment of the invention;

DETAILED DESCRIPTION

Figure 1:
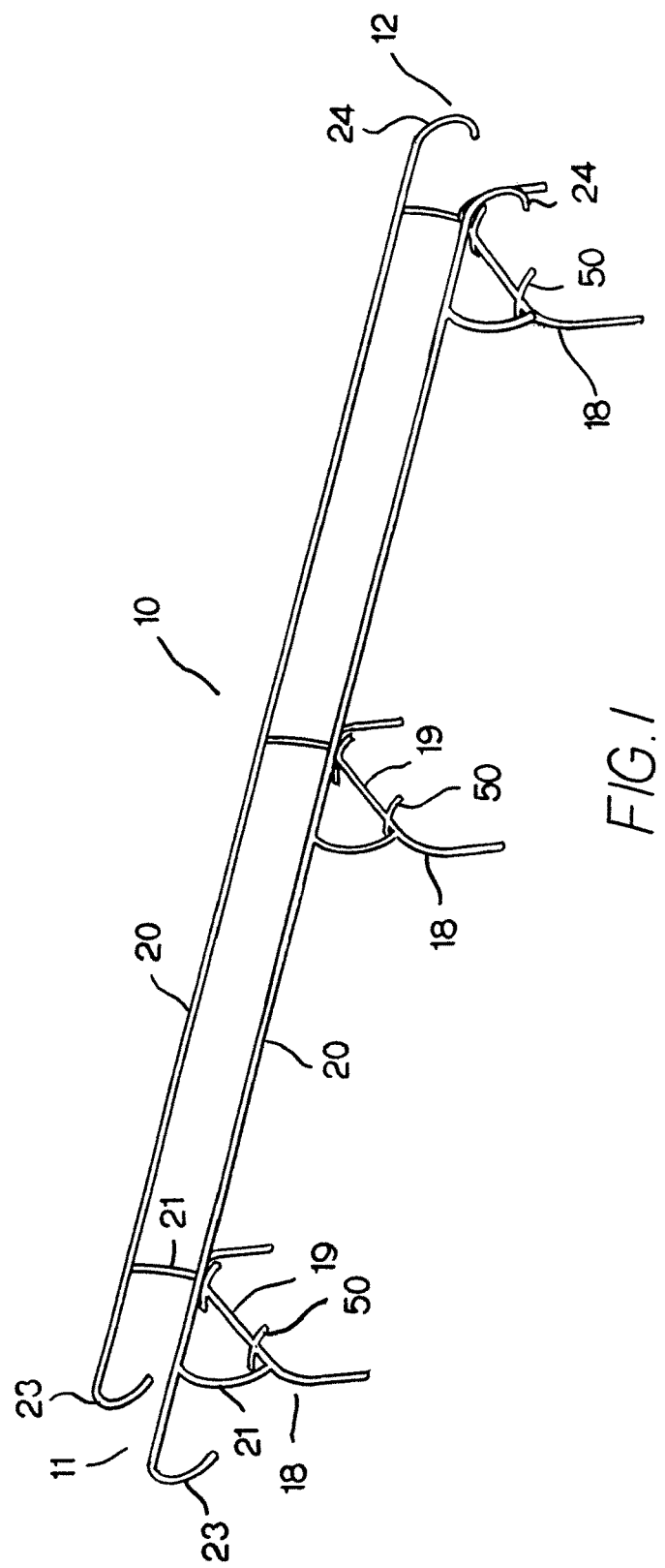
FIG. 1 is an isometric view of an embodiment of a cleanable conveyor frame having an integrated carryway.
Figure 2:
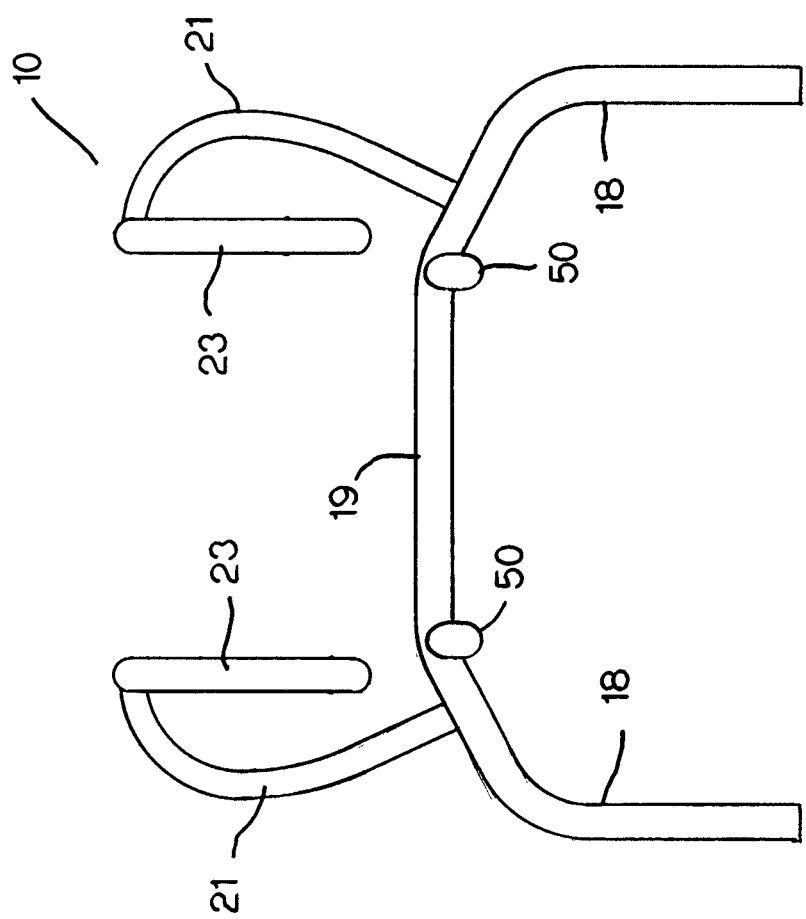
FIG. 2 is a front view of the conveyor frame of FIG. 1.

A conveyor frame embodying features of the invention is shown in FIGS. 1-4. The exemplary conveyor frame 10 supports a conveyor belt 40 (shown in FIG. 4) traveling between a first end 11 of the frame and a second end 12 of the frame. The conveyor belt conveys products from the first end 11 to the second end 12 along a carryway. The conveyor belt 40 may be trained around reversing elements at each end of the carryway and returned along a returnway below the carryway. The frame 10 minimizes components through simplification and integration to enhance cleanability while ensuring sufficient strength.

The illustrative frame 10 integrates the support structure of the frame with the carryway. The frame 10 includes a pair of legs 18 near ends 11, 12 and, optionally, intermediate points along the frame. Longitudinally-extending rails 20 connect the legs, structurally support the frame 10 and form a carryway for supporting the conveyor belt 40 extending from the first end 11 to the second end 12. The ends 23, 24 of the longitudinally-extending rails 20 curve, preferably through a 180° arc, to form reversing elements or guide structures for the conveyor belt between the carryway and the returnway. The curved reversing elements formed by the ends 23, 24 are preferably integral with the linear portion of the rails 20, and may be formed by bending the ends to form the desired configuration.

Figure 3:
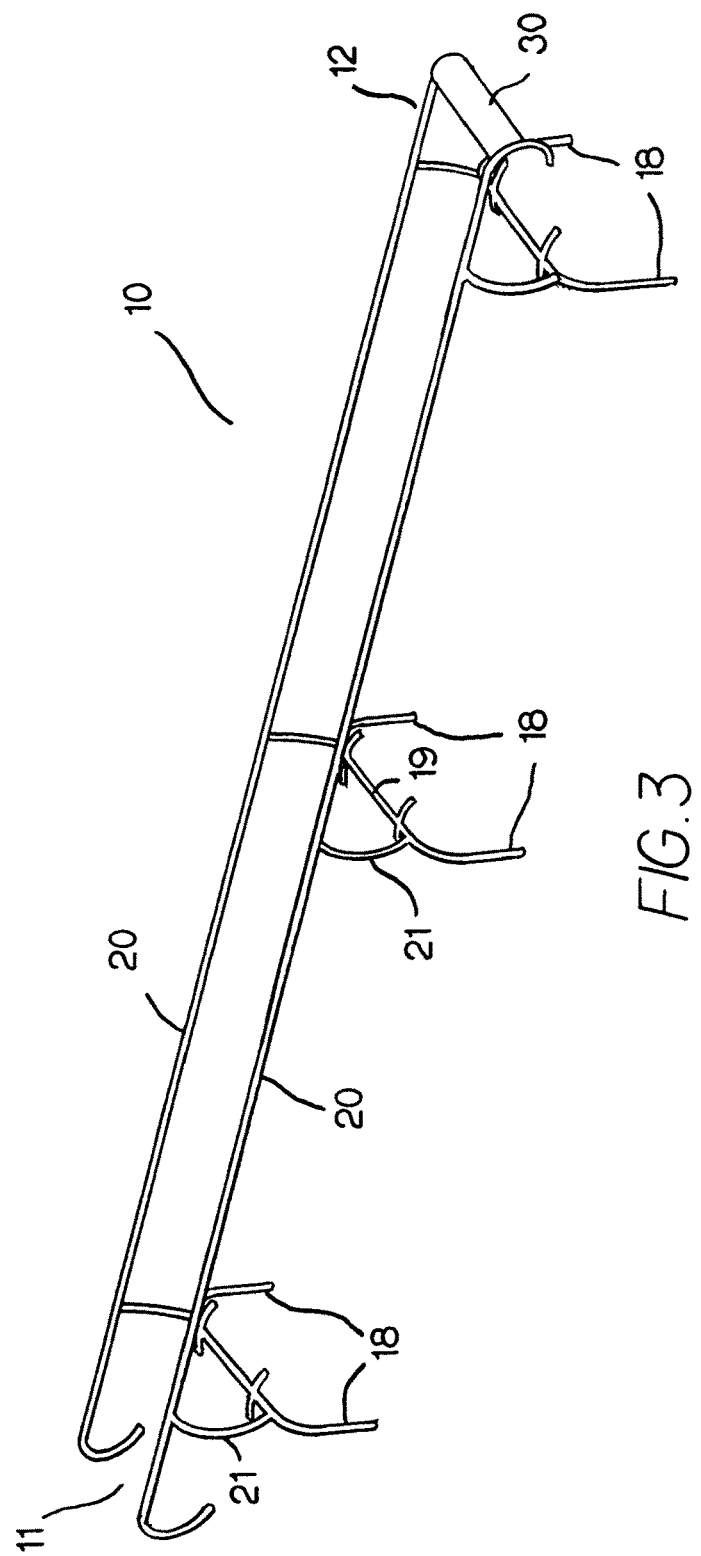
FIG. 3 illustrates the conveyor frame of FIG. 1 including a drum motor.
Figure 4:
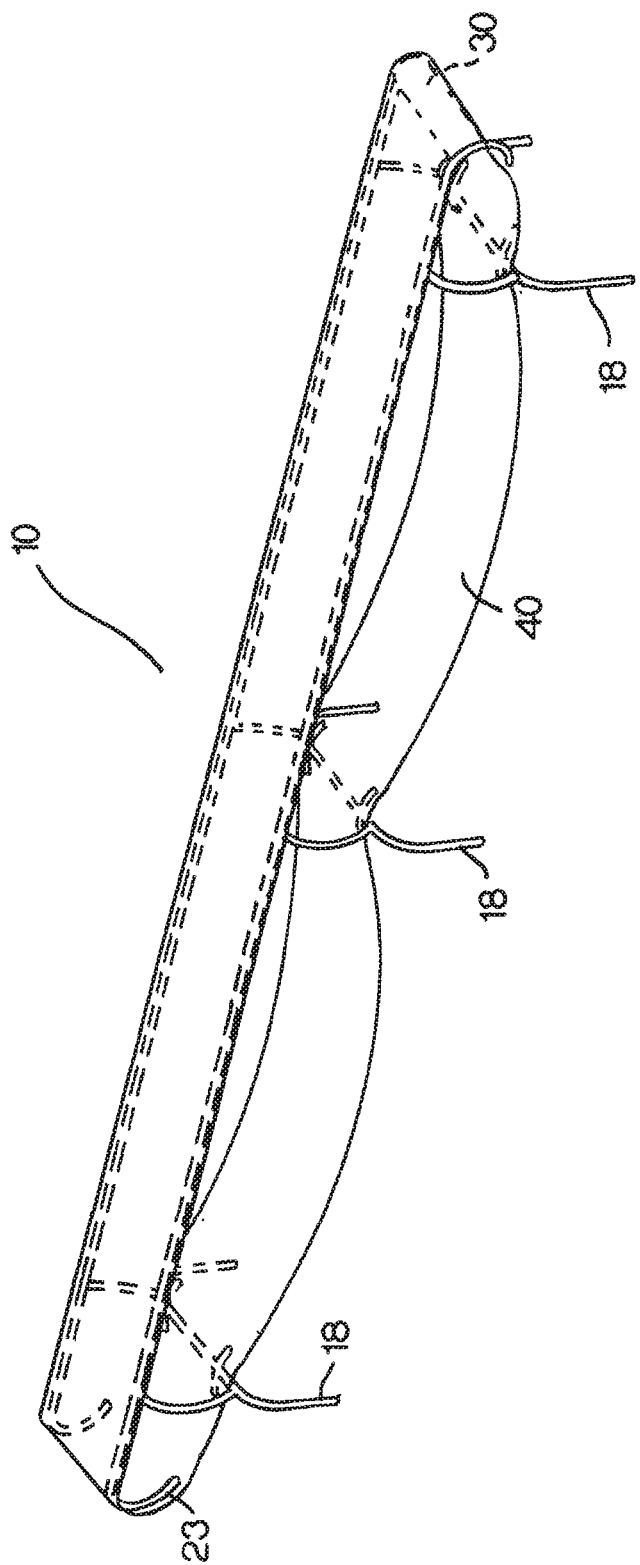
FIG. 4 illustrates the conveyor frame of FIG. 1 including a drum motor and conveyor belt driven by the drum motor.

Lateral leg connectors 19 extend between each pair of legs 18. The illustrative legs and lateral leg connectors are formed by upside-down u-shaped rails and include curved upper portions 21 extending upwards from the u-shaped rail. The curved rails 21 forming the upper portions of the legs 18 curve outwards to accommodate the conveyor belt in the returnway. As shown in FIG. 3, a drum motor 30 for driving the conveyor belt 40, shown in FIG. 4, is supported between the curved ends 24 of the longitudinal rails 20 at the second end 12. Curved returnway rails 50 extend from the lateral leg connectors 19 for guiding the conveyor belt in the returnway and extend in the longitudinal direction. The curved returnway rails 50 may be integral with the lateral leg connectors 19 and accommodate sagging of the conveyor belt 40 in the returnway.

While the illustrative legs 18 are substantially vertical in the lower portion, alternatively, the lower leg rails may be curved inwards, or be angled, or have another suitable embodiment.

Figure 5:
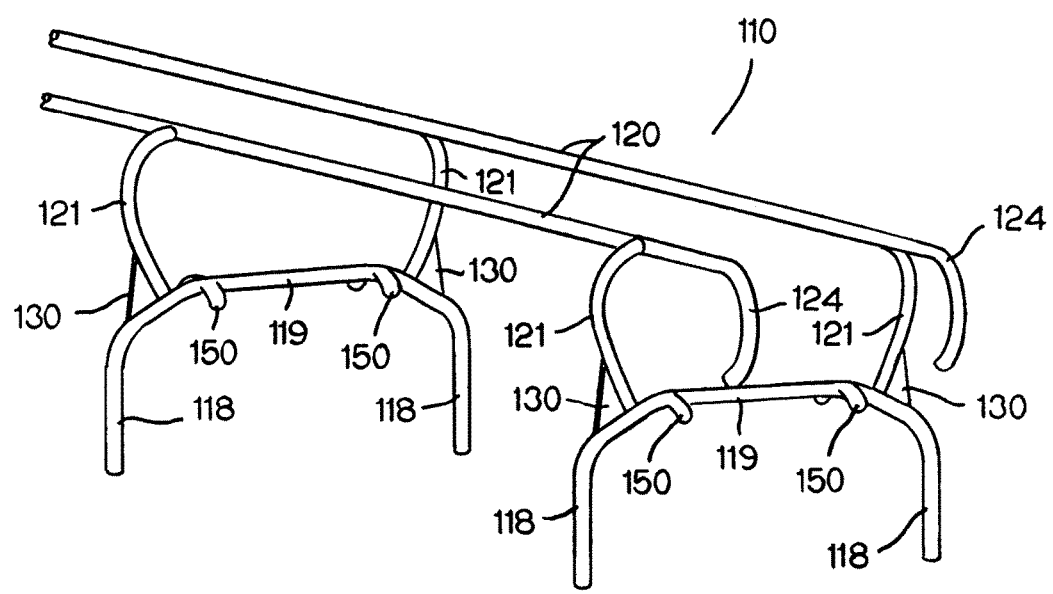
FIG. 5 illustrates an embodiment of a cleanable conveyor frame having gussets.

FIG. 5 illustrates a portion of another embodiment of an integrated conveyor frame and carryway system 110. The frame 110 includes legs 118 near the frame ends and, optionally, intermediate points along the frame. Lateral leg connectors 119 extend between each pair of legs 118. The illustrative lower leg portions 118a and lateral leg connectors 119 are formed by upside-down u-shaped rails. Curved rails 121 form upper portions of the legs and connect to longitudinal rails 120 extending the length of the frame. The longitudinal rails 120 connect the legs to support the frame and form a carryway for supporting a conveyor belt. The ends 124 of the longitudinal rails 120 curve to form reversing elements. Curved returnway rails 150 extend from the lateral leg connectors 119 for guiding the conveyor belt in the returnway. The illustrative conveyor 110 further includes gussets 130 at the joints between the lower leg rails 118a and upper leg rails 121. The gussets 130 eliminate 90° corners that are difficult to clean.

While the illustrative legs 118 are substantially vertical, alternatively, the legs may be curved inwards, angled, or have another suitable configuration.

Figure 6:
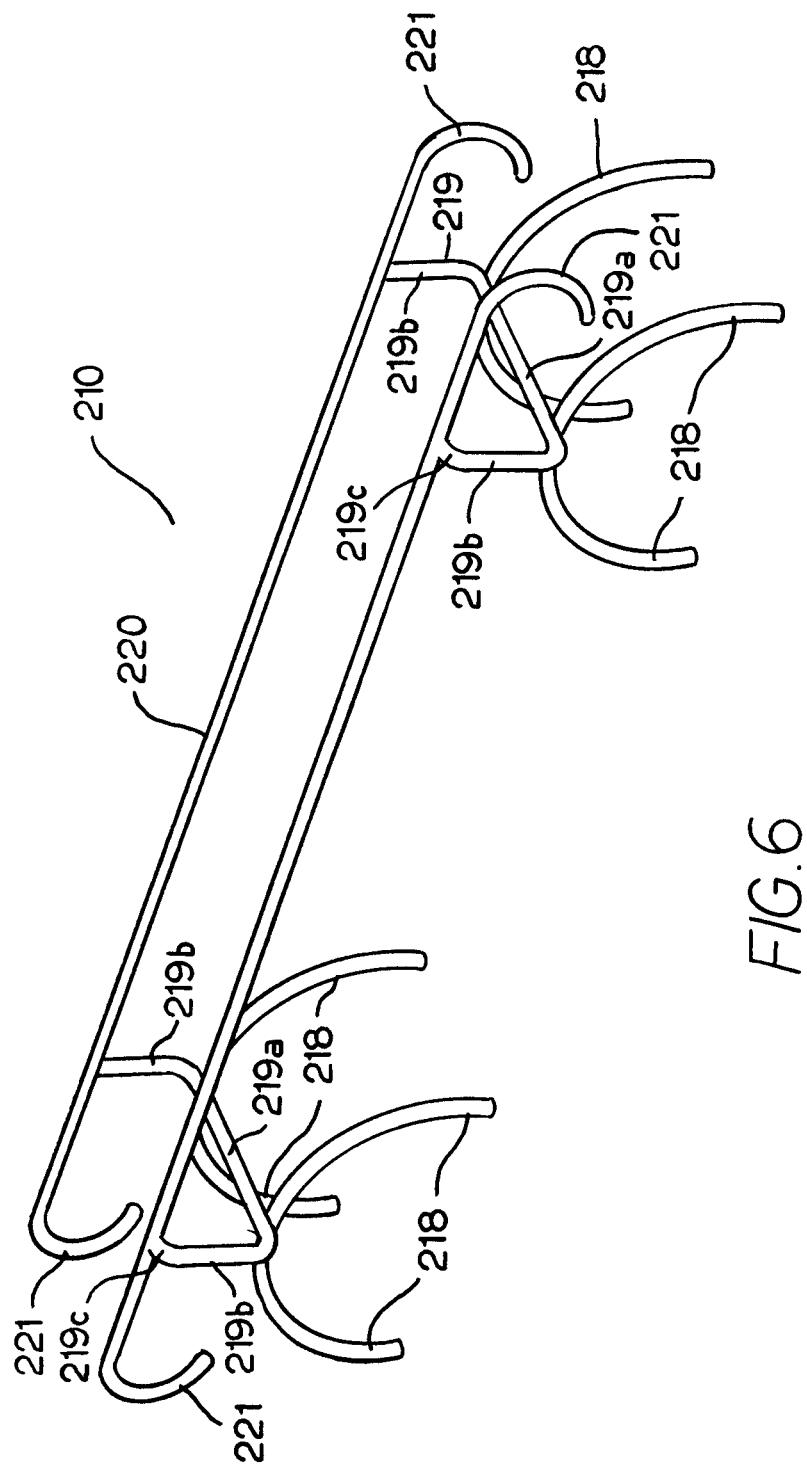
FIG. 6 illustrates another embodiment of a cleanable conveyor frame having an integrated carryway.

FIG. 6 illustrates another embodiment of an integrated conveyor frame and carryway system. The integrated frame 210 comprises longitudinally-extending rails 220 extending from a first end to a second end of the frame on each side to form a carryway. The ends of the longitudinal rails 220 curve to form reversing elements 221 or guide structures. Semi-circular, longitudinally extending rails form lower legs 218, with each end of the semi-circular rail grounded to the floor. Connecting rails 219 connect each pair of legs along the length of the conveyor to the longitudinal rails 220. Each connecting rail 219 comprises a lateral section 219a extending between and beyond the tops of the semi-circular leg rails 218. The ends of the lateral sections turn to form vertical sections 219b. The tops of the vertical sections 219b turn laterally inwards to form short lateral sections 219c that connect to the longitudinal rails 220. Preferably, the turns in the leg-longitudinal rail connectors are curves. The legs of the frame may be considered to comprise the semi-circular rail 218, the vertical section 219b and the lateral sections 219c.

The curved upper portion of the semi-circular rail 218 and the lateral rail 219a form a returnway support for supporting a conveyor belt in the returnway.

Figure 7:
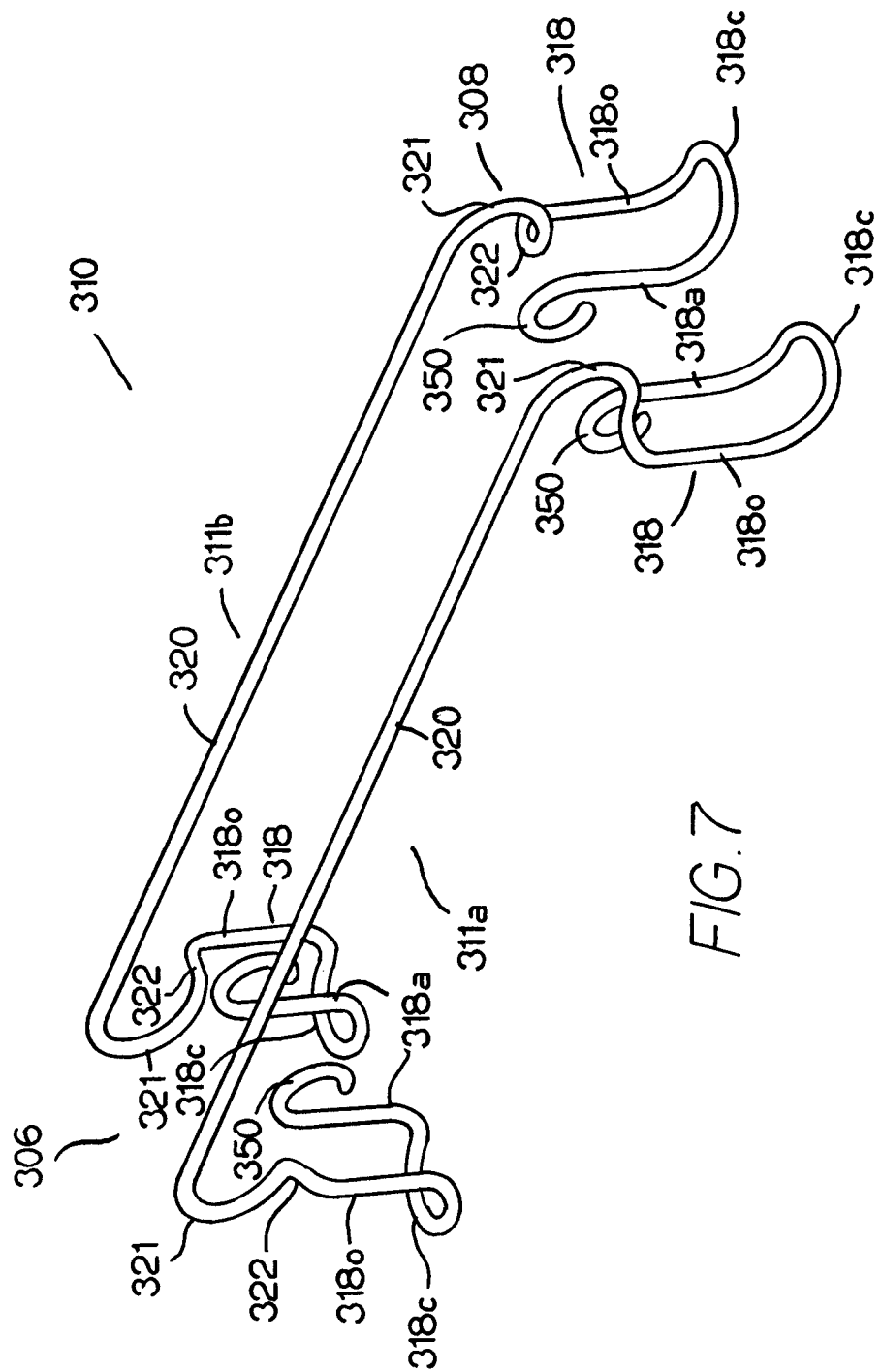
FIG. 7 illustrates an embodiment of a cleanable conveyor frame comprising two frame sides.

Another embodiment of a conveyor frame for a conveying system embodying features of the invention is shown in FIG. 7. The exemplary conveyor frame 310 supports a conveyor belt traveling between a first end 306 of the frame and a second end 308 of the frame. The conveyor belt conveys products from the first end 306 to the second end 308 along a carryway. The conveyor belt may be trained around reversing elements at each end of the carryway and returned along a returnway below the carryway. The frame 10 minimizes components through simplification and integration to enhance cleanability while ensuring sufficient strength.

In the illustrative conveyor frame 310, the carryway support and returnway support are integrated with the frame structure. A continuous piece of rod stock may be bent multiple ways to create multiple portions of the frame out of a single component to eliminate or minimize joints. Alternatively, one or more portions of the frame may be molded out of plastic.

The illustrative conveyor frame 310 comprises two sets of frame sides 311a and 311b, which are mirror images of each other and may be independent of each other. Each frame side 311a or 311b comprises a longitudinal rail 320 extending from the first end 306 to the second end 308 and connecting frame legs 318 located at each end of the frame side. Each longitudinal rail 320 also forms a side of a carryway for guiding a conveyor belt. The ends of the longitudinal rails 320 form reversing elements, comprising downward extending curves 321 for guiding the conveyor belt around the frame or, optionally, housing a sprocket, drum, motor or other mechanism. The end curves 321 are substantially u-shaped. Each illustrated frame leg 318 comprises an inner leg portion 318i, an outer leg portion 318o and a curved connecting section 318c. The outer leg portion 318o is offset outward of the longitudinal rail 320, while the inner leg portion 318i may be inset relative to the longitudinal rail 320. The curved connecting section 318c forms a base to support the leg. The curved connecting section 318c connects the inner and outer leg portions, and preferably rests on the floor or foundation on which the frame 310 rests. Each inner leg portion 318i curves at the top end to form a returnway support rail 350 extending longitudinally inwards. The outer leg portion curves laterally inwards at the top end to form a leg-rail connector 322, which connects to the downward extending curve 321 of the associated longitudinal rail 320.

Each side 311a and 311b of the frame is an integral structure, with the carryway support (longitudinal rails 320) also forming support structure for the frame. The components of each frame side 311a, 311b are connected through curvaceous members, which may be integral or separate pieces, to form an effectively continuous structure. Each side 311a and 311b may be formed from one piece of stock that is bent in multiple directions to form a monolithic structure, or more may be molded from a mold. Preferably, the frame components are formed of stainless steel, an alloy, plastic, another suitable material or a combination of materials, and have a cross-section formed of a plurality of arcs, such as a round, oval, tear-drop or other suitably shaped cross-section. In another embodiment, the frame components may a cross-sectional shape in the form of a rounded "I", a rounded "T", a "comma" shape or another cleanable shape. In one embodiment, the frame components comprise a stainless steel core with a plastic coating, sleeve or top.

Alternatively, the frame sides may comprise separate components joined together using adhesives or joints to form a hermetically-sealed structure.

Figure 8A:
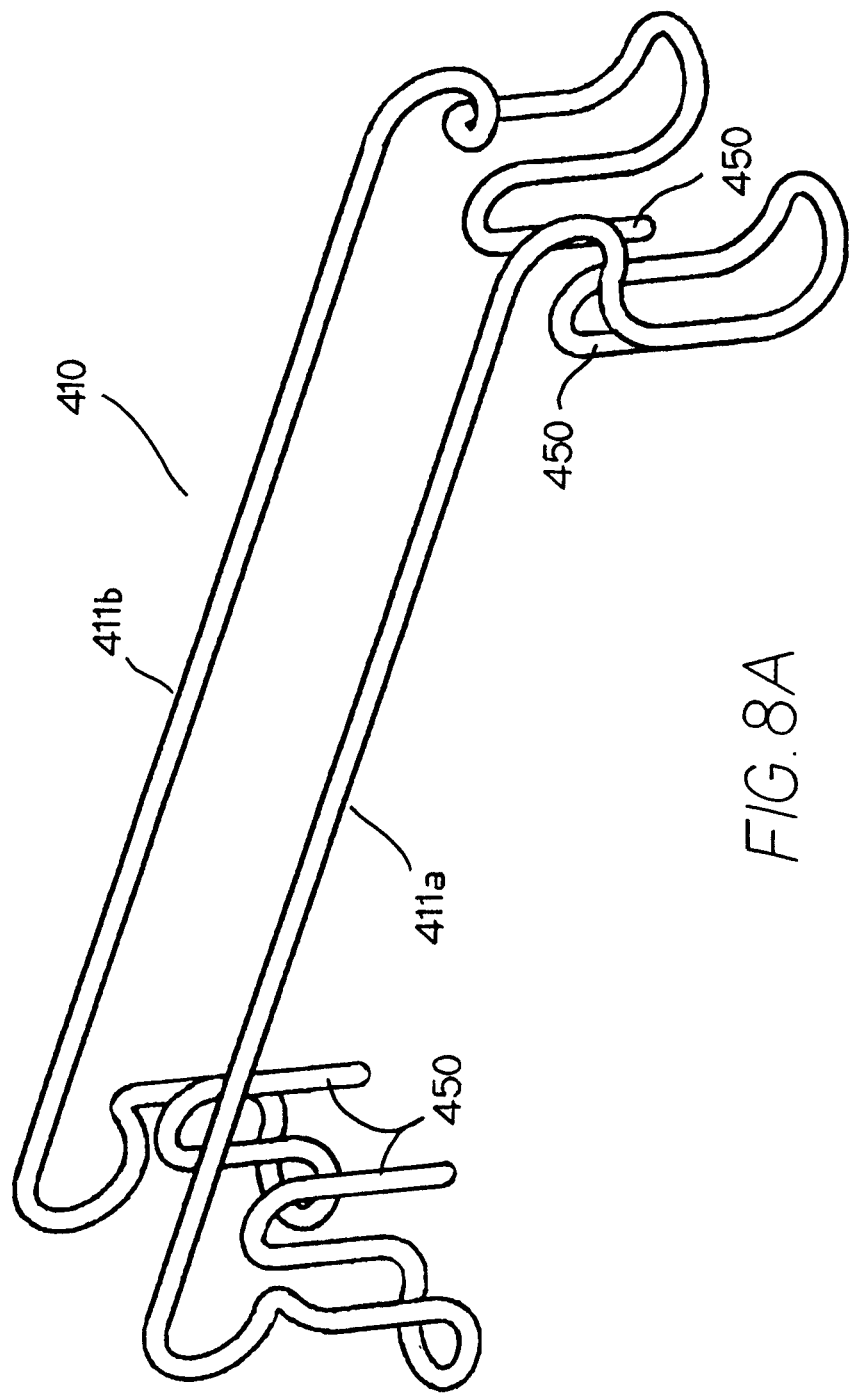
FIG. 8A illustrates another embodiment of a cleanable conveyor frame comprising two frame sides.
Figure 8B:
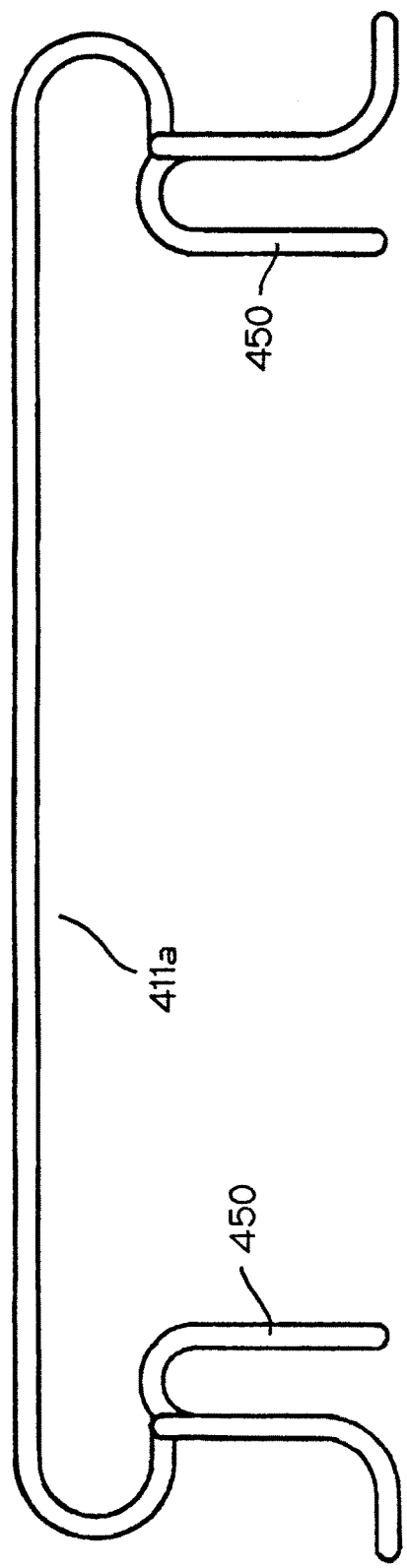
FIG. 8B is a side view of the cleanable conveyor frame of FIG. 8A.

FIGS. 8A and 8B illustrate another embodiment of a cleanable conveyor frame 410. The frame 410 is similar to the frame 310 of FIG. 7, comprising two frame sides 411a, 411b including a longitudinal rail integrated with legs and reversing elements, with the exception that the carryway return rails 450 extend to the floor to provide additional support.

Figure 9A:
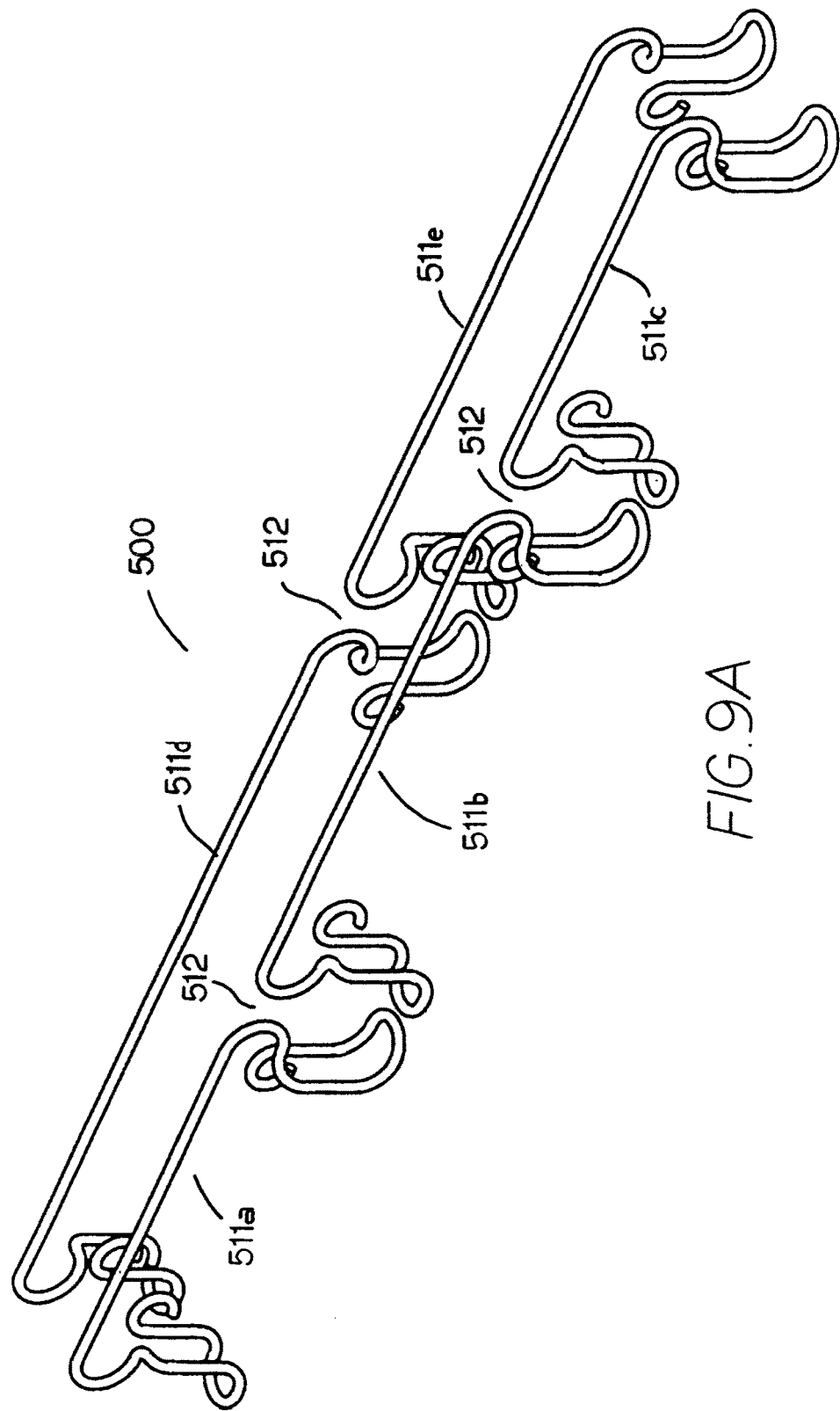
FIG. 9A illustrates an embodiment of a cleanable conveyor frame comprising an arrangement of frame sides.
Figure 9B:
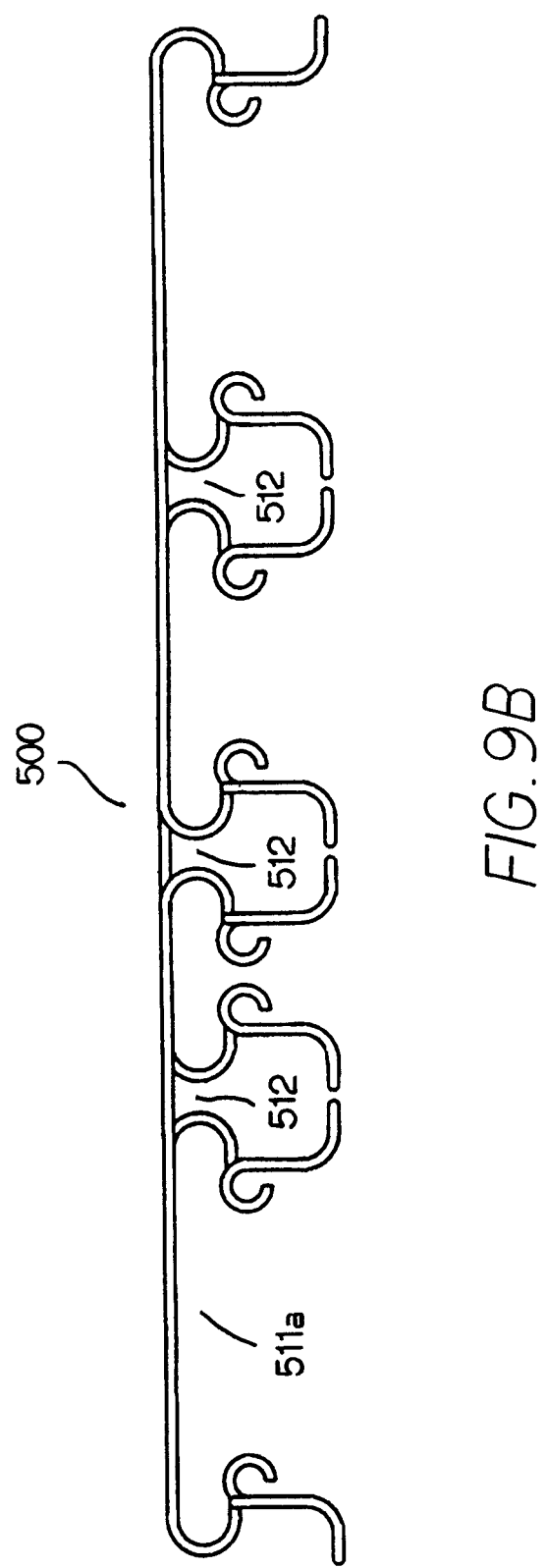
FIG. 9B is a side view of the cleanable conveyor frame of FIG. 9A.

According to one application, shown in FIGS. 9A and 9B, a conveyor frame 500 may comprise an arrangement of frame side sections 511, each including a number of components integrated into one structure, as described above with respect to FIG. 7. For example, a first side of the conveyor frame 500 comprises three frame sides 511a, 511b, 511c arranged in series, while the second side of the conveyor frame comprises two frame sides 511d, 511e in series. The sides are staggered from each other, so that the interface 512 between two frame sides aligns with a solid portion of the opposite frame side. The illustrative frame side sections include legs connected by longitudinal rails forming a carryway, with curved interfaces between different elements.

Figure 10A:
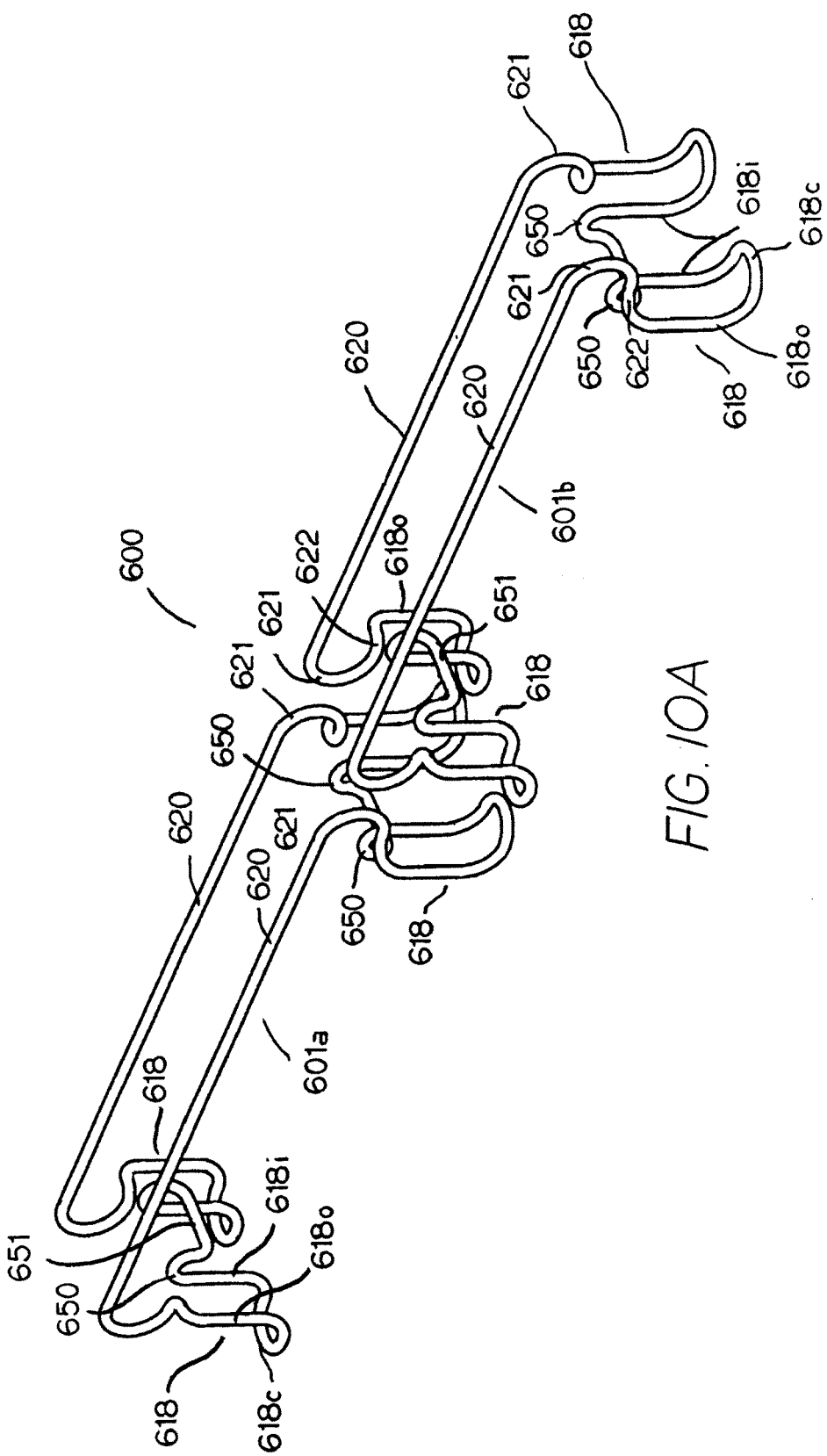
FIG. 10A illustrates an embodiment of a cleanable conveyor frame comprising frame modules arranged in series.
Figure 10B:
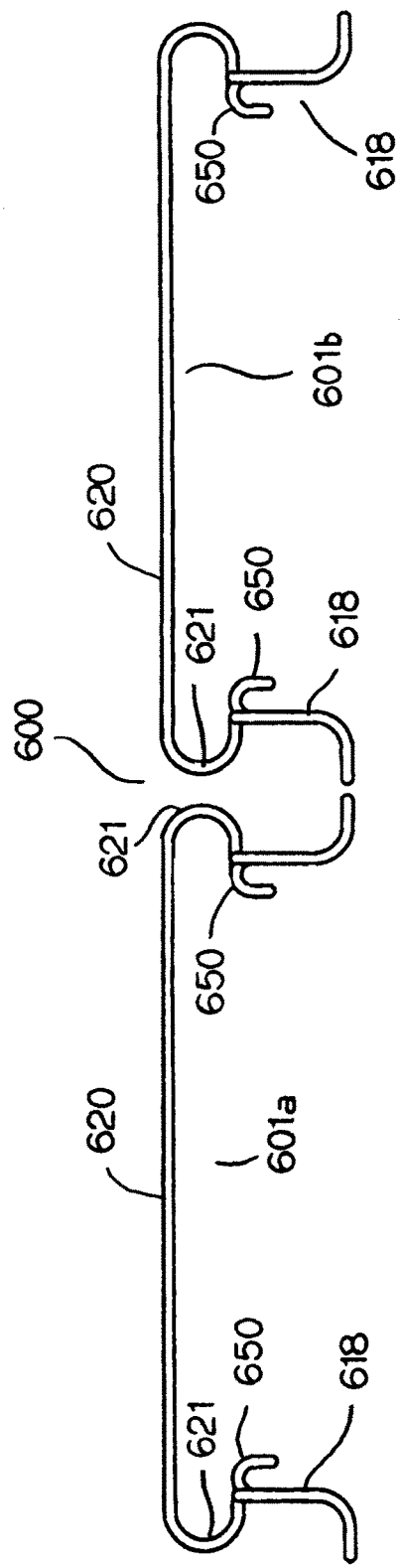
FIG. 10B is a side view of the cleanable conveyor frame of FIG. 10A.

FIGS. 10A and 10B illustrate another embodiment of a cleanable conveyor frame 600, comprising two frame modules 601a, 601b arranged in series. Each frame module 601 comprises longitudinal rails 620 and support legs 618. The longitudinal rails 620 are similar to the longitudinal rails 320 of FIG. 7. The longitudinal rails 620 support a conveyor belt and connect the legs 618, which are similar to the legs 318 of FIG. 7. Each frame module 601 includes curved returnway rail sections 650 and curved end rails 621 forming reversing elements that are integral with the longitudinal rails 620. The curved end rails 621 may be used to mount a sprocket, roller, drum, motor or other device. Alternatively, the curved end rails 621 may simply guide a conveyor belts from the carryway to the returnway. The illustrative legs 618 each comprise an inner leg portion 618i, an outer leg portion 618o and a curved base 618c connecting the leg portions. Curved connectors 622 extend between the outer leg portions 618o and curved end rails 621. In the embodiment of FIG. 10A, lateral connecting rails 651 connect the returnway rails 650 at each end, connecting the frame sides. The illustrative frame modules 601a, 601b are unitary, monolithic structures formed of continuous rails with fluid, curved connections to facilitate cleanliness. A single piece of rod stock may be bent in multiple directions to form each frame module 601a, 601b, or a portion of each frame module 601a and 601b. Alternatively, the frame modules 601a, 601b may be formed from separate structures joined together, with the joints hermetically sealed.

Figure 11A:
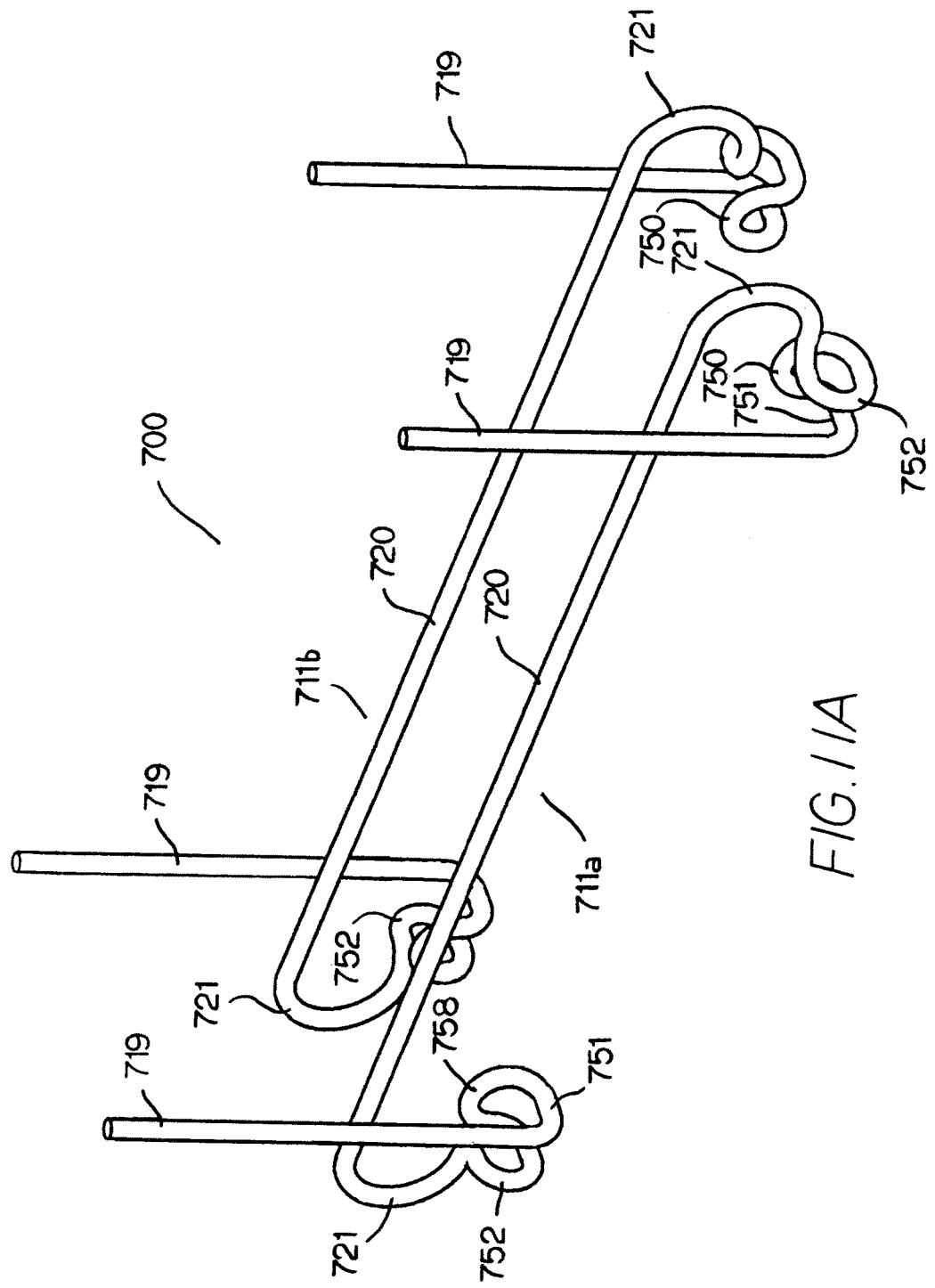
FIG. 11A illustrates a cleanable conveyor frame including vertical suspension rails for suspending the frame from an overhead structure.
Figure 11B:
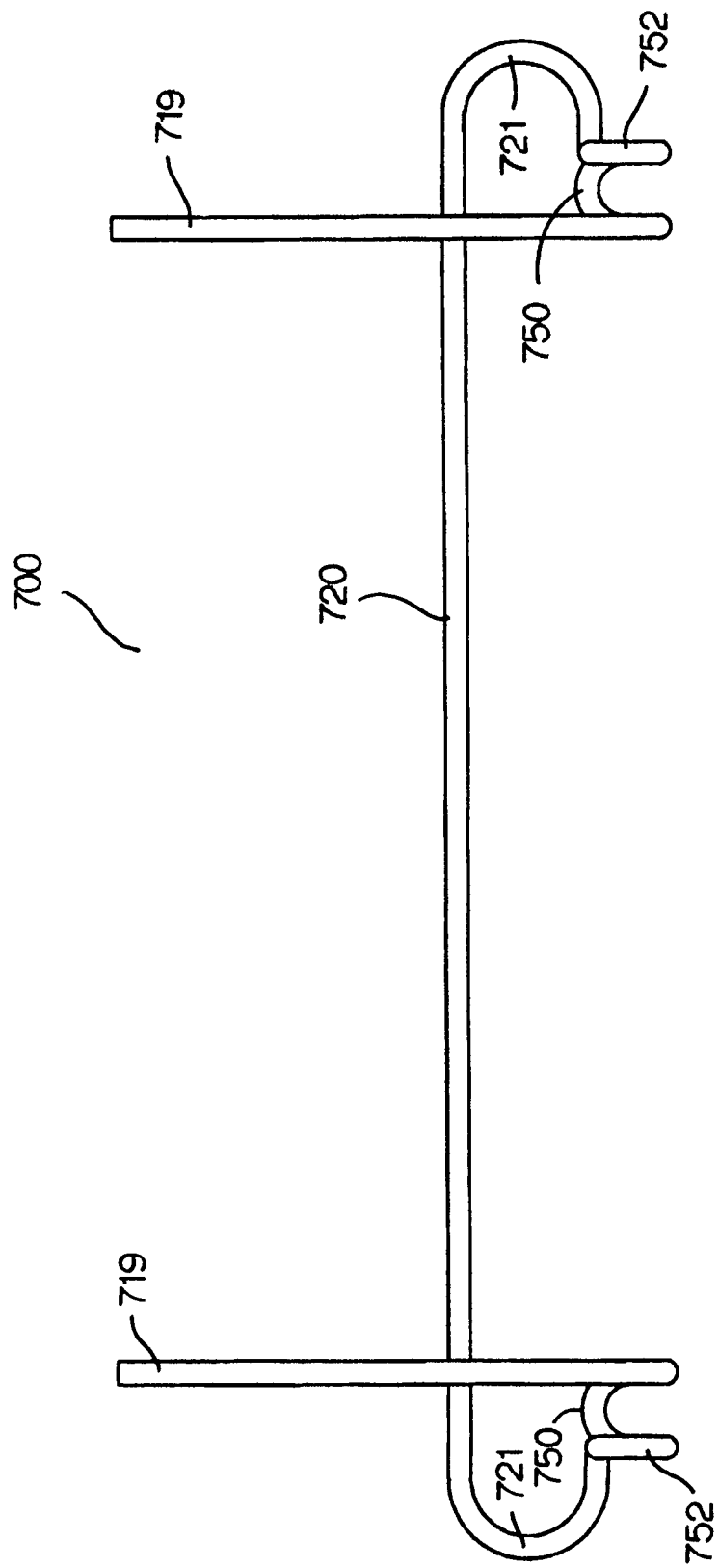
FIG. 11B is a side view of the cleanable conveyor frame of FIG. 11A.

According to another embodiment of the invention a cleanable conveyor frame may be suspended from a ceiling or overhead support, rather than a floor-based support, such as a leg. For example, FIGS. 11A and 11B show an embodiment of a cleanable conveyor frame 700 that is suspended from a ceiling or overhead support. The frame 700 comprises a first frame side 711a and a second frame side 711b. Each frame side includes a longitudinal rail 720 forming a carryway support and substantially vertical suspension rails 719 outside of the longitudinal rails 720 at each end of the frame. The suspension rails 719 hang from a ceiling or other overhead support structure. Additional suspension rails may be located at intermediate locations along the frame. The ends of each longitudinal rail 720 curve to form a u-shaped reversing element 721. The bottoms of the suspension rails 719 curve laterally inwards to form a returnway connector 751 which turns longitudinally outwards at the top to form u-shaped returnway rails 750. A u-shaped longitudinally outer returnway connector 752 connects the returnway rails to the curved longitudinal rail ends 721. As shown, the cleanable conveyor frame comprises components that are connected through curved connectors to form unitary structures, and the longitudinal rails form support structure for the frame as well as elements of the carryway. Each frame side may be formed of a single piece of stock bent in multiple directions, or from multiple structures coupled together with hermetically-sealed joints.

Figure 12A:
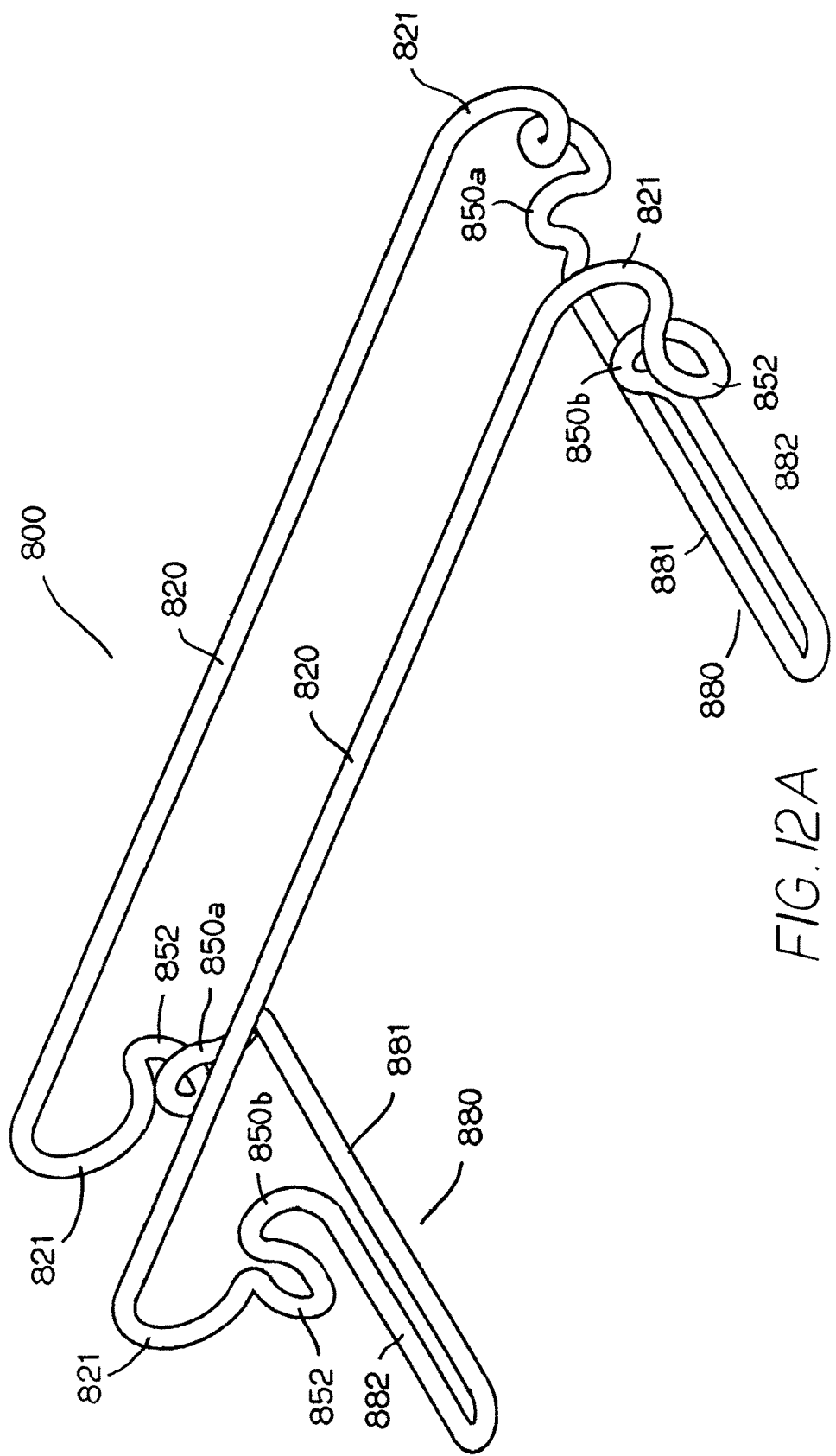
FIG. 12A illustrates a cleanable conveyor frame including cantilever supports for suspending the frame from a side structure.
Figure 12B:
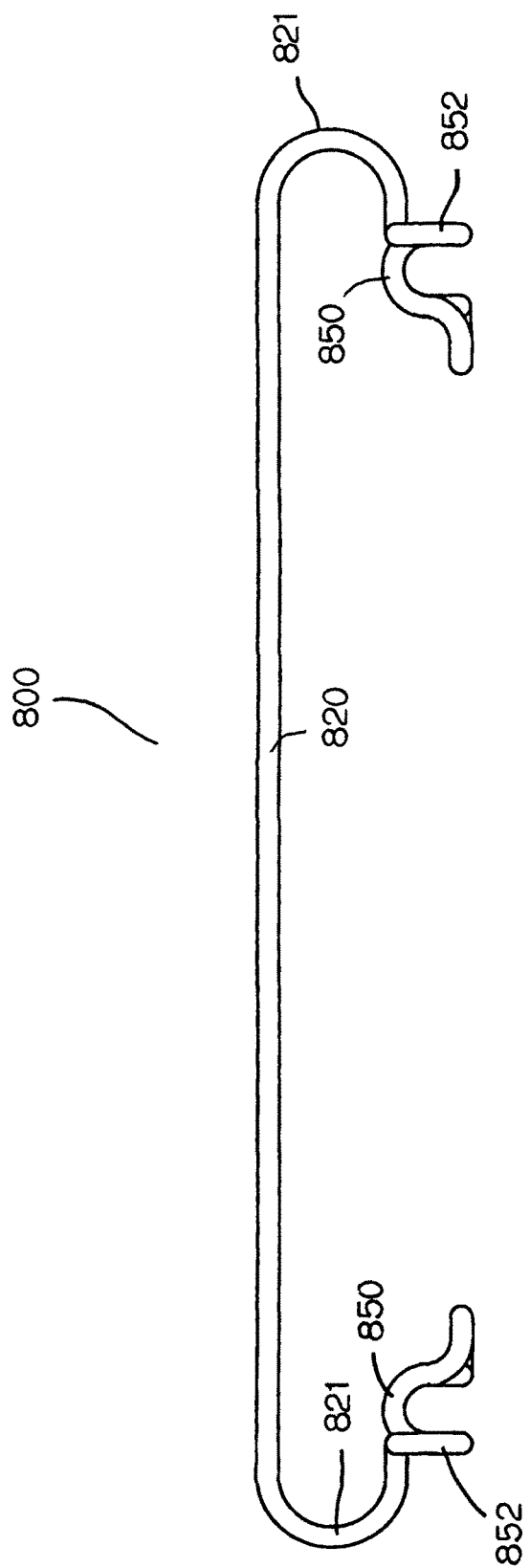
FIG. 12B is a side view of the cleanable conveyor frame of FIG. 12A.

According to another embodiment of the invention, a cleanable conveyor frame may be cantilevered and extend from a wall or side support. For example, FIGS. 12A and 12B illustrate an embodiment of a cleanable conveyor frame 800, including cantilever supports. The frame 800 includes a pair of parallel longitudinal rails 820 extending from a first end of the frame to a second end of the frame and forming a carryway for a conveyor belt. The ends of each longitudinal rail curve to form u-shaped reversing elements 821. At the bottom, the u-shaped reversing elements 821 turn laterally outwards into u-shaped returnway connectors 852. The laterally inner end of the u-shaped returnway connectors twist and connect to u-shaped returnway rails 850. The bottom, longitudinally inner ends of the u-shaped returnway rails connect to cantilever rails 880, which connect to a wall or side support for supporting the conveyor frame 800.

The cantilever rails 880 are u-shaped and include an inner cantilever rail 881 that connects to the far returnway rails 850a and an outer cantilever rail 882 that connects to return rails 850b that are closer to the wall or side support supporting the frame 800. The illustrative frame 800 is formed of a continuous piece that is bent in multiple dimensions to form a monolithic structure. The frame 800 preferably lacks sharp corners, edges, joints or interfaces to promote cleanability.

Figure 13B:
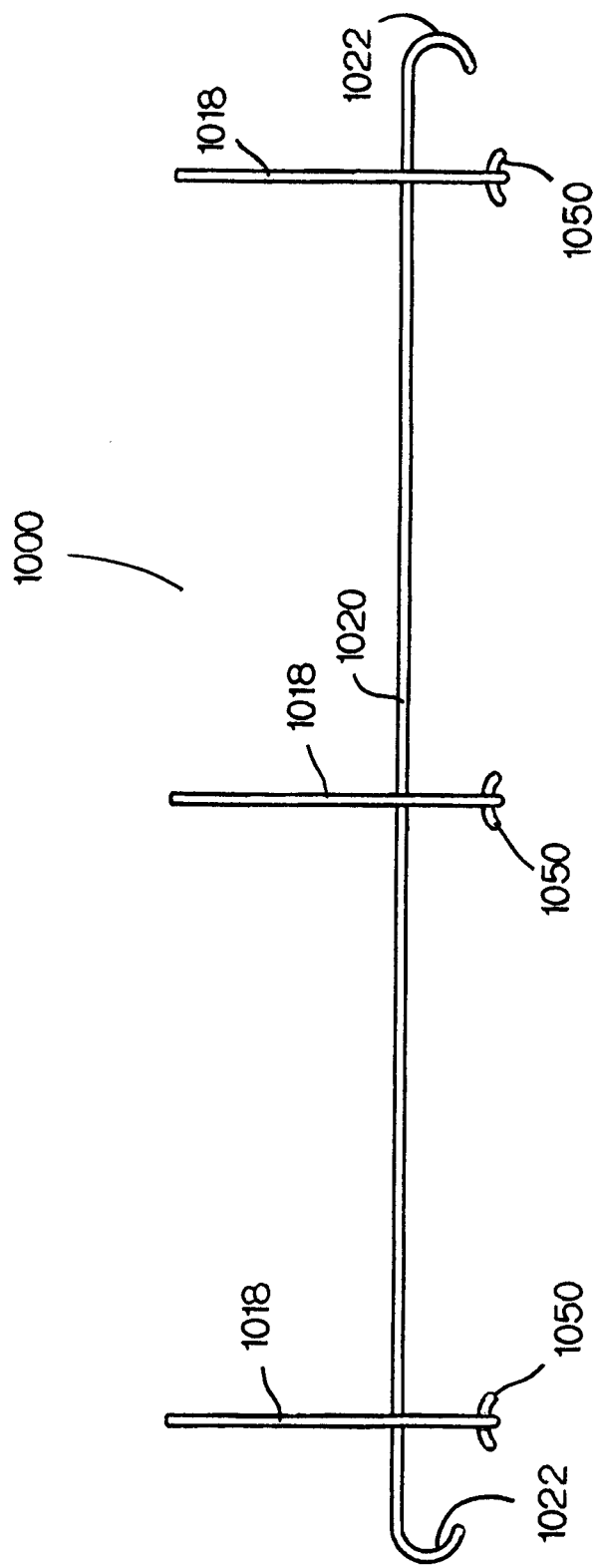
FIG. 13B is a side view of the suspended conveyor frame of FIG. 13A.

FIGS. 13A and 13B illustrate another embodiment of a suspended conveyor frame 1000. In the frame 1000 of FIGS. 13A and 13B, the carryway support and returnway support are integrated with the frame structure. The integrated frame comprises a pair of longitudinal rails 1020 extending from a first end of the conveyor frame to a second end of the conveyor frame. The longitudinal rails 1020 form sides of a carryway for guiding a conveyor belt. The frame 1000 also includes plurality of pairs of substantially vertical suspension rails 1018 extending down from a ceiling or overhead support structure. Each pair of suspension rails is connected by a lateral support rail 1022 continuous with the suspension rails. Lateral suspender connectors 1019 extend outward from the longitudinal rails 1020 to connect the longitudinal rails to the suspension rails 1018. Arched rails 1050 intersect the lateral support rails 1022 to form a returnway for a conveyor belt. The ends of the longitudinal rails 1020 curve to form integral reversing elements 1021 for the conveyor belt.

Figure 14A:
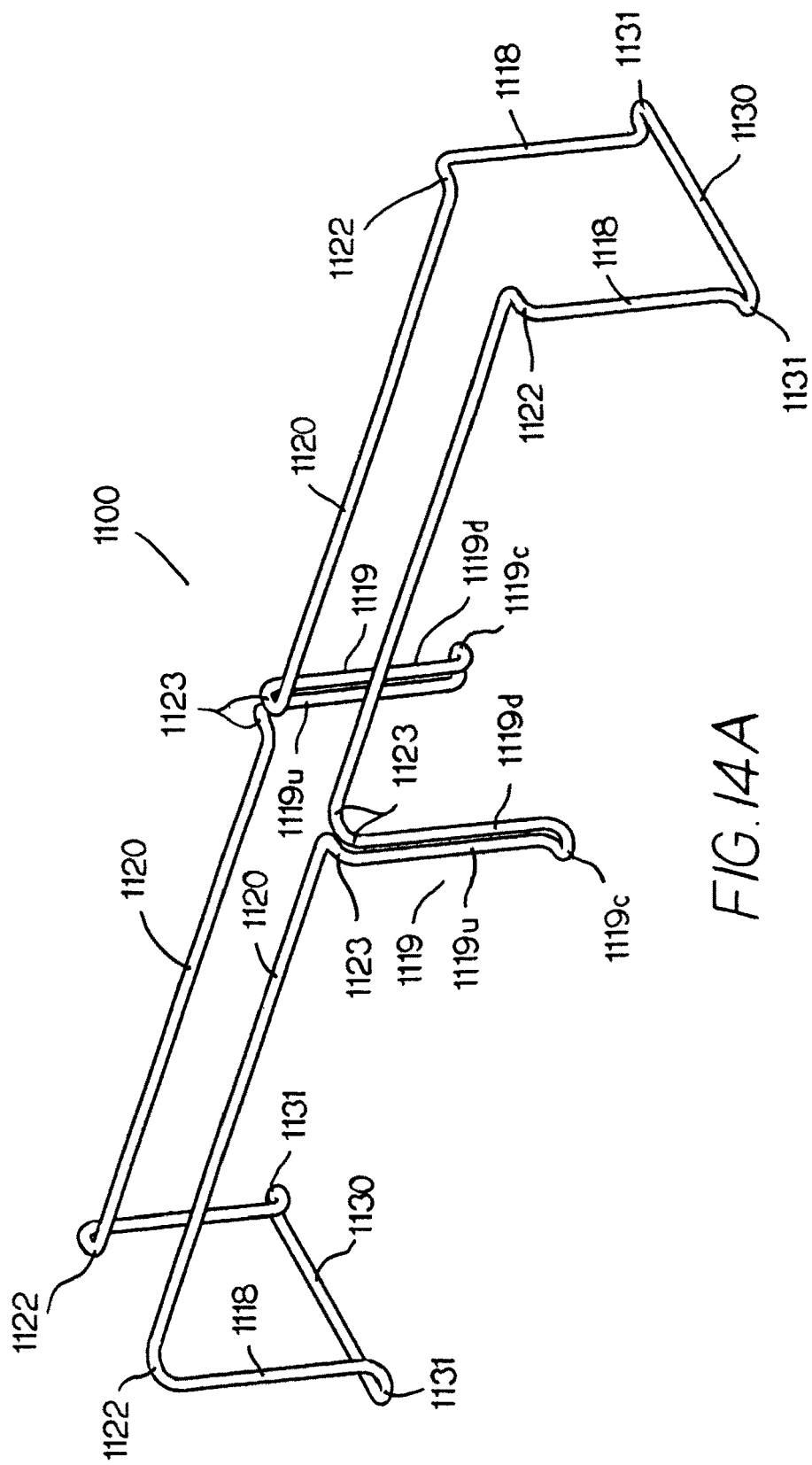
FIG. 14A illustrates another embodiment of a cleanable conveyor frame including an integrated carryway and components connected through curvaceous connectors.
Figure 14B:
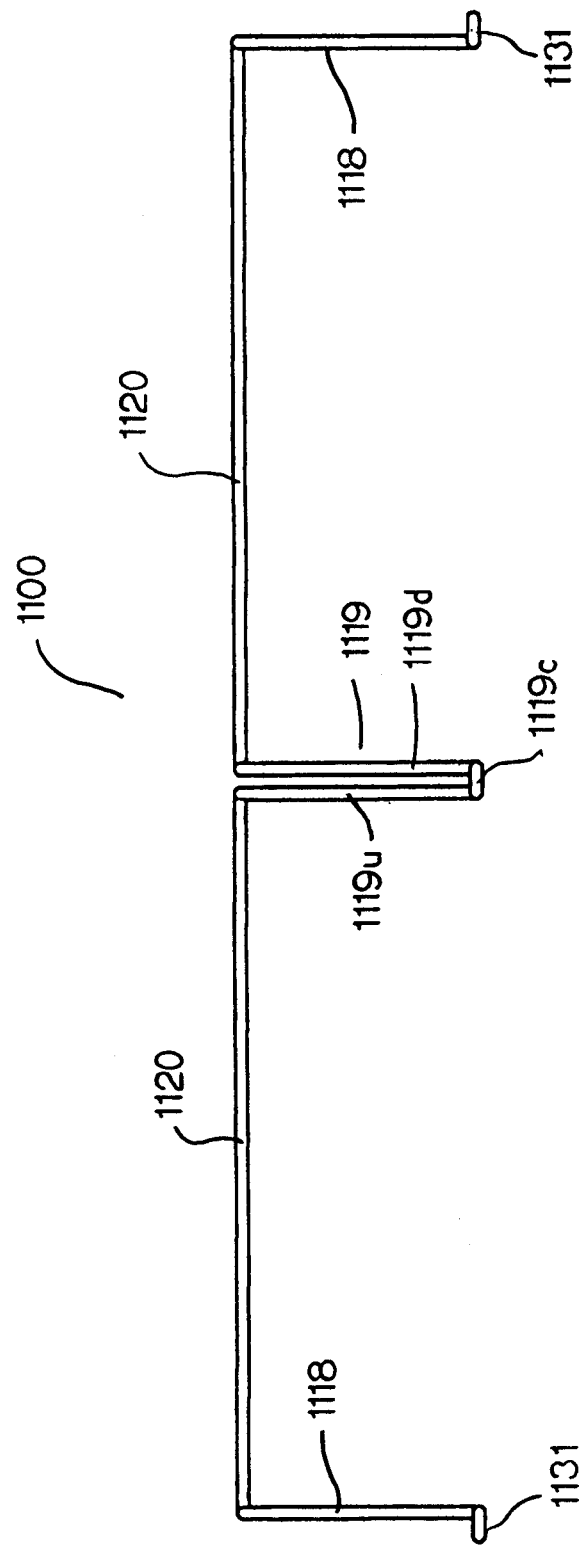
FIG. 14B is a side view of the cleanable conveyor frame of FIG. 14A.

FIGS. 14A and 14B illustrate another embodiment of a cleanable conveyor frame 1100. The conveyor frame 1100 comprises four longitudinal rails 1120 that form a carryway to support a conveyor belt. The conveyor frame also comprises end legs 1118 and central legs 1119, which connect to the longitudinal rails 1120. The longitudinal rails 1120 form support structure for the frame in addition to defining a carryway. A curved, laterally extending connector 1122 connects the top of each end leg 1118 to an end of an associated longitudinal rail 1120. The intersection between the legs 1118, longitudinal rails 1120 and connectors 1122 are curved, rather than angled to form effectively continuous members. A laterally extending leg base 1130 extends between end legs 1118 at each end of the frame. A u-shaped leg-base connector 1131 connects the laterally extending leg base 1130 to the bottom of each leg 1118 to provide stability to the frame.

The central legs 1119 comprise a pair of parallel rails 1119u, 1119d connected at the bottom by a u-shaped base connector 1119c. Lateral rail connectors 1123 connect the tops of the leg rails 1119u, 1119d to the longitudinal rails. The central legs act as intermediate supports and for long run conveyors. The conveyor frame 1100 may have multiple sets of central legs 1119 staggered along the length of the conveyor.

The cleanable conveyor frame 1100 includes multiple integrated components connected by curved interfaces, forming a continuous structure to facilitate cleanliness. Preferably, each component has a cross-sectional shape formed by a plurality of arcs, such as a round, oval or teardrop-shaped cross-section, or a rounded I-beam cross-section. A single piece of stock or multiple pieces of stock may be bent in multiple directions to form the frame 1100.

Figure 15A:
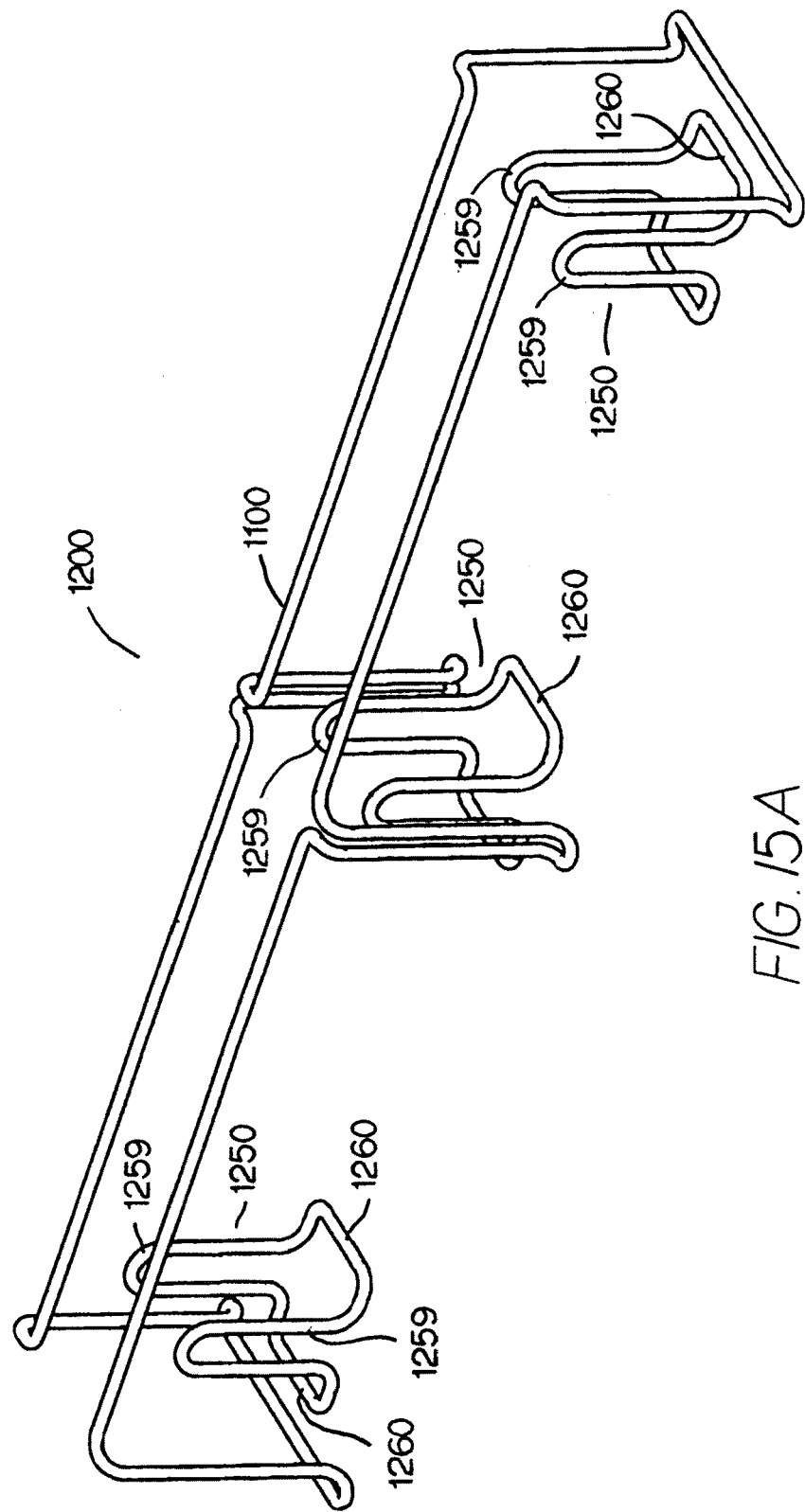
FIG. 15A shows the frame of FIGS. 14A and 14B with additional returnway supports.
Figure 15B:
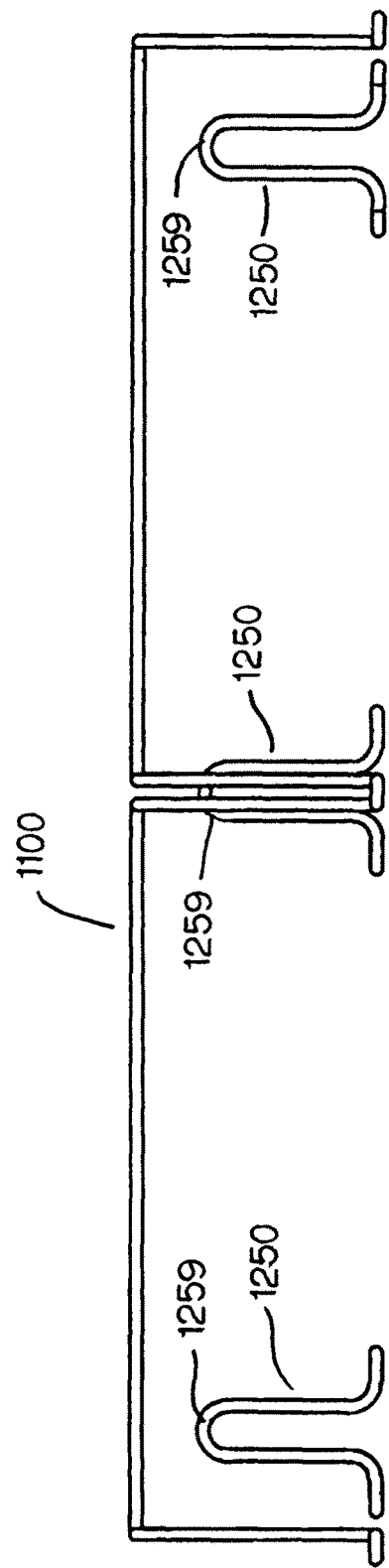
FIG. 15B is a side view of the frame of FIG. 15A.

FIGS. 15A and 15B illustrate another embodiment of a cleanable conveyor frame 1200. The frame of FIGS. 15A and 15B includes a first section comprising main conveyor frame 1100, which in the illustrative embodiment is the same as the frame 1100 of FIGS. 14A and 14B. The frame 1200 further includes three sets of returnway supports 1250. Each returnway support 1250 comprises a pair of u-shaped returnway legs 1259 and laterally extending bases 1260 extending between the returnway legs 1259. The conveyor belt rests on and is supported by the curved tops of the u-shaped returnway legs 1259. The interfaces between the bases 1260 and legs are preferably curved, and the base 1260 may be offset from the ends of the returnway legs 1259. The base 1260 may be independently, self-supported modules, or be bolted to the floor or other support structure for the frame 1200. The returnway supports 1250 are unitary structures with curved connections, formed by continuous rails having cross-sections comprising a plurality of arcs, such as round, oval or teardrop-shaped cross-sections. The independent returns are not limited to use with the frame shown as 1200.

In the illustrative embodiments of FIGS. 1-15B, several conveyor frame components are integrated and continuous to form unitary structures. The components may be stainless steel shafts welded or otherwise joined together, plastic shafts, a combination of plastic and steel, or formed of another suitable material. The interfaces between different components are preferably curvaceous. The conveyor frame may be formed by bending one continuous piece of material to form several or all components without requiring separate connectors. Alternatively, joints or adhesives may be used to joint different components together, forming a hermetically sealed structure.

Figure 16:
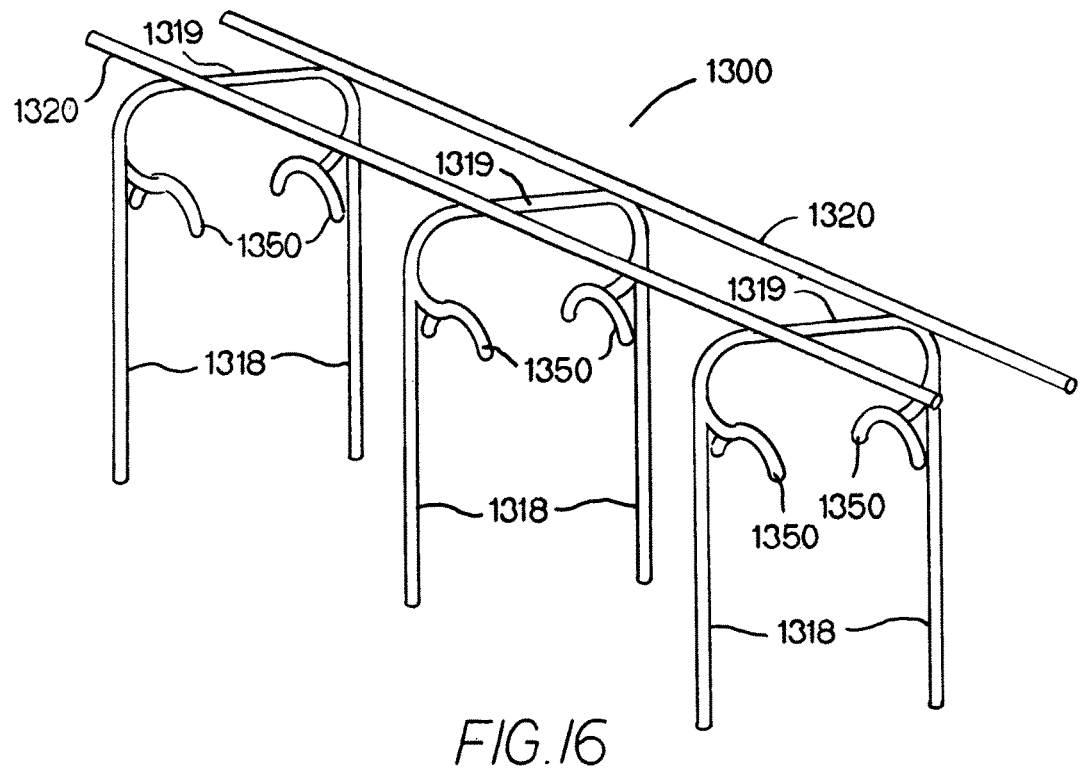
FIG. 16 illustrates an embodiment of a cleanable conveyor frame including an integrated carryway.
Figure 17:
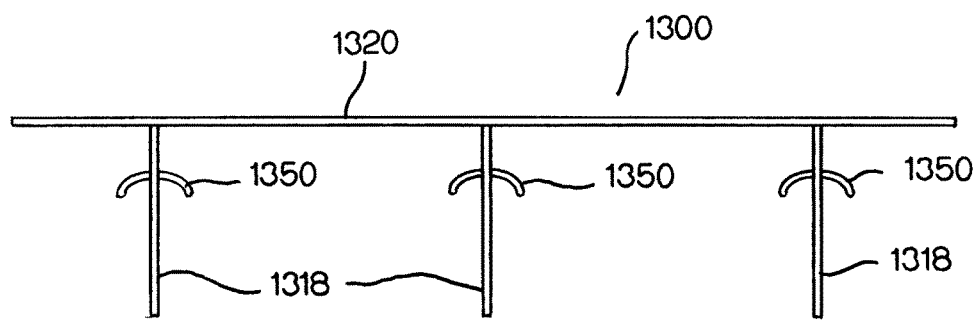
FIG. 17 is a side view of the frame of FIG. 16.
Figure 18:
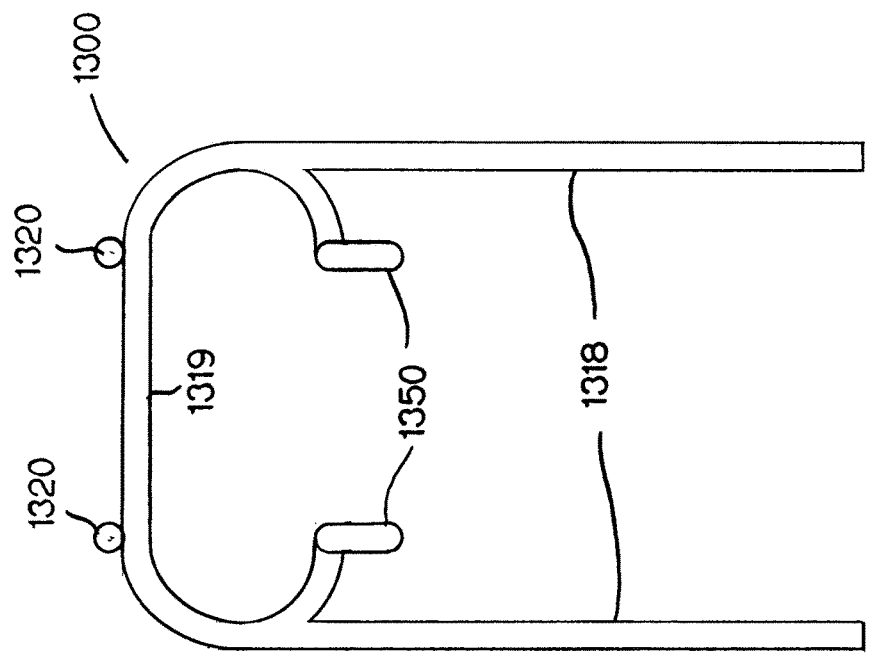
FIG. 18 is a front view of the frame of FIG. 16.

FIGS. 16-18 shows another embodiment of a cleanable, integrated conveyor frame 1300 having a carryway support that also forms support structure for the frame and is integrated with the frame. The integrated frame comprises a plurality of legs 1318. Each pair of legs is connected by a lateral support rail 1319 continuous with the legs. Longitudinal rails 1320 above the lateral supports 1319 connect the legs and provide support for the frame. The longitudinal rails 1320 span the length of the frame and form a carryway for guiding a conveyor belt. The ends of the longitudinal rails 1320 may curve to form reversing elements (not shown). Lower curved rails 1350 connected to the legs and-or lateral support 1319 form a returnway support for the conveyor belt.

Figure 19:
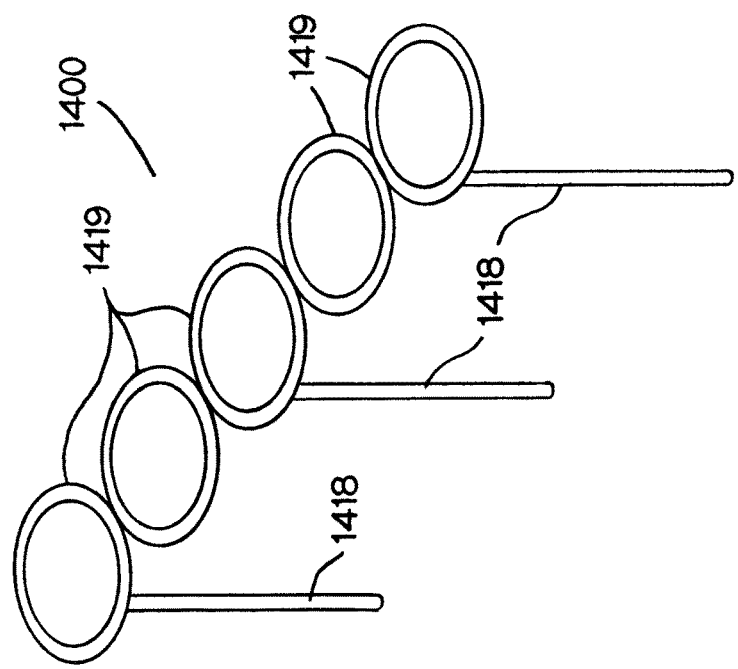
FIG. 19 illustrates a cleanable conveyor frame having an integrated carryway and frame.

FIG. 19 illustrates another embodiment of a cleanable frame having an integrated carryway and frame. The cleanable frame 1400 comprises a plurality of legs 1418 connected by carryway rails 1419. The carryway rails are arranged in connecting circles and support a conveyor belt traveling over the frame 1400.

Figure 20:
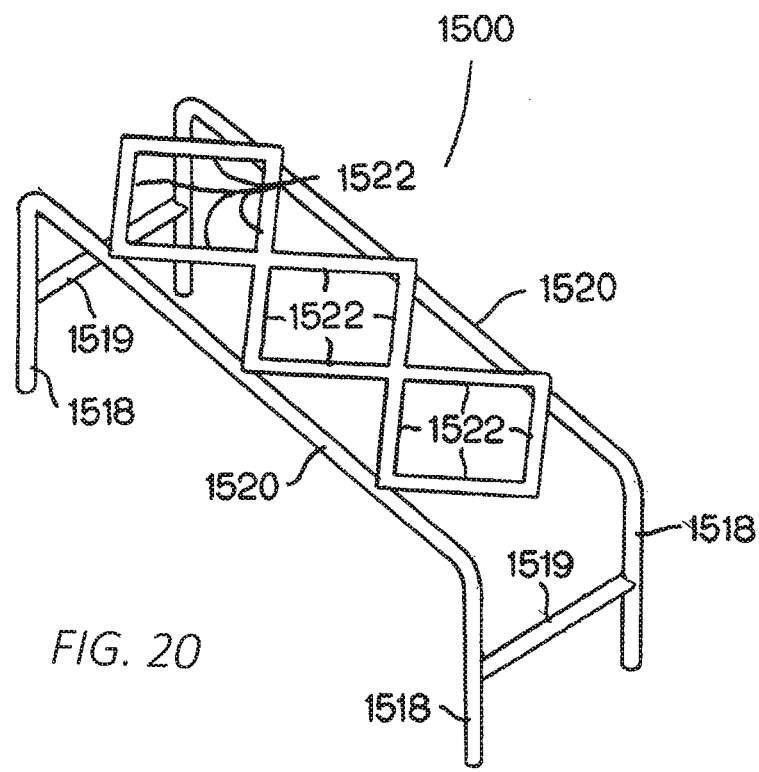
FIG. 20 illustrates another embodiment of a cleanable conveyor frame having an integrated carryway and frame.

FIG. 20 illustrates another embodiment of a cleanable frame having an integrated carryway and frame. The frame 1500 comprises a plurality of legs 1518, lateral supports 1519 and longitudinal supports 1520. The longitudinal supports 1520 may also define edges of the carryway. Carryway rails 1522 extend transversely between the longitudinal supports and form a pattern of connected diamonds.

Figure 21:
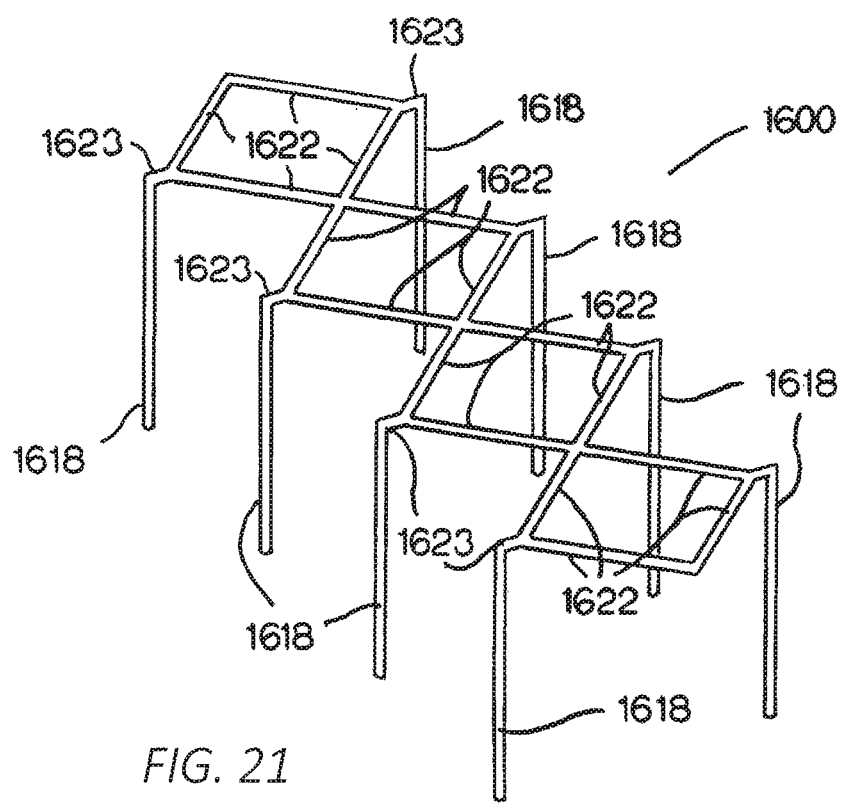
FIG. 21 illustrates another embodiment of a cleanable conveyor frame having an integrated carryway and frame.

FIG. 21 illustrates another embodiment of a cleanable frame 1600 with an integrated carryway. Frame 1600 comprises a plurality of legs 1618 along each side of the frame. Transverse carryway rails 1622 connect the legs in a diamond pattern and form carryway structure for a conveyor belt. Short horizontal connectors 1623 extend between the side corners of the diamonds and each leg space the legs from the transverse carryway rails. The carryway rails in addition to forming the carryway, form support structure for the frame.

Figure 22:
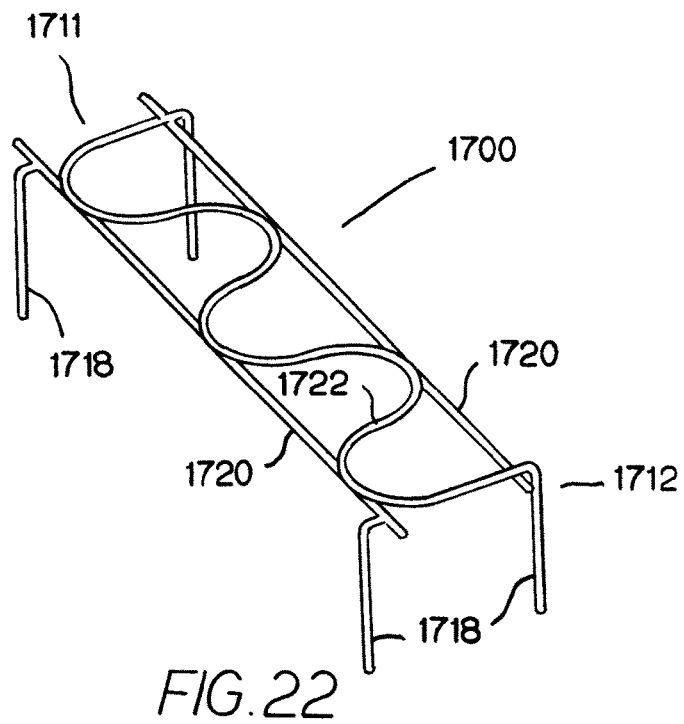
FIG. 22 illustrates another embodiment of a cleanable conveyor frame having an integrated carryway.

FIG. 22 illustrates another embodiment of a cleanable frame 1700 with an integrated carryway. The cleanable frame 1700 comprises legs 1718 and longitudinal connecting rails 1720 forming side edges of the carryway for supporting a conveyor belt. The longitudinal connecting rails 1720 comprise rails extending between the first end 1711 and the second end 1712 of the frame. The legs may include a top bend to space the legs from the longitudinal connecting rails 1720. A sinusoidal carryway rail 1722 extends between the longitudinal connecting rails 1720 to support both the conveyor belt and the frame structure. Alternatively, the longitudinal connecting rails may be omitted, and the sinusoidal carryway rail 1722 may directly connect and support the legs 1718 as well as the conveyor belt.

Figure 23:
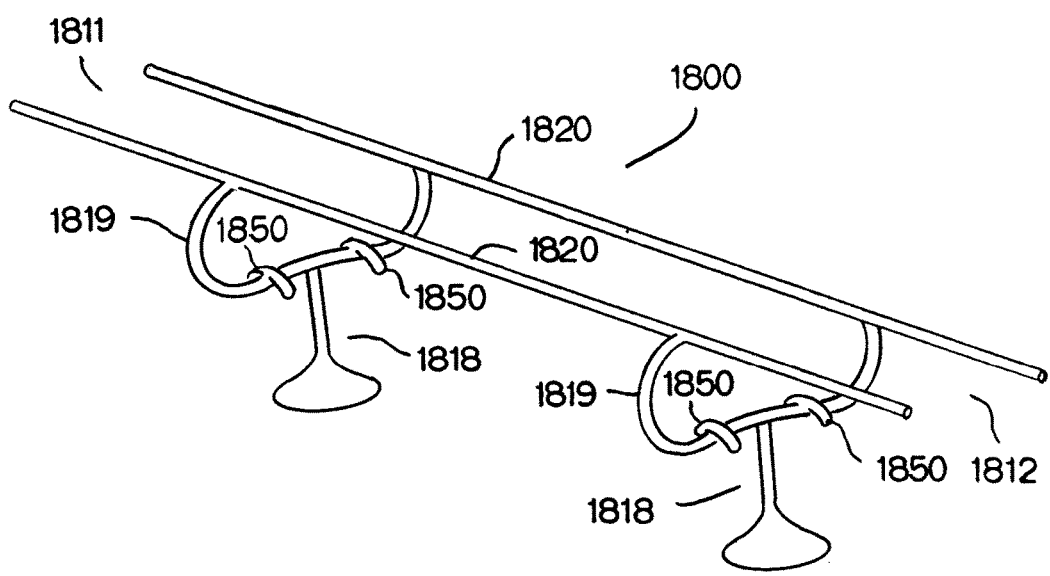
FIG. 23 illustrates another embodiment of a cleanable conveyor frame.

FIG. 23 illustrates another embodiment of a conveyor frame and integrated carryway system 1800 according to another embodiment of the invention. The legs 1818 in the frame 1800 are pedestal stand style and are located along the lateral middle of the frame. A substantially C-shaped rail 1819 extends laterally across the top of each leg. Longitudinal rails 1820 connect the legs and extend from the first end 1811 to the second end 1812 to form a carryway for supporting a conveyor belt. The longitudinal rails may be curved at the ends to form reversing elements for the conveyor belt. Curved returnway rails 1850 intersect the C-shaped rail 1818 to form a returnway for the conveyor belt.

FIGS. 24-35 are front views of various alternative embodiments of integrated conveyor frames with carryways. The embodiments of FIGS. 24-35 are designed to minimize the connections, such as weld points, between different components. Each frame includes at least one leg, a lateral connector, a longitudinal connector forming a carryway edge for supporting the conveyor belt and a returnway rail for guiding the conveyor belt.

Figure 24:
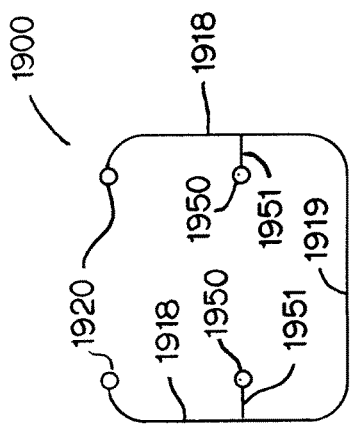
FIG. 24 is a front view of a cleanable conveyor frame design with minimal connections between components according to one embodiment of the invention.

As shown in FIG. 24, a lateral connector extending between legs may be a base connecting the feet of two paired legs. Referring to FIG. 24, a frame 1900 comprises lateral connectors 1919 forming a base and a plurality of legs 1918 extending up from each end of each lateral connector 1919. A longitudinal rail 1920 forming a carryway edge connects the tops of the legs 1918 on each side of the frame. At an intermediate portion of each leg, a returnway connector 1951 extends inwards. Returnway rails 1950 are connected to the returnway connectors. The returnway rails may be a continuous rail extending between multiple legs, or a single rail, preferably arched, connected to each leg, as shown in FIG. 1. The longitudinal rails 1920 may have integral curved ends to form reversing elements.

Figure 25:
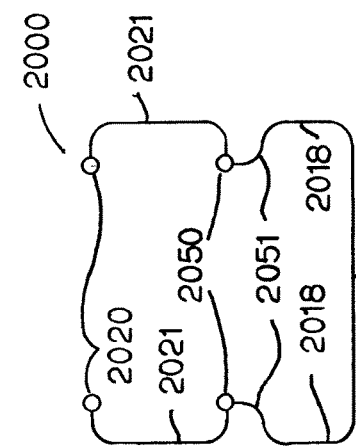
FIG. 25 is a front view of a cleanable conveyor frame design with minimal connections between components according to another embodiment of the invention.

Referring to FIG. 25, in another embodiment of a cleanable frame 2000, returnway rails 2050 may connect to a curved connector 2051 extending inwards from the tops of legs 2018. Each pair of legs 2018 is connected by a lateral connector 2019 extending between the feet of the two paired legs. Curved upper connectors 2021 extend from the return rails 2050. Longitudinal rails 2020 extend from a first end to a second end of the frame and connect to the ends of the curved upper connectors 1021. The longitudinal rails 2020 form the carryway for a conveyor belt and may include curved ends to form integral reversing elements for the conveyor belt.

Figure 26:
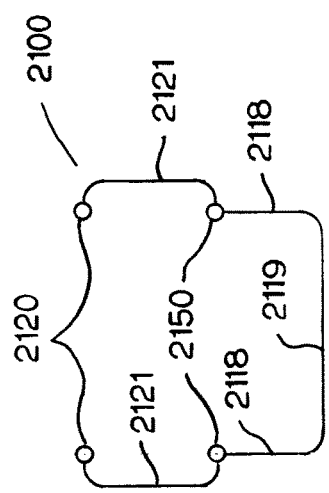
FIG. 26 is a front view of a cleanable conveyor frame design with minimal connections between components according to another embodiment of the invention.

The frame 2100 of FIG. 26 is similar to the frame of FIG. 25, except the legs 2118 extend vertically and directly connect to returnway rails 2150. The upper portion of the frame, formed by the curved upper connector 2121 extending from the returnway rails 2150 and longitudinal rails 2120, is wider than the lower portion, formed by the legs 2118 and lateral connector 2119 extending between the feet of each pair of legs. Each pair of legs 2118 and lateral connector may be formed by a single curved or bent rail. The longitudinal rails 2120 may include curved ends forming reversing elements.

Figure 27:
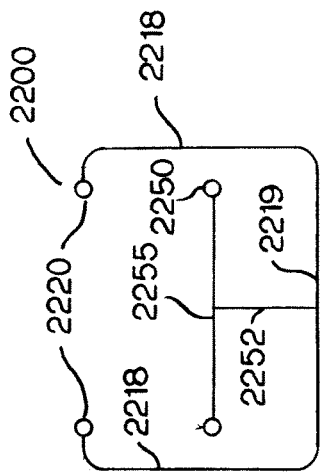
FIG. 27 is a front view of a cleanable conveyor frame design with minimal connections between components according to another embodiment of the invention.

As shown in FIG. 27, in another embodiment, a frame 2200 comprises pairs of legs 2218 extending vertically, with each pair of legs connected by a lateral base connector 2219, and returnway structure extending from the lateral connector 2219. The returnway structure comprises a returnway leg 2252 extending from the lateral connector 2219, a lateral returnway connector 2255 extending perpendicular to the returnway leg 2252 and returnway rails 2250 formed at the ends of the lateral returnway connector 2255. Longitudinal rails 2220 connect the tops of the legs 1218 at each side to form a carryway for a conveyor belt as well as support structure for the frame. The longitudinal rails 2220 may include curved ends forming reversing elements.

Figure 28:
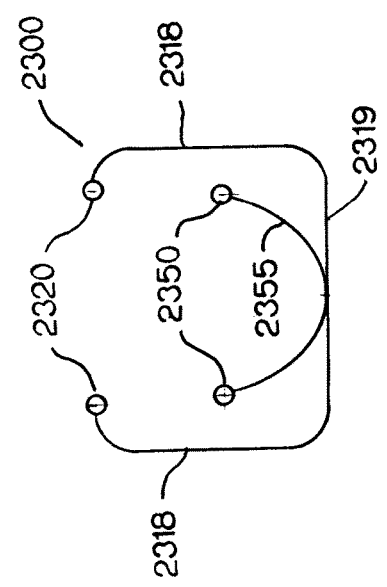
FIG. 28 is a front view of a cleanable conveyor frame design with minimal connections between components according to another embodiment of the invention.

Referring to FIG. 28, in another embodiment of a cleanable frame 2300, the returnway support and lateral returnway connector comprise a single curved rail 2355. The middle of the curved returnway connector rail connects to a lateral base rail 2319 extending between legs 2318. Returnway rails 2350 connect to the top of the curved rail 2355. Longitudinal carryway rails 2320 connect the tops of the legs 2318 at each side and may include curved ends to form integral reversing elements.

Figure 29:
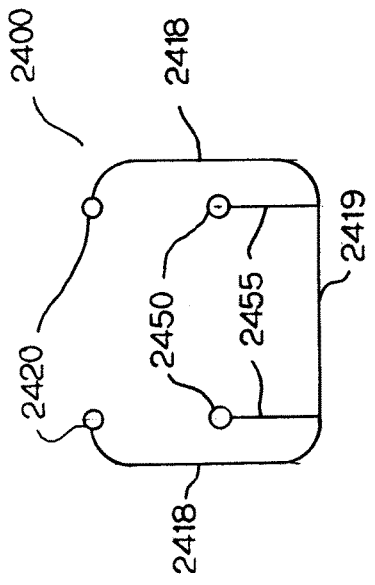
FIG. 29 is a front view of a cleanable conveyor frame design with minimal connections between components according to another embodiment of the invention.

As shown in FIG. 29, another embodiment of a cleanable frame 2400 includes vertical returnway legs 2455 extending from a lateral base rail 2419 extending between legs 2418. Returnway rails 2450 connect to the top of the vertical returnway legs 2455. Longitudinal carryway rails 2420 connect the tops of the legs 2418 at each side to support the frame and form a carryway. The longitudinal rails 2420 may curve at the ends to form reversing elements for the conveyor belt.

Figure 30:
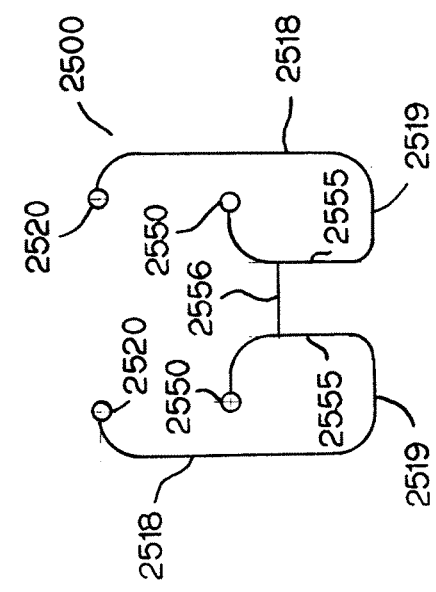
FIG. 30 is a front view of a cleanable conveyor frame design with minimal connections between components according to another embodiment of the invention.

FIG. 30 illustrates another front view of a cleanable frame 2500. The cleanable frame 2500 comprises legs 2518 and lateral connectors 2519 extending inwards from the feet of the legs. Returnway legs 2555 extend up from the lateral connectors and curve out. Returnway rails 2550 connect to the tops of the returnway legs 2555. A returnway lateral connector 2556 extends between each pair of returnway legs 2555 to provide additional support. Longitudinal carryway rails 2520 connect the tops of the legs 2518 at each side and may include integral curved reversing elements.

Figure 31:
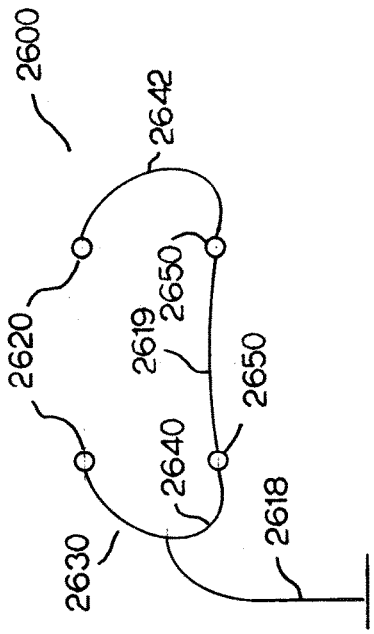
FIG. 31 is a front view of a cleanable conveyor frame design with minimal connections between components according to another embodiment of the invention.

FIG. 31 shows another embodiment of a cleanable frame 2600, comprising pedestal legs 2618 along a first side edge of the frame. The legs 2618 curve towards a center of the frame and connect to an integrated conveyor belt support 2630. The integrated conveyor belt support 2630 includes C-shaped side rail connectors 2640, 2642. Each left connector 2640 connects to the end connects to the end of each leg 2618. Longitudinal rails 2620 extend across each side of the frame and connect to the tops of the side rail connectors, and returnway rails 2650 connect to the bottoms of the side rail connectors. The longitudinal rails may include integral curved reversing elements, as previously described. Lateral returnway connectors 2619 extend between each pair of returnway rails 2650 to connect the side rail connectors.

In another embodiment, shown in FIG. 32, a cleanable frame 2700 may have an S-shape. The frame 2700 includes lateral base rails 2719, legs 2718, a middle lateral rails 2721, curved side rails 2740 and top lateral rails 2741. Longitudinal rails 2720 extending from a first end to a second end along the top of the frame form a carryway support and returnway rails 2750 form a returnway support for the conveyor belt. The longitudinal rails may include integral curved reversing elements.

As shown in FIG. 33, in another embodiment, a frame 2800 may have lateral base rails 2819, legs 2818 along a first side of the frame, curved side connectors 2840, 2842 for longitudinal rails 2820 (with integral curved reversing elements), returnway rails 2850, and middle lateral connectors 2821.

FIG. 34 illustrates a frame 2900 in which the legs and lateral base rails are formed by a single shaft 2910 curving to form the frame structure. At a first end, the shaft 2910 connects to a first longitudinal rail 2920a extending along the length of the frame and defining the carryways. The shaft extends down and completes a 180° turn 2911 to form a leg, the shaft extends up to form a second 180° turn 2912 where a returnway rail 2950a couples to the shaft. The shaft then extends down, forming a 90° turn 2913, extends laterally across the base of the frame, completes another 90° turn 2914 and extends up to a third 180° turn 2915. Another returnway rail 2950b couples to the shaft at the turn 2915. The shaft 2910 then extends down and makes another 180° turn 2916 to form another leg, then extends up towards the top of the frame, where it couples to a second longitudinal rail 2920b extending along the length of the frame and defining the carryway. Preferably, all turns in the shaft are curves rather than sharp turns to promote cleanability. The longitudinal rails may include integral curved reversing elements, as previously described.

FIG. 35 shows another embodiment of a cleanable frame 2100 including a shaft 2110 with multiple curves forming legs and lateral supports. The shaft 2110 couples at a first end to a first longitudinal rail 2120a and extends down to a first 180° turn 2111, which forms a leg. The shaft 2110 then extends up to a 90° turn 2112, then extends laterally across the frame to another 90° turn 2113. The shaft then extends down to another 180° turn, which forms another leg. The shaft then extends up to a second end, which couples to a second longitudinal shaft 2120b. Returnway rails 2150 couple to the curved shaft 2110 along the laterally extending portion of the frame, at the 90° turns or an intermediate location. The turns in the shaft are preferably curves, rather than sharp turns to promote cleanability. The longitudinal rails may include integral curved reversing elements, as previously described.

Figure 36:
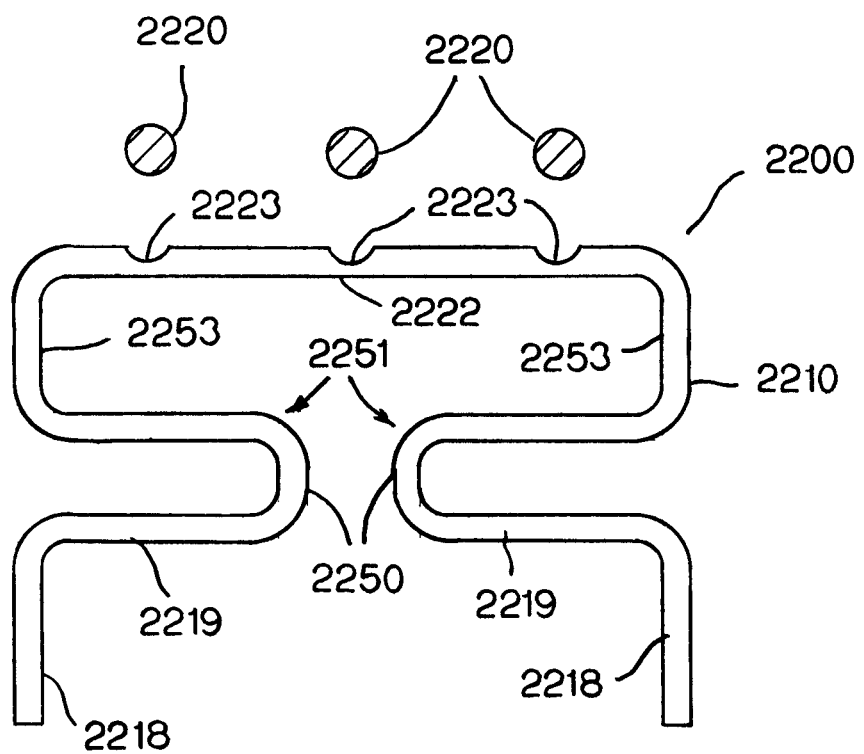
FIG. 36 is an end view of a cleanable conveyor frame according to another embodiment of the invention.

FIG. 36 is an end view of a cleanable conveyor frame 2200 according to another embodiment of the invention. The frame 2200 includes a number of base components 2210 connected by longitudinal rails 2220 forming a carryway. Each base component 2210 comprises a pair of substantially vertical legs 2218. The tops of the legs turn laterally inwards to form lateral connecting members 2219. The inner ends of the lateral connecting members 2219 turn upwards to form vertical connecting members 2250. The tops of the vertical connecting members 2250 turn laterally outwards to form returnway supports 2251. The outside ends of the returnway supports 2251 turn upwards to form vertical connectors 2253 (which may be considered the top portions of the legs). The tops of the vertical connectors 2253 are connected by a lateral carryway support member 2222. The lateral carryway support member includes recesses 2223 that match the longitudinal rails 2220, so that the longitudinal rails sit in the recesses 2223. Each base component 2210 may be formed of a single piece of material bent to form the different parts, preferably connecting the parts by curves, rather than sharp turns. The material may be metal, such as stainless steel, plastic or hybrid material. The longitudinal rails 2220 may be stainless steel, plastic or a hybrid. The longitudinal rails 2220, which may have curved ends forming reversing elements, and matching recesses 2223 may have any suitable shape.

Figure 37:
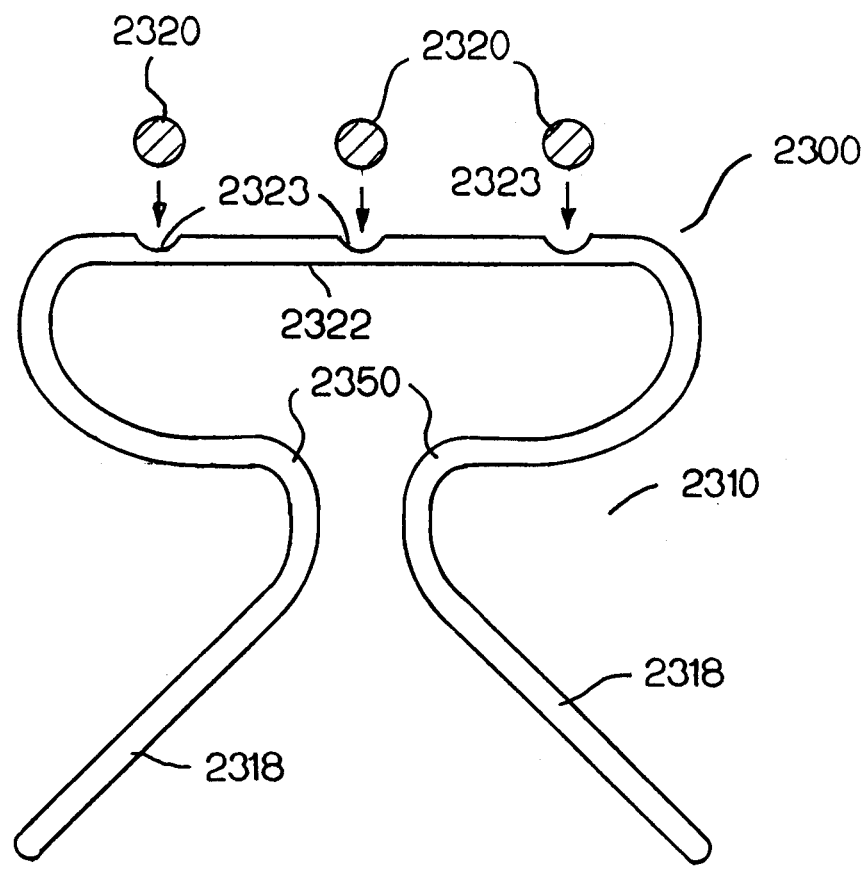
FIG. 37 is an end view of a cleanable conveyor frame according to another embodiment of the invention.

FIG. 37 is an end view of a cleanable conveyor frame 2300 according to another embodiment of the invention. The frame 2300 includes a number of base components 2310 connected by longitudinal rails 2320 forming a carryway. Each base component 2310 may be formed of a single piece of material, such as stainless steel and plastic or a hybrid thereof, that is bent to form the base structure. Each base comprises a pair of converging, angled legs 2318. The tops of the legs curve outwards to form lateral returnway supports 2350. The ends of the lateral returnway supports curve upwards and back inwards to form a lateral carryway support member 2322. The lateral carryway support member 2322 has recesses 2323 for receiving the longitudinal rails 2320. The longitudinal rails define the carryway and provide support structure for the frame. The longitudinal rails may include curved ends forming integral reversing elements between the carryway and returnway.

Figure 38:
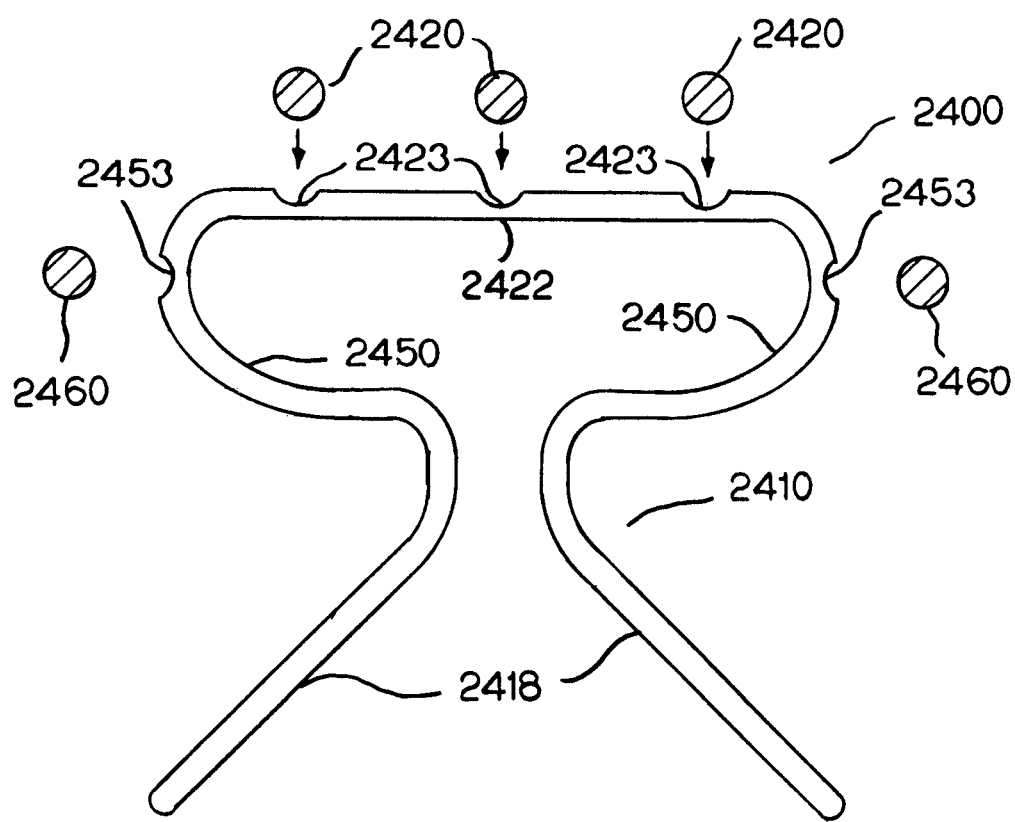
FIG. 38 is an end view of a cleanable conveyor frame according to another embodiment of the invention.

FIG. 38 illustrates another embodiment of a cleanable conveyor frame 2400 including base members 2410 and longitudinal rails 2420. The base members 2410 are similar to the base components 2310 of FIG. 37, and include angled legs 2418, lateral returnway supports and lateral carryway support members 2422 with recesses 2423. The outside curves of the returnway supports 2450 include recesses 2453 for receiving reinforcing members 2460. The location of the reinforcing members can be optimized for strength and rigidity.

Figure 39A:
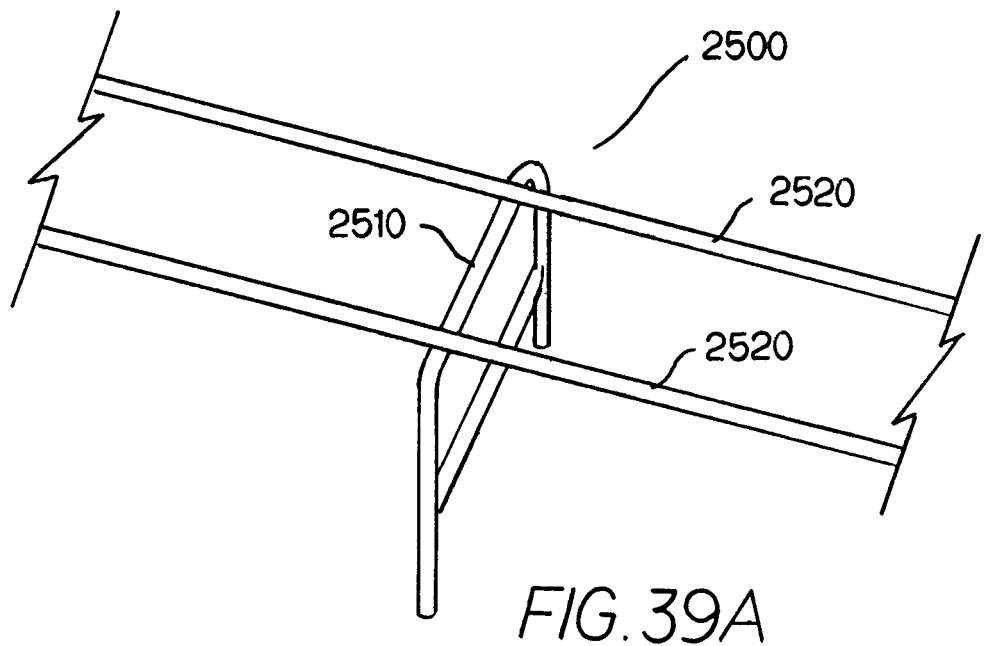
FIGS. 39A and 39B illustrate another embodiment of a cleanable conveyor frame.
Figure 39B:
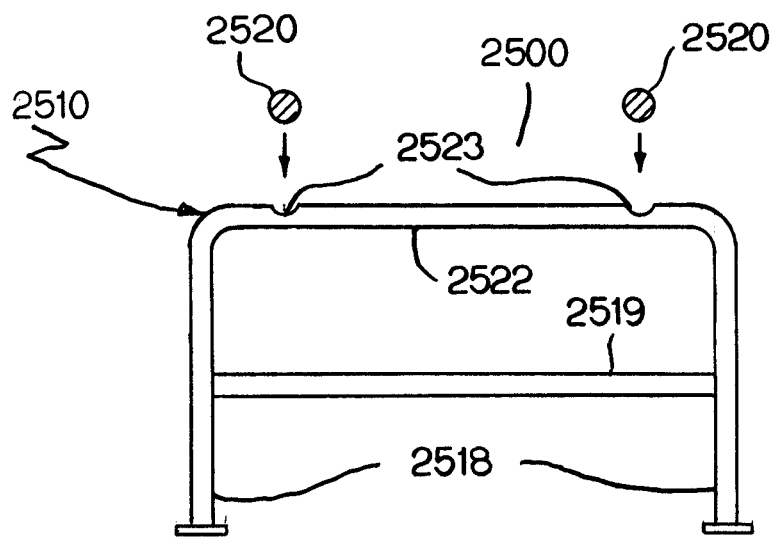

FIGS. 39A and 39B illustrate another embodiment of a cleanable conveyor frame 2500. The frame 2500 comprises a number of base components 2510. Each base component comprises a pair of legs 2518. The tops of the legs curve laterally inwards to form a lateral carryway support member 2522 connecting the tops of the legs. The lateral carryway support member 2522 includes recesses 2523 for receiving longitudinal rails 2520 forming the carryway and connecting the base components 2510. The longitudinal carryway rails 2520 may be welded to the lateral carryway support member 2522. The longitudinal rails may include curved ends to form integrated reversing elements. A second lateral support rail 2519 may extend between the legs 2518 and form returnway support for the conveyor belt in the returnway.

Figure 40:
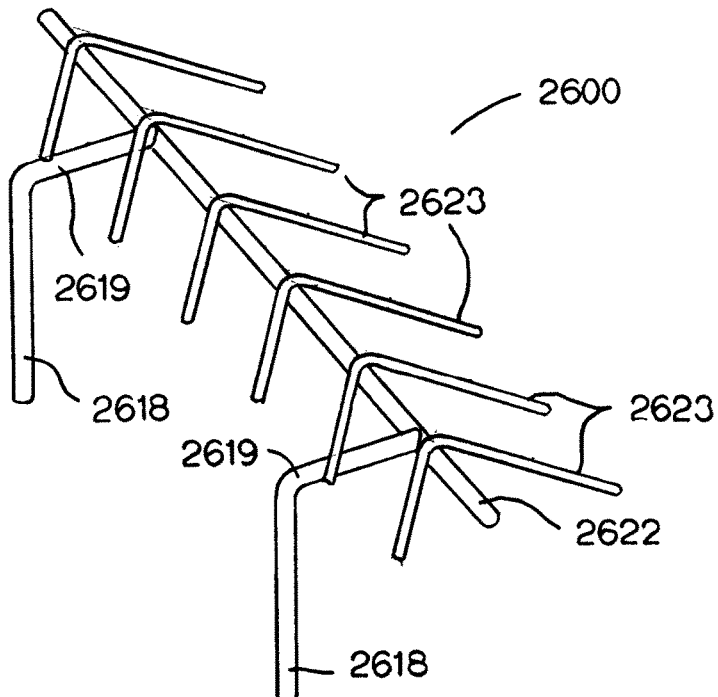
FIG. 40 illustrates another embodiment of a cleanable conveyor frame having a chevron-patterned carryway.
Figure 41:
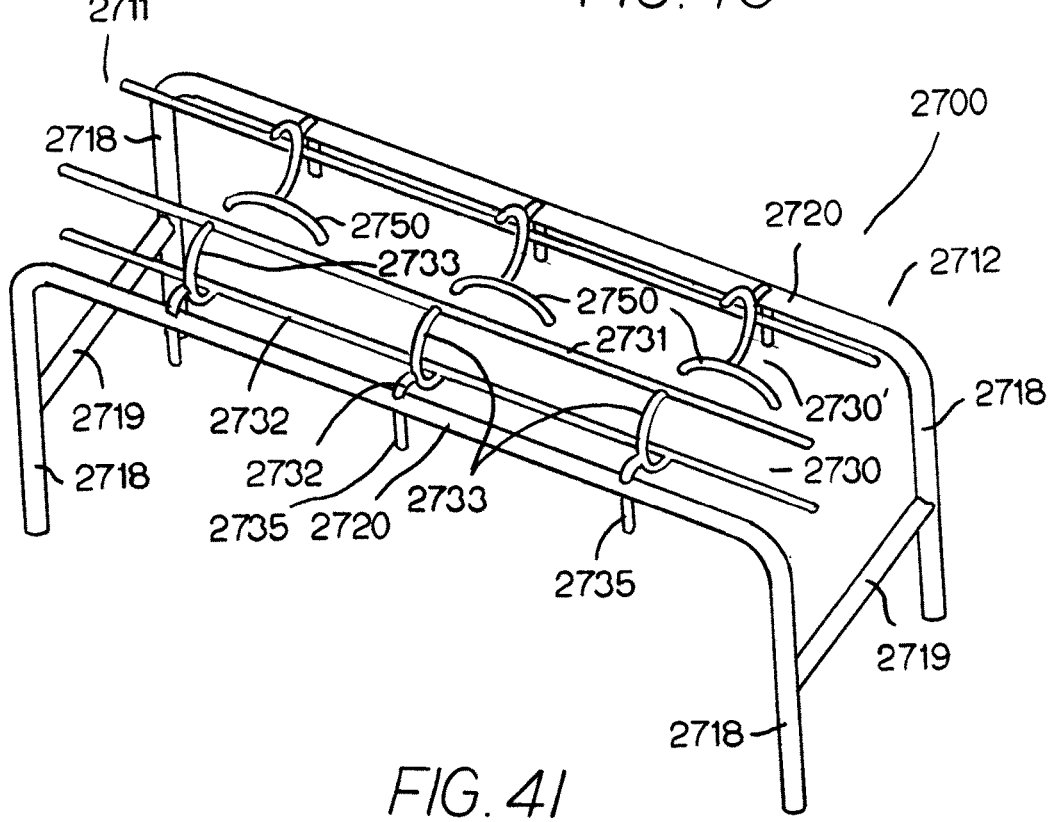
FIG. 41 illustrates a conveyor frame including insertable conveyor belt supports according to one embodiment of the invention.
Figure 42:
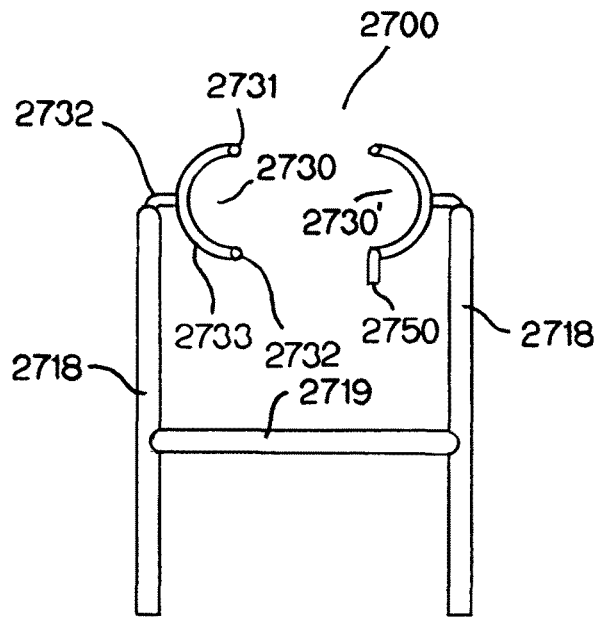
FIG. 42 is a front view of the conveyor frame of FIG. 41.
Figure 43:
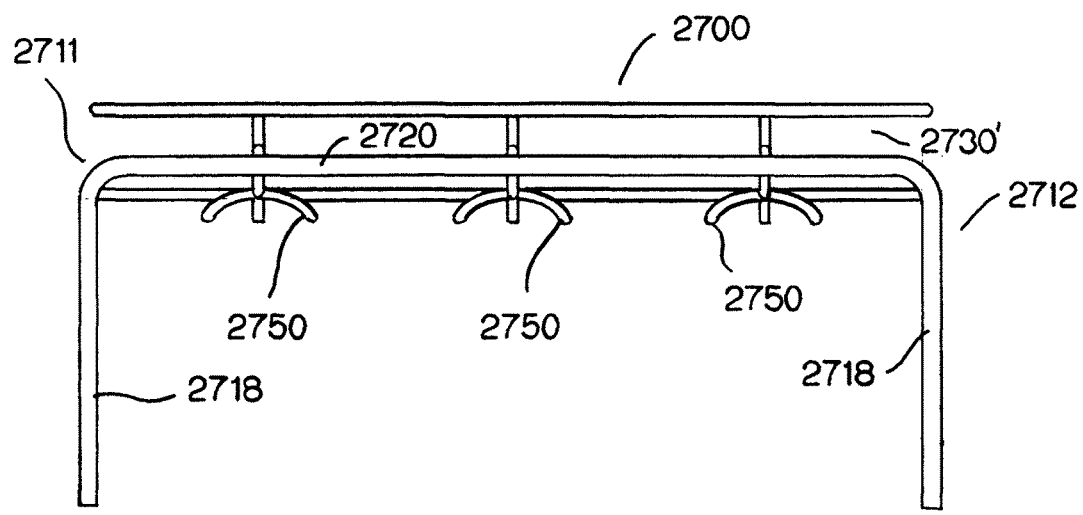
FIG. 43 is a side view of the conveyor frame of FIG. 41.
Figure 44:
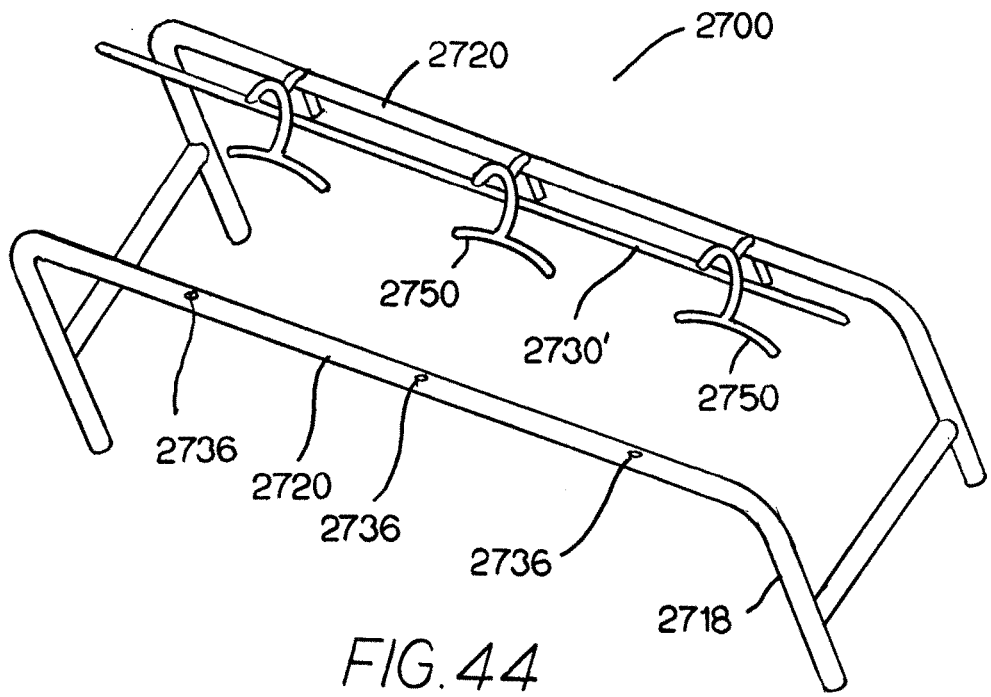
FIG. 44 illustrates the conveyor frame of FIG. 41 with one conveyor belt support removed.

FIG. 40 illustrates another embodiment of a cleanable conveyor frame 2600. The frame 2600 includes legs 2618 connected to a longitudinal carryway support rail 2622. Leg connectors 2619 extend perpendicular from the tops of the legs 2618 to space the legs from the support rail 2622. Alternatively, the legs may be directly connected to the support rail 2622. Transverse carryway rails 2623 form a chevron pattern of rails along the length of the frame for supporting a conveyor belt.

In the frame embodiments of FIGS. 1-40, the frame components are integrated and continuous to form a unitary structure. The frames minimize sharp angles where debris can be trapped and preferably segue between components (i.e., legs, carryway members, returnway supports, reversing elements) with a curvaceous members. The components may be stainless steel shafts welded or otherwise joined together, plastic shafts, a combination of plastic and steel, or formed of another suitable material.

FIGS. 41-44 illustrates another embodiment of a cleanable conveyor frame 2700, including insertable carryway member to promote cleanability.

The frame 2700 comprises a base formed by four legs 2718 connected by leg supports 2719, 2720. Lateral leg supports 2719 comprise rails extending between the legs at each end of the frame. Longitudinal leg supports 2720 comprise rails extending from the first end 2711 to the second end 2712 along each side of the frame 2710. The lateral leg supports 2719 extend between middle portions of the legs, while the longitudinal leg supports connect the tops of the legs 2718. The leg supports 2720, 2719 may be integrally formed with the legs or may be attached through welding or another suitable means to form a continuous, unitary structure. The frame 2710 may be formed of stainless steel, plastic or another suitable material.

Conveyor belt supports 2730 or 2730' are inserted in the frame base to form a carryway and returnway for supporting a conveyor belt traveling between the first end 2711 and second end 2712. A conveyor belt support 2730 or 2730' is inserted along each side of the frame 2700. The conveyor belt support 2730 includes a top longitudinal rail 2731 forming a first side edge of the carryway. The top longitudinal rail 2731 supports a first side edge of a conveyor belt. The top longitudinal rail 2731 may have curved ends to form reversing elements for the conveyor belt. A bottom longitudinal rail 2732 forms a first side edge of the returnway. Curved rail connectors 2733 connect the top and bottom rails to a frame connector for connecting the belt support to the frame. The illustrative frame connector comprises a base 2735, illustrated as a post, extending downwards from the curved rail connector 2733. The longitudinal leg supports 2720 include receivers, illustrated as openings 2736, for receiving the conveyor belt support bases 2735. Each base 2735 slides into a receiver on the frame 2700 to easily integrate the carryway and returnway into the frame without requiring tools. As shown, when inserted, the longitudinal rails 2731, 2732 extend between the longitudinal leg supports 2720, with the top longitudinal rail above the longitudinal leg supports and the bottom longitudinal rail below the longitudinal leg supports 2720.

A conveyor belt supports 2730 or 2730' is provided on each side of the frame, supporting each side of a conveyor belt. The center of the belt may be unsupported.

With the conveyor belt support 2730, the longitudinal bottom rail 2732 supports the conveyor belt continuously along the returnway. Alternatively, the conveyor belt support may provide intermittent support for the returnway. For example, the conveyor belt support 2730' includes a plurality of curved lower rails 2750 connected to the curved rail connectors 2733' for supporting the conveyor belt in the returnway. The curved lower rails 2750 curve downwards and allow for sagging of the conveyor belt in the returnway.

The conveyor belt support 2730, 2730' may be an integrated molded plastic structure, or may be formed of another suitable material.

While the illustrative frame base, comprising legs 2718 and leg supports 2719, 2720, is unitary, alternatively, the frame base may be modular and comprise a plurality of components connected together, with the conveyor belt support component brick laid over the modular frame sections.

Figure 45:
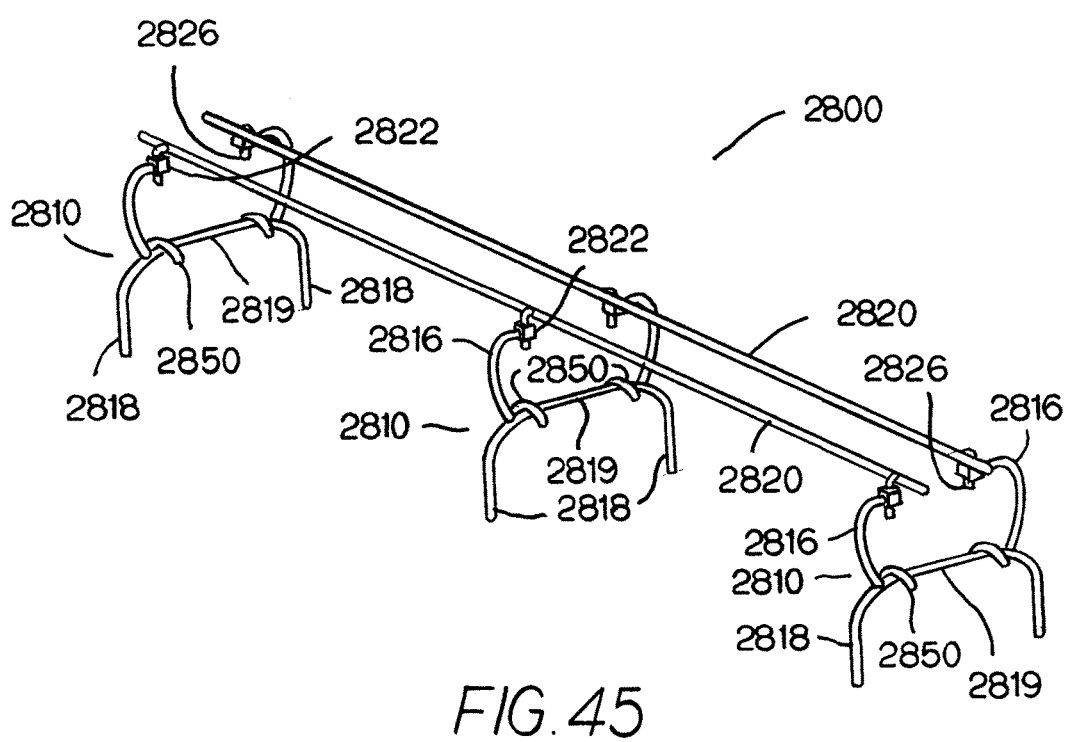
FIG. 45 shows a cleanable conveyor frame comprising a series of bases connected by insertable conveyor belt supports.

FIGS. 45-48B show other embodiments of a cleanable conveyor frame comprising base components and insertable conveyor belt supports. For example, FIG. 45 shows a conveyor 2800 comprising a series of frame bases 2810 connected by insertable conveyor belt supports 2820. Each base 2810 comprises a pair of legs 2818 connected by lateral leg connectors 2819. In the illustrative embodiment, an upside-down, u-shaped rail forms the lower portion of the legs and lateral leg connectors for each base. Curved leg extensions 2816 extend upwards from the lower legs portions 2818 or leg connectors 2819. The tops of each curved leg extension (which can be considered an upper portion of the leg) forms a receiver 2822 for an insertable conveyor belt support 2820.

Curved returnway rails 2850 extend from the lateral leg connectors 2819 for guiding the conveyor belt in the returnway.

Each insertable conveyor belt support 2820 comprises a longitudinal rail extending from a first end of the frame to a second end. Each insertable conveyor belt support 2820 further includes a series of downward-extending protrusions 2826 configured to be inserted into a receiver 2822 of a base 2810. Each longitudinal rail 2820 forms a side of a carryway for supporting a conveyor belt. The ends of the longitudinal rails may curve to form reversing elements for the conveyor belt.

When inserted, the conveyor belt supports 2820 provide support structure for the frame by connecting the frame bases.

In one embodiment, the bases 2810 are formed of steel or another metal, while the insertable conveyor belt supports 2820 are formed of plastic, or a combination or plastic and metal.

Figure 46:
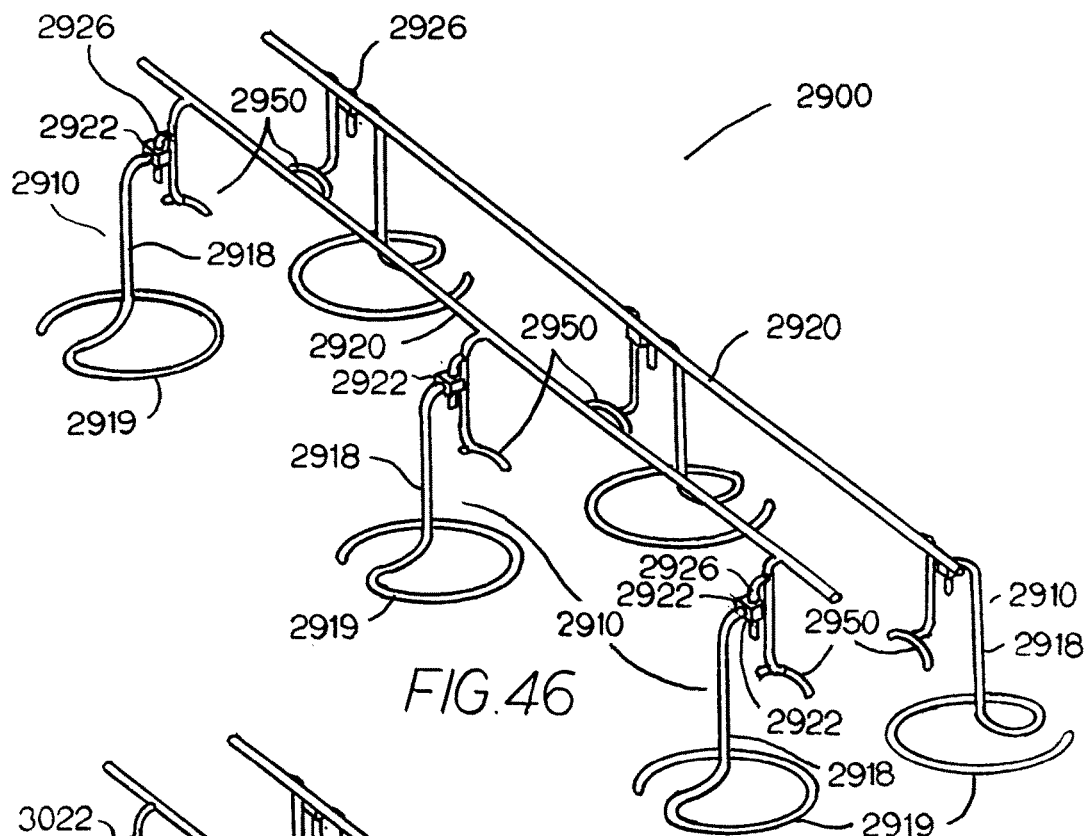
FIG. 46 shows an embodiment of a cleanable conveyor frame comprising pedestal base components and insertable conveyor belt supports.

FIG. 46 shows an embodiment of a cleanable conveyor frame 2900 comprising pedestal base components 2910 and insertable conveyor belt supports 2920. Each pedestal base includes a leg 2918 supported by a curving base 2919. Each leg 2918 terminates in a receiver 2922 for receiving the conveyor belt support 2920.

Each insertable conveyor belt support 2920 comprises a longitudinal rail 2921 forming a side of a carryway for supporting the conveyor belt. The ends of the longitudinal rails 2921 may curve to form reversing elements. Curved connectors 2926 extend downwards from the longitudinal rails, each terminating in a curved returnway rail 2950. Downward-extending protrusions 2927 extend from the curved connectors 2926 and are configured to be inserted into a receiver 2922 of a base 2910.

When inserted, the conveyor belt supports 2920 provide support structure for the frame by connecting the frame bases.

In an illustrative embodiment, the bases 2910 are formed of steel or another metal, while the insertable conveyor belt supports 2920 are formed of plastic, or a combination or plastic and metal.

Figure 47:
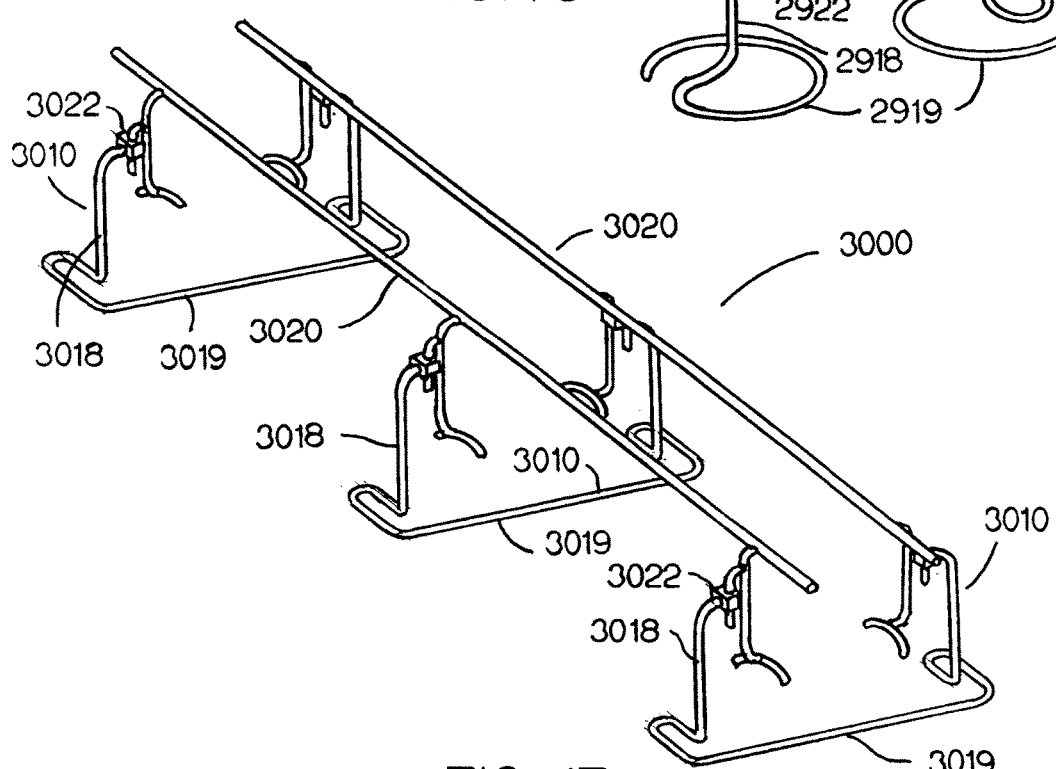
FIG. 47 shows another embodiment of a cleanable conveyor frame comprising base components and insertable conveyor belt supports.

FIG. 47 shows an embodiment of a cleanable conveyor frame 3000 comprising base components 3010 and insertable conveyor belt supports 3020. Each base component 3010 includes a pair of legs 3018 connected by an offset lateral connecting rail 3019 and curved connectors 3017. Each leg 3018 terminates in a receiver 3022. The illustrative insertable conveyor belt supports 3020 are substantially identical to those shown in FIG. 46, though the insertable conveyor belt support may have any suitable configuration suitable for forming a carryway and for coupling to the base components 3010 to form a frame for a conveyor belt.

Figure 48A:
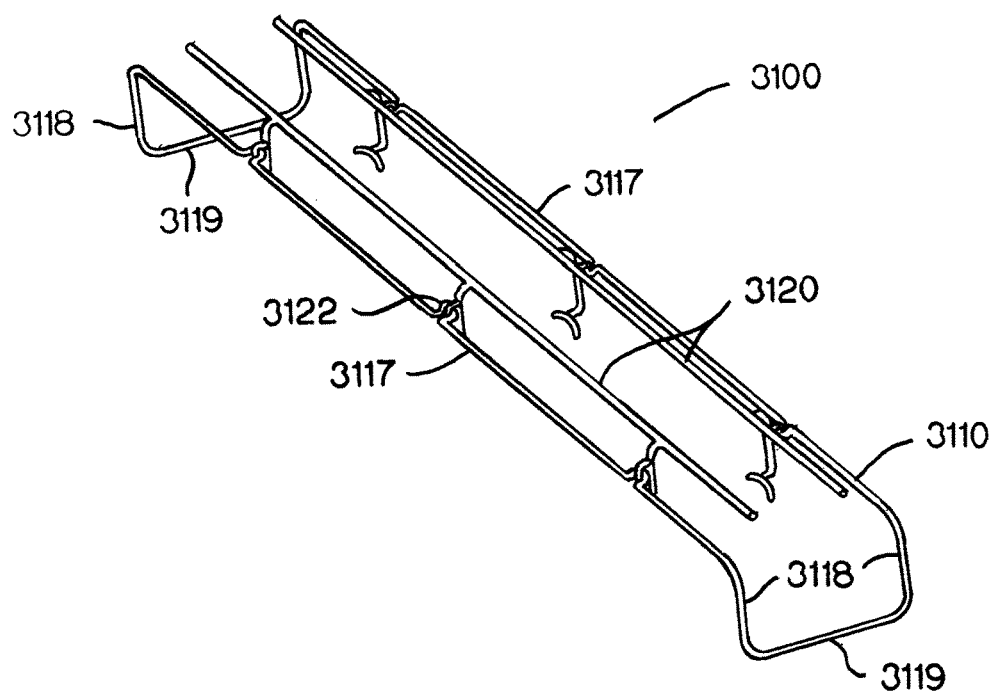
FIGS. 48A and 48B illustrate another embodiment of a cleanable conveyor frame comprising a unitary base component for receiving insertable conveyor belt supports.
Figure 48B:
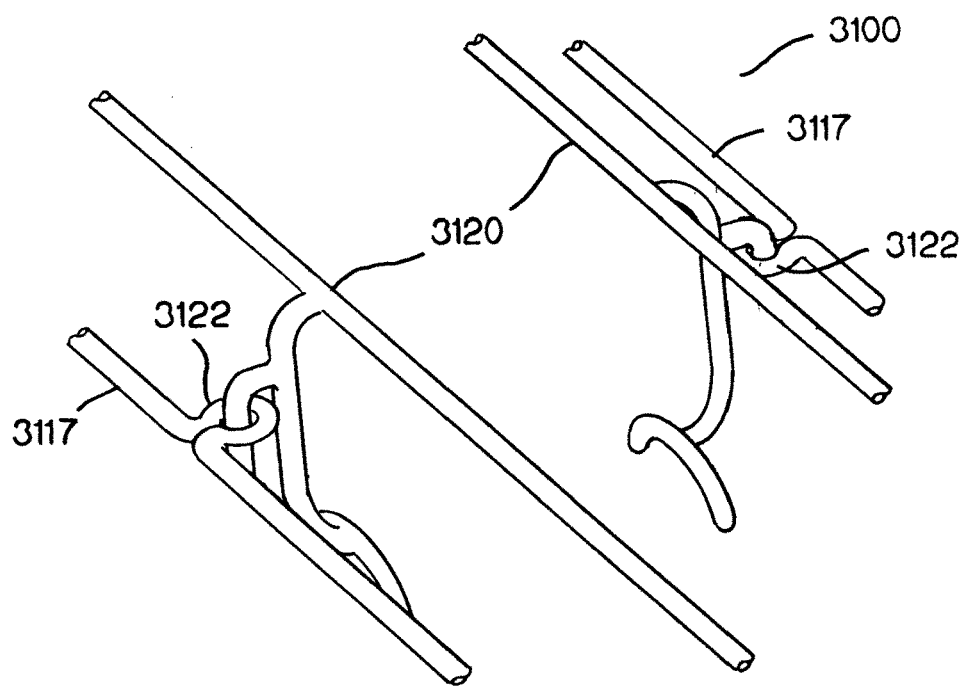

FIGS. 48A and 48B illustrate another embodiment of a cleanable conveyor frame 3100 comprising a unitary base component 3110 for receiving insertable conveyor belt supports, such as the insertable conveyor belt supports 3120, which are similar to those shown in FIGS. 46 and 47. The unitary base component 3110 includes pairs of legs 3118 connected by lateral rails 3119 extending laterally on the floor or other support structure. The tops of the legs 3118 curve longitudinally inwards to form longitudinal base rails 3117 connecting the legs from the first end of the frame to the second end. The longitudinal base rails 3117 are bent in intermediate locations to form receivers 3122 for the insertable conveyor belt supports 3120. The illustrative receivers 3122 are circular, though the receivers may have any suitable configuration for receiving the insertable conveyor belt supports 3120.

The illustrative embodiments comprise a pair of separate insertable conveyor belt supports 3120, each forming a side of the carryway and returnway. Alternatively, the insertable conveyor belt supports may be connected through other means.

Figure 49:
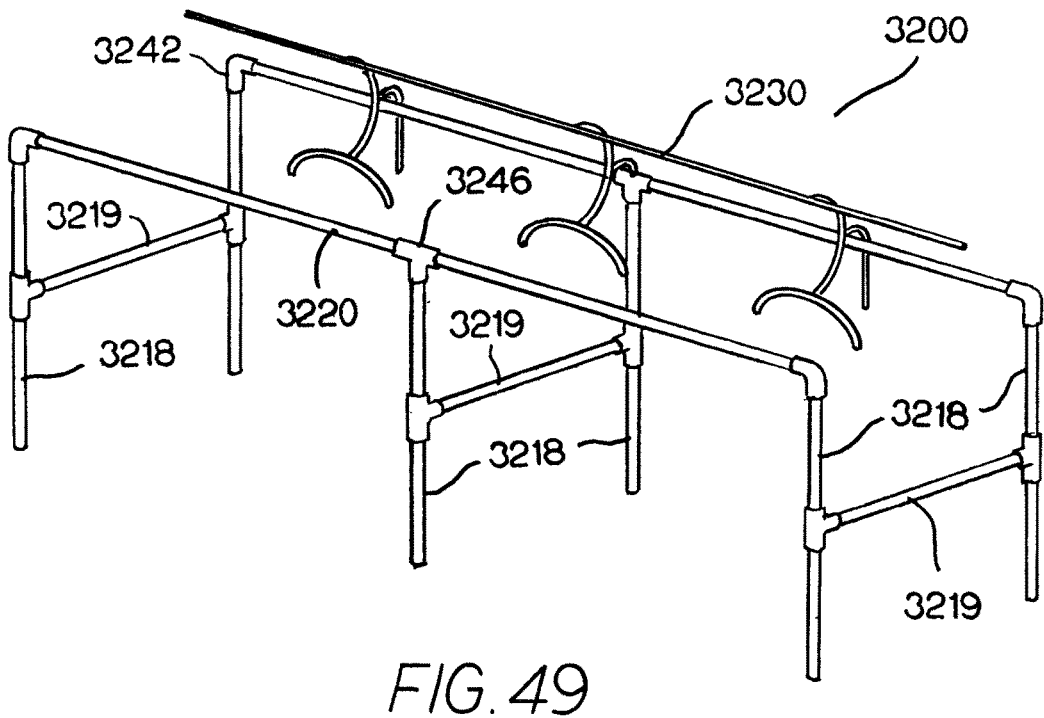
FIG. 49 illustrates a modular conveyor frame according to another embodiment of the invention.
Figure 50A:
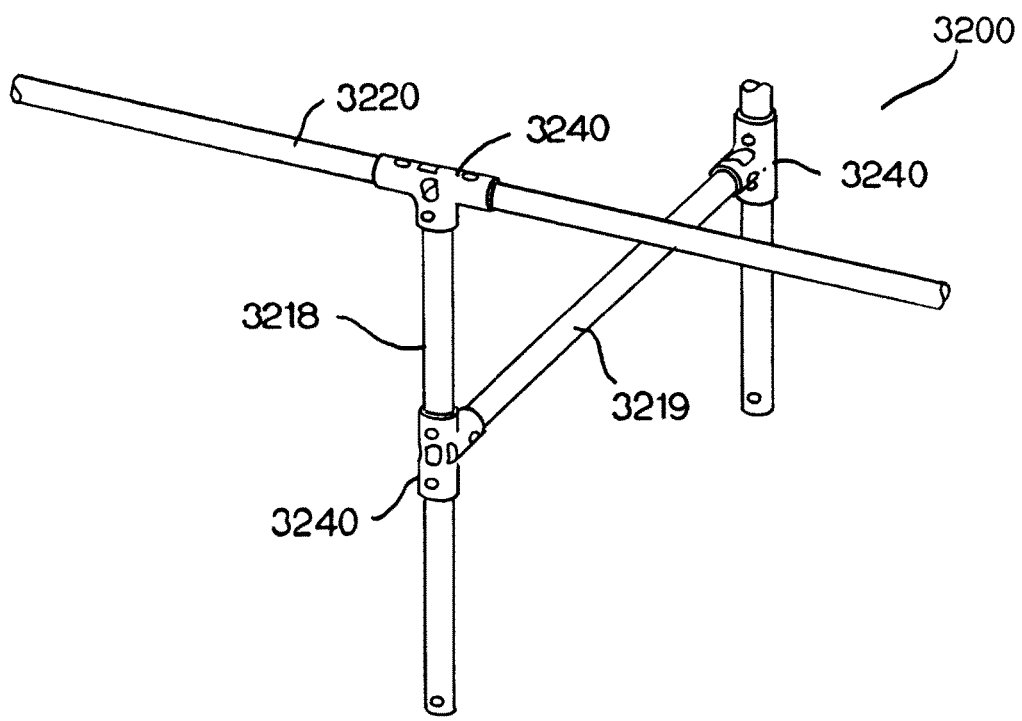
FIG. 50A is a detailed view of a middle portion of the modular conveyor frame of FIG. 49.
Figure 50B:
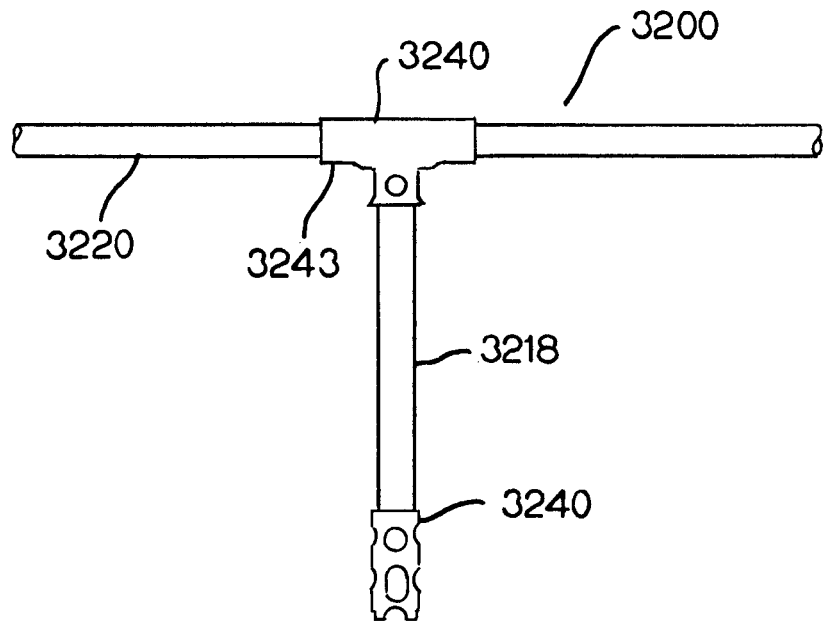
FIG. 50B is a side view of the middle portion of FIG. 50A.
Figure 51:
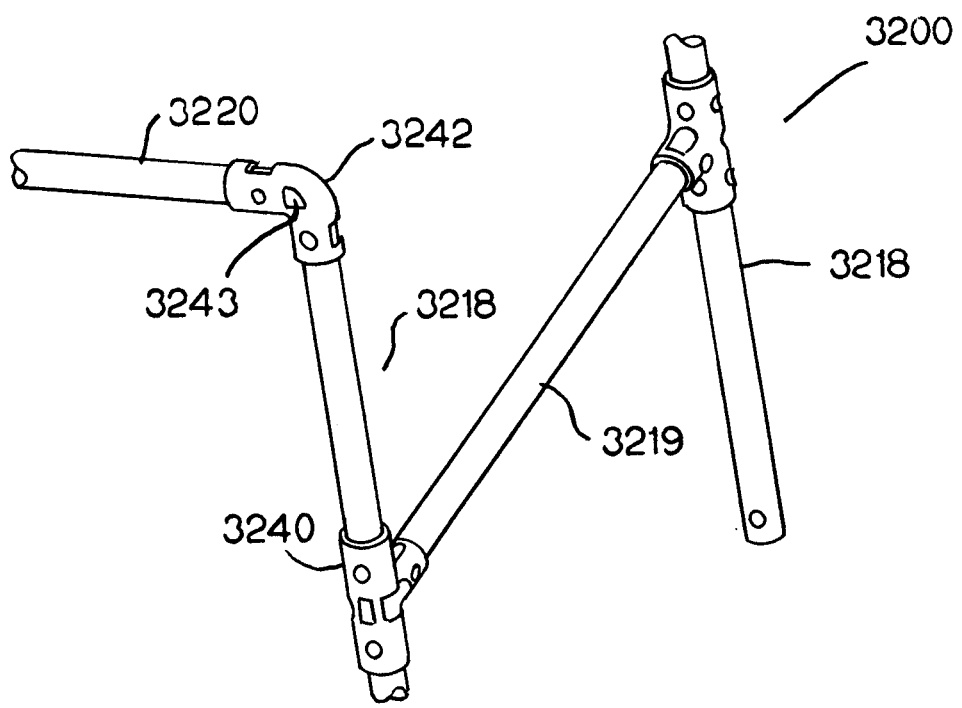
FIG. 51 is a detailed view of a front portion of the modular conveyor frame of FIG. 49.

FIGS. 49-51 illustrate another embodiment of a cleanable conveyor frame 3200. The conveyor frame of FIGS. 49-51 is a modular frame, comprised of a set of shafts connected by cleanable connectors. A set of shafts of differing lengths, such as 18", 24", 36", 60" and so on, may be stocked for creating the modular frame 3200.

The illustrative conveyor frame 3200 comprises six legs 3218 formed of shafts having a first length. A first pair of legs is located at a first end of the frame; a second pair of legs at a second end of the frame; and a third pair of legs straddles the middle of the frame. The legs may be formed of a plurality of shafts connected end-to-end or of a single shaft. Three shafts having a second length form lateral supports 3219 connecting each pair of legs at the middle of the shafts. Shafts having a third length form longitudinal frame supports 3220 extending along each side of the frame and connecting the tops of the legs 3218. The longitudinal frame supports may each comprise a single shaft or a plurality of shafts connected end-to-end. Alternatively, a modular conveyor frame may be formed in a variety of sizes and configurations.

Each shaft 3218, 3219, 3220 includes an opening for attachment to a connector 3240 or 3242. The connector 3240 is a t-fitting, and the connector 3242 is an elbow fitting, though any suitable fitting may be used. The fittings include openings 3243 that may align with the shaft openings. A ball detent pin or other suitable fastener holds the pieces together.

A molded conveyor belt support 3230 may be inserted in the frame to create a carryway and returnway for a conveyor belt, as previously described.

The frame may be easily assembled in a number of different configurations. Preferably, the frame may be assembled and disassembled by hand, without requiring tools. A custom configuration program may help engineer and configure the shaft and connectors for custom conveyor design.

Alternatively, a single long shaft may be manufactured and a tool sold along with the kit could cut the sticks and puncture a hole through it at the ends.

Figure 52A:
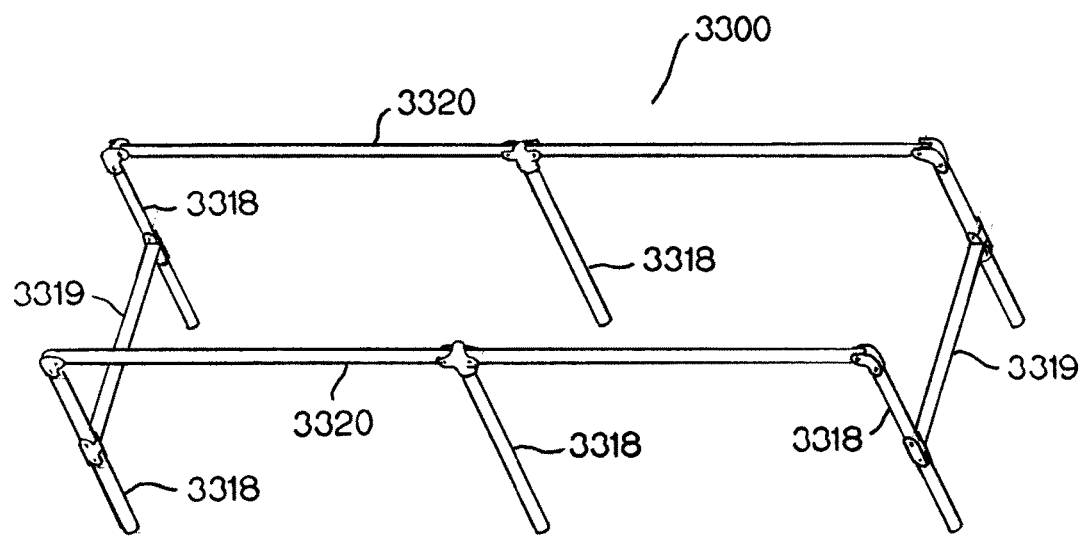
FIG. 52A is an isometric view of a modular conveyor frame including clevis fasteners.
Figure 52B:
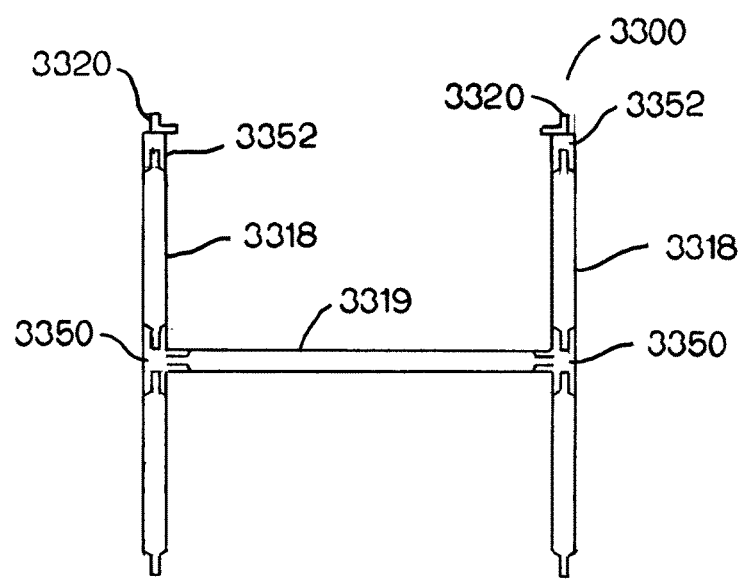
FIG. 52B is a front view of the frame of FIG. 52A.
Figure 52C:
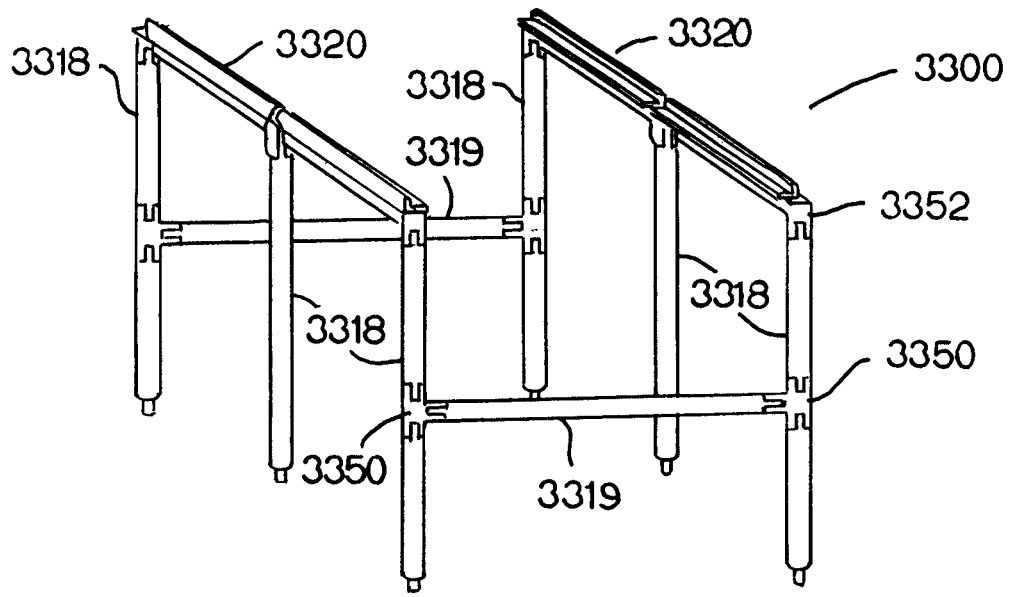
FIG. 52C is another view of the frame of FIG. 52A.
Figure 53:
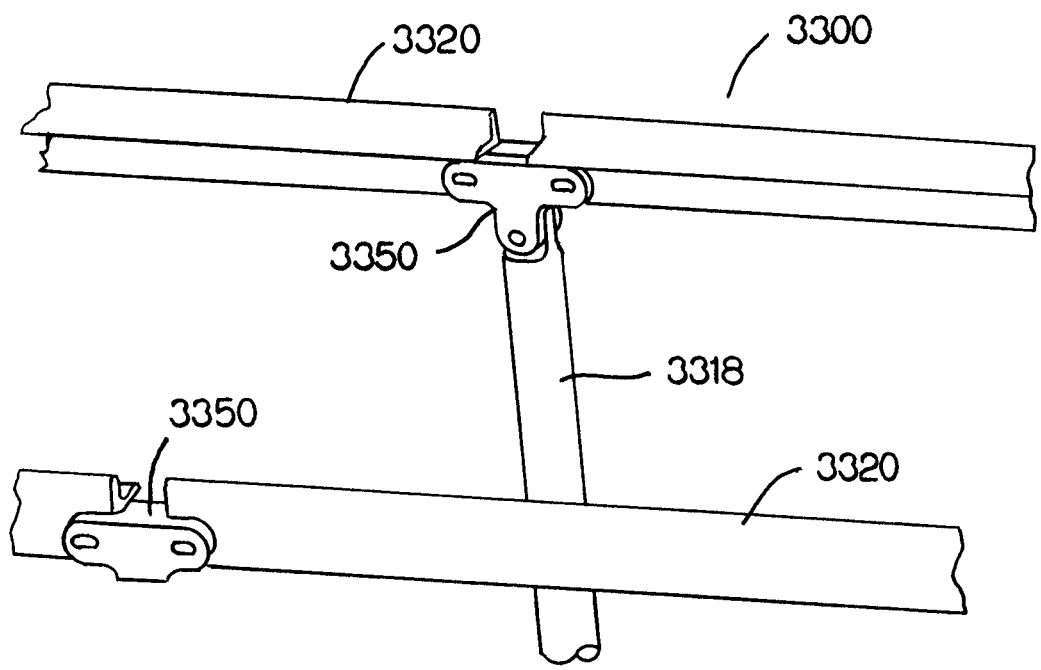
FIG. 53 is a detailed close up view of an intersection region of the frame of FIG. 52A.

In another embodiment, shown in FIGS. 52A-53, a modular conveyor frame 3300 comprises shaft components joined by clevis fasteners. The frame 3300 comprises legs 3318, each formed by a single shaft or multiple shafts coupled together. A first pair of legs is located at a first end of the frame; a second pair of legs at a second end of the frame; and a third pair of legs straddles the middle of the frame. Lateral supports 3319 connecting the end pairs of legs at the middle of the shafts. Longitudinal frame supports 3320 extend along each side of the frame and connecting the tops of the legs 3318. The longitudinal frame supports 3320 have a rounded T-shaped cross-section to form carryway edges for supporting and guiding a conveyor belt. Alternatively, a molded conveyor belt support may be inserted in the frame to create a carryway and returnway for a conveyor belt, as previously described.

Clevis fasteners 3350, 3352 join the shafts. The ends of each shaft include narrowed necks for fitting into the clevis fasteners 3350 or 3352. Openings in the narrowed necks receive a pin connecting the clevis fasteners 3350 or 3352 to the shafts.

Figure 54:
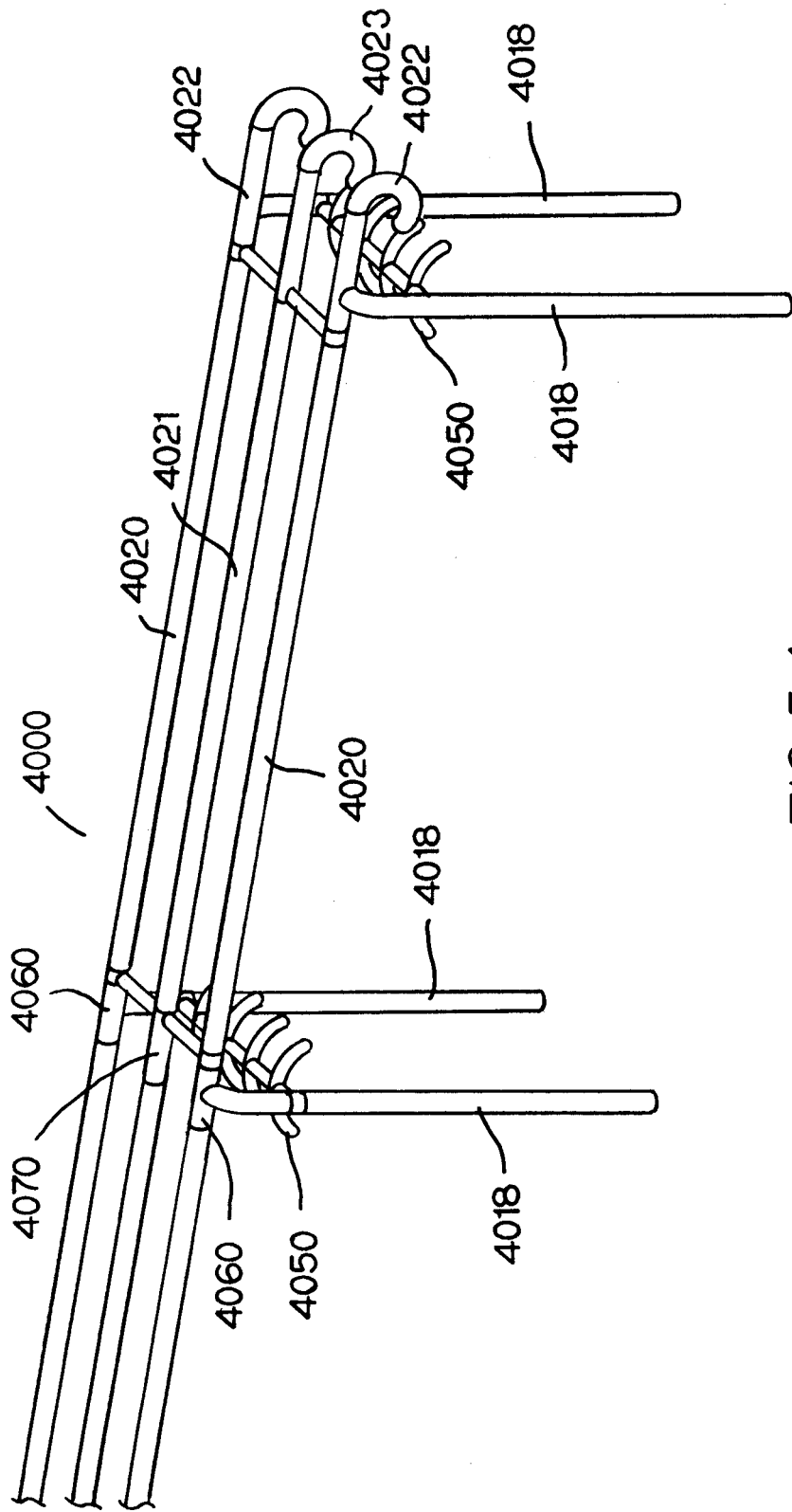
FIG. 54 is an isometric view of a portion of a modular conveyor frame according to another embodiment of the invention.
Figure 55:
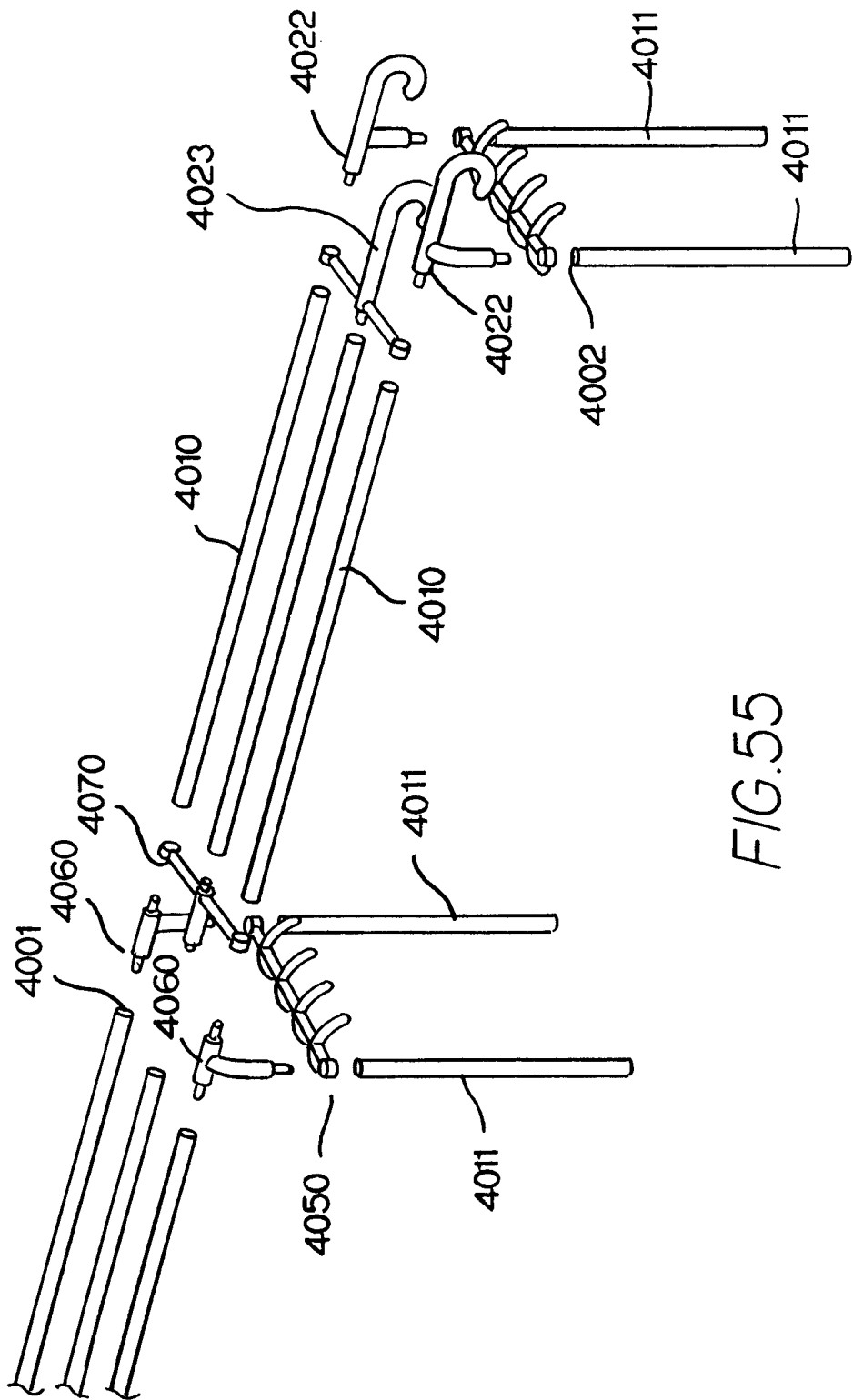
FIG. 55 is an exploded view of the modular conveyor frame of FIG. 54.

FIGS. 54 and 55 illustrate a modular, cleanable conveyor frame 4000 according to another embodiment of the invention. The frame 4000 is comprised of a number of modular components connected by connectors. The components can be arranged in any suitable arrangement or configuration to form the frame. For example, the illustrative frame 4000 comprises longitudinally-extending rails 4020, 4021 formed by a first set of standard shafts 4010 and corresponding connectors and legs 4018 formed by another set of standard shafts 4011 and corresponding connectors. The first and second set of standard shafts can be off-the-shelf components, and preferably include central openings 4001, 4002 to facilitate assembly. The connectors, described below, may be molded components. The longitudinally-extending rails 4020 form side edges of the carryway, while the longitudinally-extending rail 4021 forms a central support for the carryway. The longitudinally-extending rails extend between and connect the legs, and form support structure for the carryway. The longitudinal rails 4020, 4021 include curved end extensions 4022, 4023, shown in FIGS. 56 and 58, which form reversing elements. T-shaped leg-carryway connectors 4060, shown in FIG. 57, connect intermediate legs 4018 to the shafts 4010 forming the longitudinal rails 4020, 4021. A carryway shaft connector 4070, shown in FIG. 59, connects shaft 4010 forming the central longitudinal rail 4021 to the T-shaped leg-carryway connector 4060 and the shafts 4010 forming the outer longitudinal rails 4020. A returnway support 4050 extends between one of more of the pairs of legs and is connected to the T-shaped connecting joints 4060 and the shafts 4011 forming the legs 4018.

Figure 56:
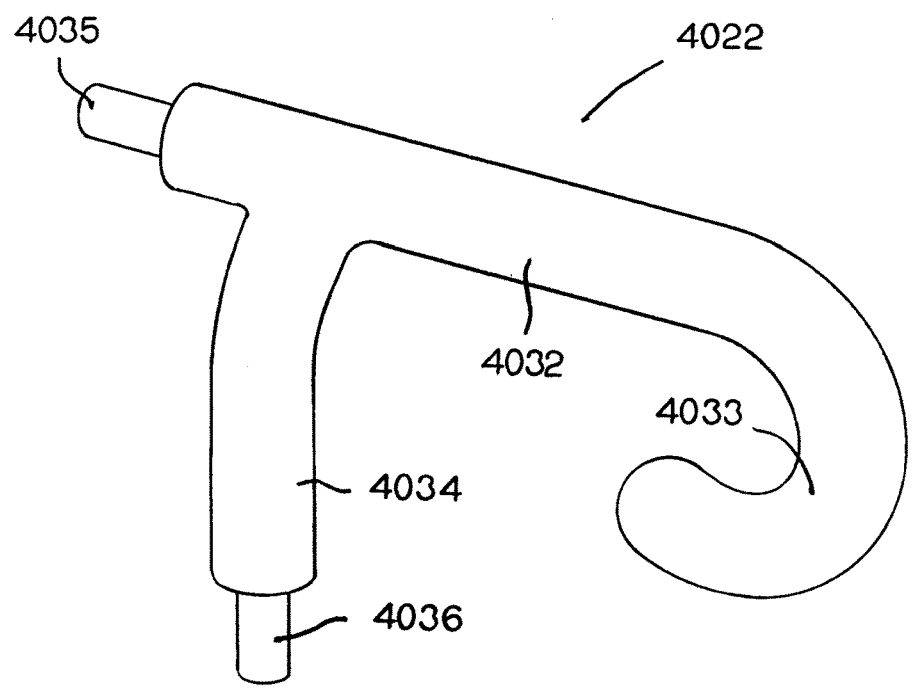
FIG. 56 is a detailed view of a reversing element component of the frame of FIG. 54.

Referring to FIG. 56, the curved end extension 4022 includes a shaft 4032 configured to connect in series with a shaft 4010 in the longitudinal rail 4020, a curved end 4033, and a downward extending shaft 4034 that connects in series to a shaft 4011 in the leg 4018. The longitudinal shaft 4032 includes a protrusion 4035 configured to be received in an opening 4001 connected to a shaft 4010 defining the longitudinal rail 4020. The downward extending shaft 4034 includes a protrusion 4036 configured to be received in an opening 4002 connected to a corresponding shaft 4011 defining the leg 4018.

Figure 57:
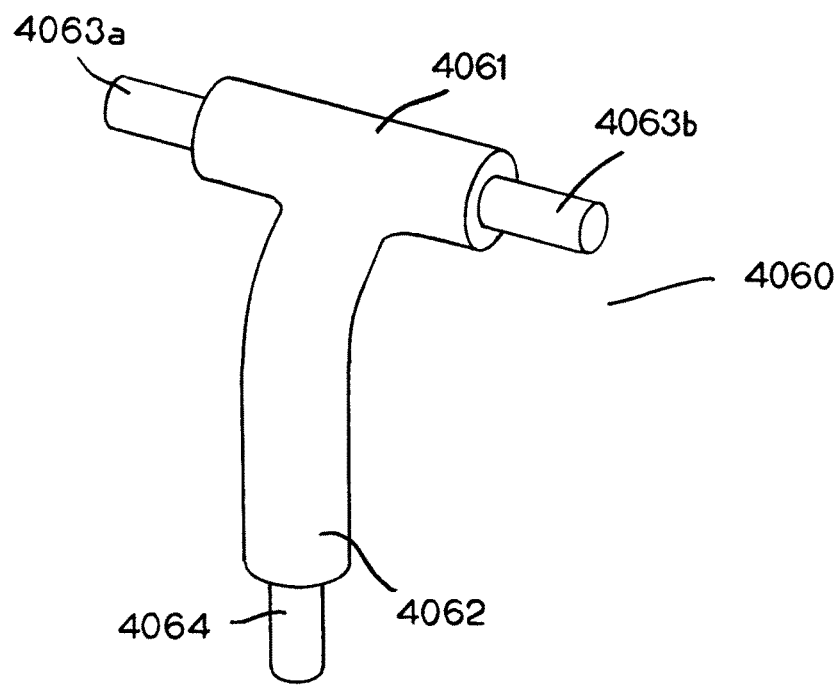
FIG. 57 is a detailed view of a T-shaped connector in the frame of FIG. 54

The T-shaped leg-carryway connector 4060, shown in FIG. 57 includes a longitudinal shaft 4061 forming a portion of the longitudinal rail 4020 and a substantially vertical shaft 4062 extending down from the longitudinal shaft 4061 to form an upper portion of the leg 4018. The longitudinal shaft ends include protrusions 4063a, 4063b configured to be received in openings 4001 connected to shafts 4010 forming the longitudinal rail 4020. The protrusion 4063b also passes through an opening 4075 of the carryway shaft connector 4070 to connect the carryway shaft connector to the shafts and legs. The substantially vertical shaft 4062 includes a protrusion 4064 configured to be inserted in an opening 4002 of a shaft 4011 defining a leg so as to connect the leg-carryway connector 4060 and longitudinal rails 4020 to the legs 4018.

Figure 60:
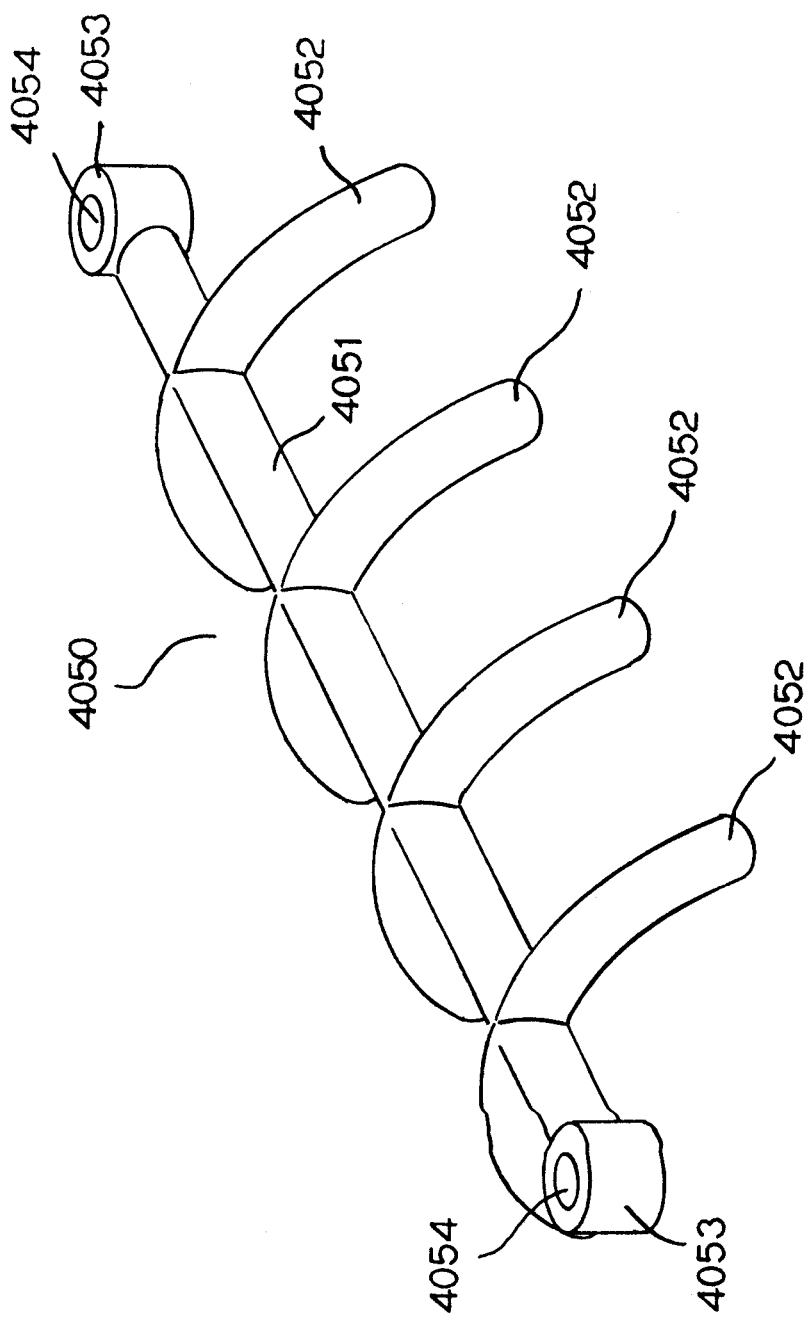
FIG. 60 is a detailed view of a returnway rail component of the frame of FIG. 54

The T-shaped leg-carryway connector 4060 may include an integrated returnway support rail (not shown) connected to the substantially vertical shaft 4062. Alternatively, a separate returnway support 4050, shown in FIG. 60, may be used. The returnway support 4050 includes a lateral rail 4051 intersected by returnway support rails 4052, which are arched in the illustrative embodiment. The lateral rail 4051 terminates in connectors 4053 including openings 4054 configured to receive the protrusions 4064 of the T-shaped leg-carryway connector 4060. The connectors 4053 align with and overlie the shafts 4011 defining the legs 4018, which also receive the protrusion 4064.

Figure 58:
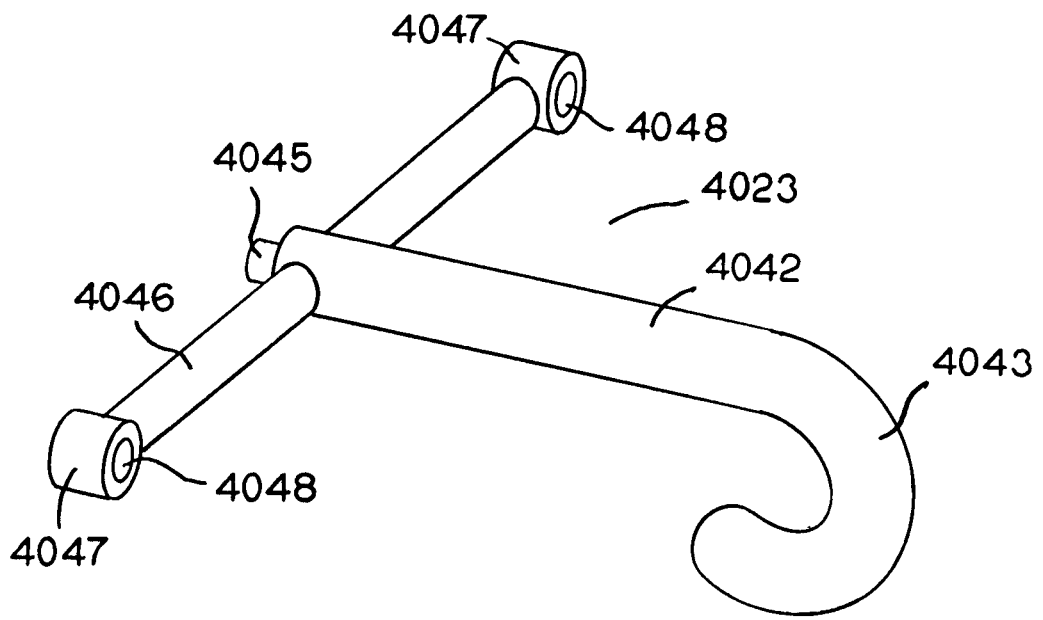
FIG. 58 is a detailed view of a reversing element for a middle longitudinal rail of the frame of FIG. 54.
Figure 59:
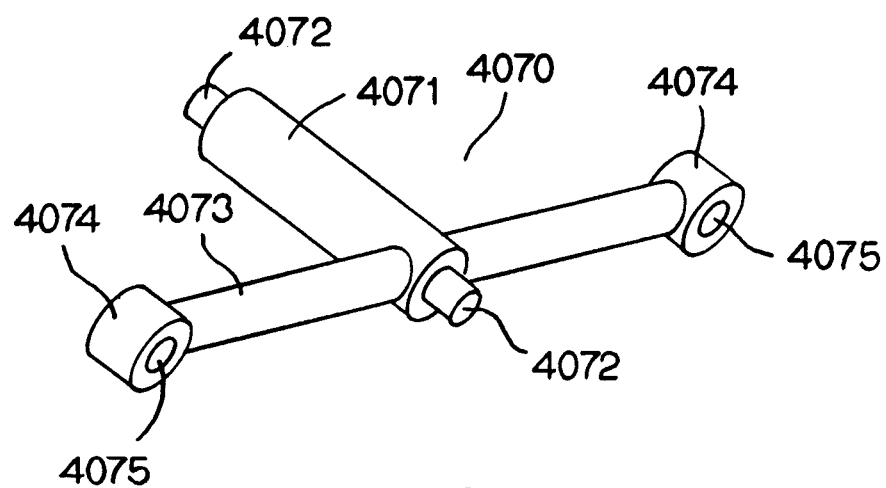
FIG. 59 is a detailed view of a connector for a middle longitudinal rail in the frame of FIG. 54.

The middle longitudinal rail 4021 is integrated into the frame 4000 using the connectors 4023 and 4070 shown in FIGS. 58 and 59. The middle curved end extension 4023 includes a central shaft 4042 that connects in series to another shaft 4010 via a protrusion 4045. The central shaft 4042 curves to define a reversing element 4043 for the middle longitudinal rail 4021. A lateral rail 4046 intersects the central shaft 4042 and terminates in connectors 4047 having openings 4048 that receive protrusions 4035 of the outer rail curved extension 4022. The middle curved extension 4023 thus connects shafts 4010 forming a portion of the middle longitudinal rail 4021 to the outer longitudinal rails 4020, in addition to defining an integral reversing element.

The carryway shaft connector 4070 includes a longitudinal rail 4071 defining a central portion of the middle longitudinally-extending rail 4021, and a lateral rail 4073 terminating in connectors 4074 with openings that receive the protrusions 4063b of the leg-carryway connector 4060. The shaft 4071 also includes protrusions 4072 insertable in openings 4001 of the shafts 4010 to connect the shafts 4010 and carryway shaft connector to form the middle longitudinal rail.

Figure 61:
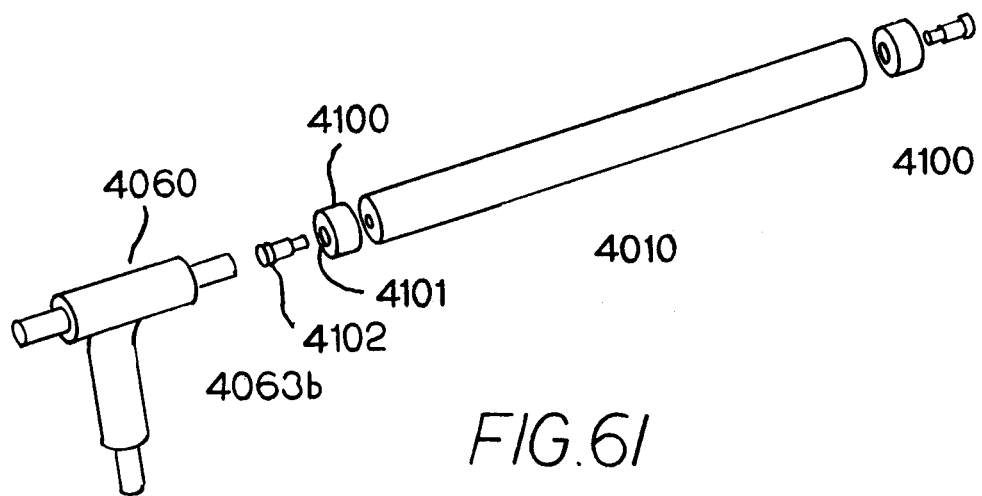
FIG. 61 is an exploded view of a T-shaped connector and shaft interface for a conveyor frame including free spinning connectors according to another embodiment of the invention.
Figure 62:
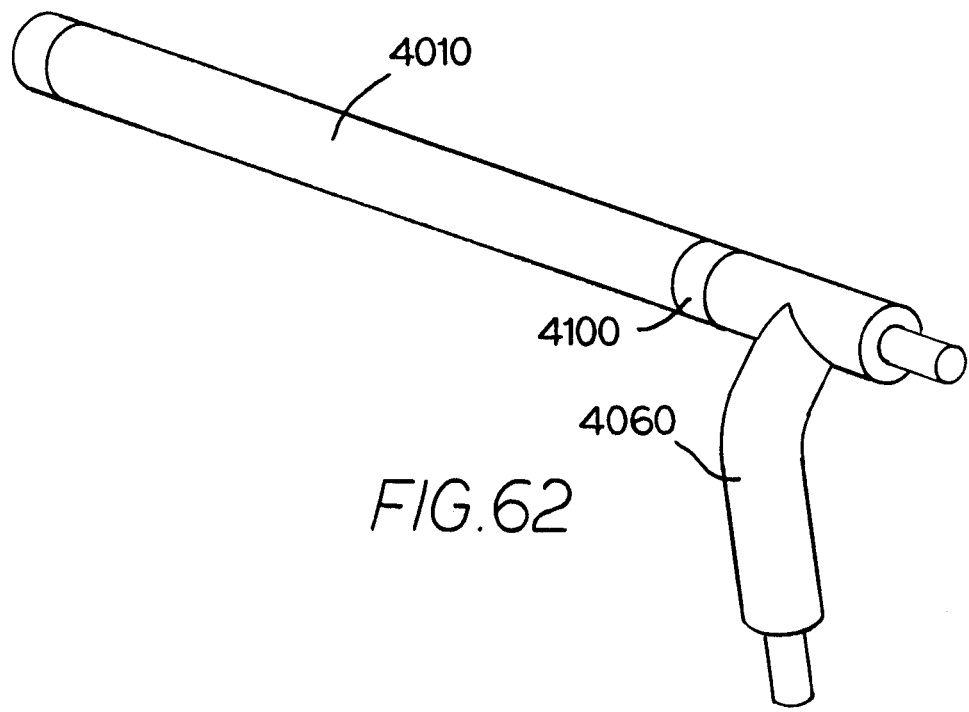
FIG. 62 is an assembled view of the portion of the frame shown in FIG. 61.

FIGS. 61 and 62 show another means for connecting modular frame components to form a cleanable conveyor frame. FIGS. 61 and 62 show a connection between a T-shaped leg carryway connector 4060 and a shaft 4010 defining a portion of a longitudinally-extending rail using a free-spinning connector 4100. The free-spinning connector is coupled to the shaft 4010 using a shoulder bolt 4102 or other suitable fastener so that it can spin freely after connecting. The free spinning connector 4100 comprises a tubular member having a threaded opening 4101 for engaging threads a protrusion on a component to be engaged, such as the protrusion 4063b of the T-shaped leg carryway connector 4060. The free-spinning connector may be used to join any of the frame components described above.

Figure 63A:
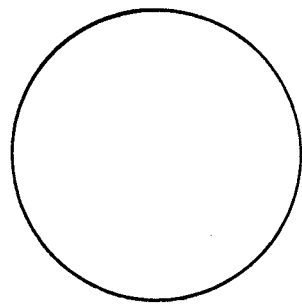
FIG. 63A is a cross-sectional view of a conveyor frame component according to one embodiment of the invention.
Figure 64A:
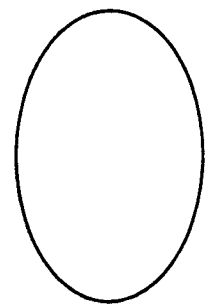
FIG. 64A is a cross-sectional view of a conveyor frame component according to another embodiment of the invention.
Figure 63B:
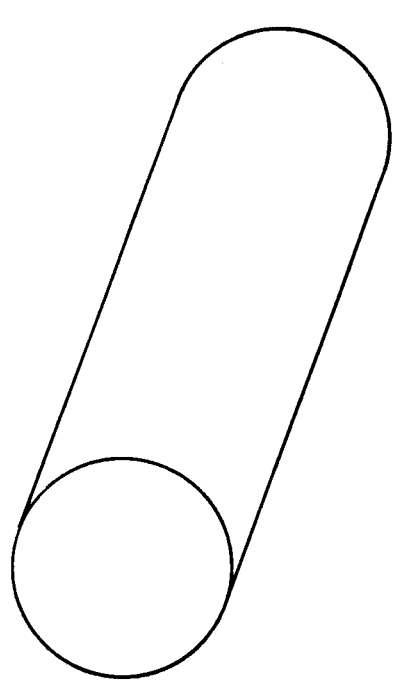
FIG. 63B is an isometric view of the conveyor frame component of FIG. 63A.
Figure 64B:
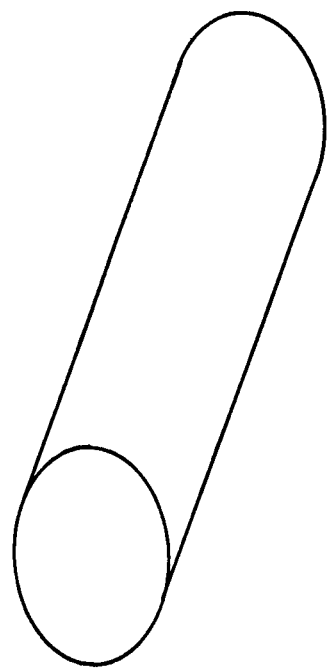
FIG. 64B is an isometric view of the conveyor frame component of FIG. 64A.
Figure 65A:
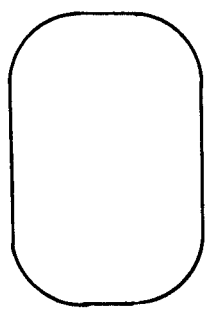
FIG. 65A is a cross-sectional view of a conveyor frame component according to another embodiment of the invention.
Figure 66A:
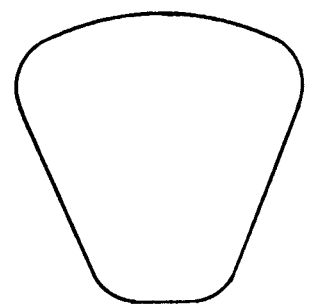
FIG. 66A is a cross-sectional view of a conveyor frame component according to another embodiment of the invention.
Figure 65B:
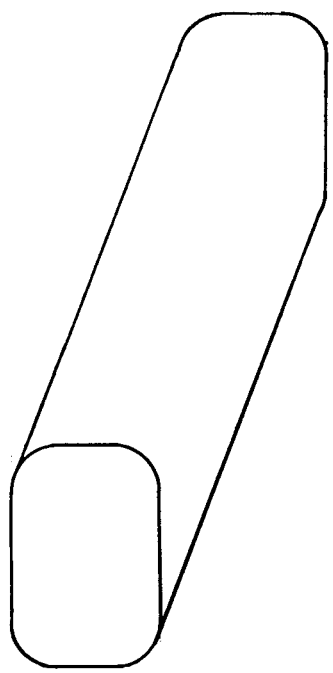
FIG. 65B is an isometric view of the conveyor frame component of FIG. 65A.
Figure 66B:
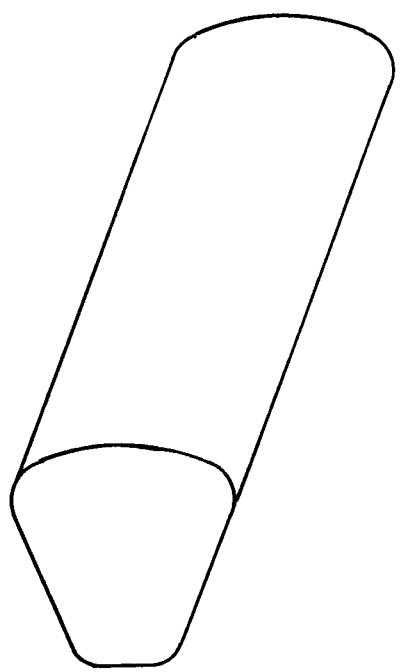
FIG. 66B is an isometric view of the conveyor frame component of FIG. 66A.

Throughout the embodiments of FIGS. 1-51 and 54-62, the illustrative frame components have a round cross section to enhance cleanability and the longitudinal frame supports 3320 in FIGS. 52A-53 have a rounded T-shaped cross-section to promote cleanability, though the frame components may have any suitable cross-sectional shaped suitable for cleaning. Preferably, each frame component has a circumference formed of or bounded by a plurality of arcs, and more preferably consisting only of arcs, with no sharp angles in the circumference, or elsewhere in the frame. The cross-section of each frame component lacks crevices or recesses that may trap debris or contaminants, and preferably lacks horizontal flat surfaces, which may also trap debris or contaminants. Examples of suitable cross-sections are shown in FIGS. 63A-72. The frame components may have a round cross-section as shown in FIGS. 63A and 63B, an oval cross-section, as shown in FIGS. 64A and 64B, a rounded rectangular cross-section as shown in FIGS. 65A and 65B or a rounded trapezoidal-shaped cross-section as shown in FIGS. 66A and 66B. In another embodiment, the plurality of arcs defining the circumference of the frame component has a rounded I-beam shape, shown in FIG. 67. As shown in FIG. 68, the frame component may have a cross-section in the form of a rounded "T" or bicycle seat. As shown in FIG. 69, the frame component may have a cross-section similar to a comma or kidney shape, with a rounded upper bulb extending at an angle from a rounded longer vertical protrusion. The cross-sections of FIGS. 67-69 maximize strength and cleanliness while minimize weight and the amount of material needed to form the frame component. Other suitable cross-sectional shapes include, but are not limited to, a teardrop-shaped cross-section, a semi-circular cross-section, a rounded triangle, a rounded pentagon, and other shapes known to those of ordinary skill in the art.

Figure 67:
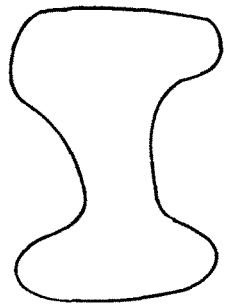
FIG. 67 is a cross-sectional view of a frame component shaped like a rounded I-beam according to another embodiment.
Figure 68:
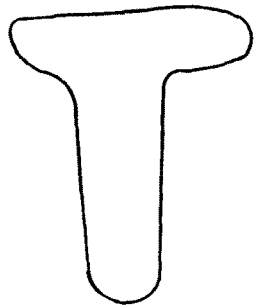
FIG. 68 is a cross-sectional view of a frame component shaped like a rounded T-beam according to another embodiment.
Figure 69:
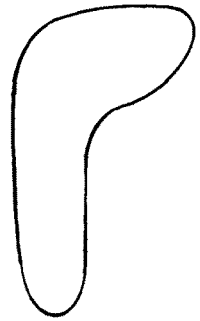
FIG. 69 is a cross-sectional view of a frame component shaped like a rounded comma according to another embodiment.

In the embodiments of FIGS. 67, 68 and 69, the vertical components may be thin, like a sheet. In one embodiment, the frame components are made from sheets of metal, such as steel formed into the sculpted shapes described above.

Figure 70:
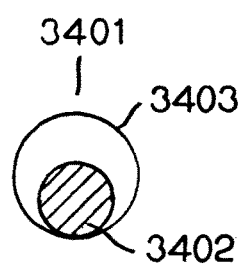
FIG. 70 is a cross-sectional view of a component suitable for use in the cleanable conveyor frames of various embodiments of the invention.
Figure 71:
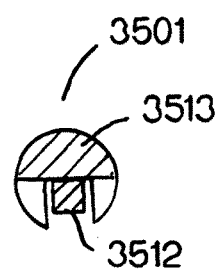
FIG. 71 is a cross-sectional view of another component suitable for use in the cleanable conveyor frames of various embodiments of the invention.
Figure 72:
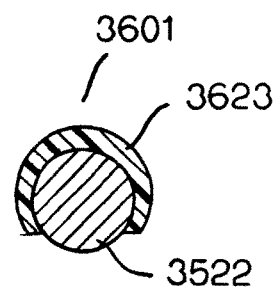
FIG. 72 is a cross-sectional view of another component suitable for use in the cleanable conveyor frames of various embodiments of the invention.

FIGS. 70, 71 and 72 are cross-sectional views of components of a cleanable conveyor frame. The components may be formed of a hybrid material. For example, as shown in FIG. 70, a conveyor frame component 3401 may comprise a core 3402 surrounded by an outer sheath or coating 3403. In one example, the core 3402 may be stainless steel, and the sheath or coating 3403 may be plastic. The outer sheath or coating 3403 may have a varying thickness. For example, the outer sheath or coating 3403 may be thicker in the top portion of the conveyor frame component and taper to a minimal or smaller thickness in the bottom portion of the conveyor frame component.

As shown in FIG. 71, a conveyor frame component 3501 may alternatively comprise a core 3512 with a removable top 3513, which may be formed of a different material. For example, the core 3512 may be formed of stainless steel, and the removable top 3513 may be formed of plastic.

As shown in FIG. 72, a conveyor frame component 3601 may alternatively comprise a central core 3522 covered by a sleeve 3623. In one exemplar embodiment, the central core 3622 is formed of stainless steel, and the sleeve 3623 is formed of plastic.

Although the invention has been described with reference to specific versions, other versions are possible. The scope of the invention is not meant to be limited to the exemplary versions described in detailed.

What is claimed is:

1. A conveyor frame comprising a plurality of modular frame components assembled to form a plurality of legs and a plurality of longitudinally-extending rails connecting the legs and defining a carryway, the plurality of modular frame components comprising:
   a first longitudinal rail;
   a first t-shaped connector having a first end connected to a first end of the first longitudinal rail,
   a first vertical rail forming a first leg connected to a second, downward-extending end of the t-shaped connector;
   a second longitudinal rail connected to a third end of the t-shaped connector opposite the first end;
   a third longitudinal rail;
   a second t-shaped connector having a first end connected to a first end of the third longitudinal rail;

a second vertical rail forming a second leg connected to a second, downward-extending end of the second t-shaped connector;

a fourth longitudinal rail connected to a third end of the second t-shaped connector opposite the first end; and a lateral rail extending between the first leg and second leg below the first longitudinal rail, the second longitudinal rail, the third longitudinal rail, the fourth longitudinal rail, the first t-shaped connector, and the second t-shaped connector, the lateral rail including a returnway support.

2. The conveyor frame of claim 1, further comprising a first curved end rail connected to a second end of the first longitudinal rail.

3. The conveyor frame of claim 1, further comprising a second curved end rail connected to a second end of third longitudinal rail opposite the first curved end rail, forming reversing element for a conveyor belt.

4. The conveyor frame of claim 1, wherein the returnway support comprises a curved rail extending longitudinally from the lateral rail.

5. The conveyor frame of claim 1, wherein the t-shaped connectors include protrusions and the longitudinal rails include openings for receiving the protrusions.

6. The conveyor frame of claim 1, further comprising a fifth longitudinal rail defining a central portion of the carryway between the first and third longitudinal rails.

7. The conveyor frame of claim 1, wherein a longitudinally-extending portion of the first t-shaped connector forms part of the carryway.

8. The conveyor frame of claim 1, further comprising third and fourth vertical legs connected to the carryway.

9. A conveyor frame comprising a plurality of modular frame components assembled to form a plurality of legs and a plurality of longitudinally-extending rails connecting the legs to define a carryway, the plurality of modular frame components comprising:

a first longitudinal rail having a curved end and a non-curved end;

a first t-shaped connector having a first end connected to the non-curved end of the first longitudinal rail, a first vertical rail forming a first leg connected to a second, downward extending end of the first t-shaped connector;

a second longitudinal rail connected to a third end of the first t-shaped connector; and a third longitudinal rail with a curved end opposite the curved end of the first longitudinal rail and a non-curved end;

a second t-shaped connector having a first end connected to an end of the third longitudinal rail opposite the curved end, a second vertical rail forming a second leg connected to a second, downward-extending end of the second t-shaped connector; and a fourth longitudinal rail connected to a third end of the second t-shaped connector.

10. The conveyor frame of claim 9, further comprising:

a lateral rail extending between the first leg and second leg below the first longitudinal rail, second longitudinal rail, third longitudinal rail, fourth longitudinal rail, first t-shaped connector, and second t-shaped connector, the lateral rail including a returnway support.

11. The conveyor frame of claim 9, further comprising third and fourth vertical legs connected to the carryway.

12. The conveyor frame of claim 9, further comprising a fifth longitudinal rail defining a central portion of the carryway between the first and third longitudinal rails.

13. The conveyor frame of claim 9, wherein each of the t-shaped connectors include a protrusion and each of the longitudinal rails includes an opening for receiving a protrusion of a t-shaped connector.

14. A conveyor frame comprising a plurality of modular frame components assembled to form a plurality of legs and a plurality of longitudinally-extending rails connecting the legs to define a carryway, the plurality of modular frame components comprising:

a first longitudinal rail having a curved end, a non-curved end and a downward extending shaft;

a first vertical rail forming a first leg connected to the downward extending shaft;

a second longitudinal rail connected in series to the non-curved end of the first longitudinal rail;

a first t-shaped connector having a first end connected to an end of the second longitudinal rail, a second vertical rail forming a second leg connected to a second, downward-extending end of the second t-shaped connector; and a third longitudinal rail connected to a third end of the second t-shaped connector.

* * * * *